United States Patent
Yang et al.

(10) Patent No.: US 11,252,567 B2
(45) Date of Patent: Feb. 15, 2022

(54) METHODS AND APPARATUS FOR DETECTING ATTACKS IN V2X NETWORKS

(71) Applicant: Intel Corporation, Santa Clara, CA (US)

(72) Inventors: Liuyang Lily Yang, Portland, OR (US); Debabani Choudhury, Thousand Oaks, CA (US); Sridhar Sharma, Palo Alto, CA (US); Kathiravetpillai Sivanesan, Portland, OR (US); Justin Gottschlich, Santa Clara, CA (US); Zheng Zhang, Portland, OR (US); Yair Yona, Cupertino, CA (US); Xiruo Liu, Portland, OR (US); Moreno Ambrosin, Hillsboro, OR (US); Kuilin Clark Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 392 days.

(21) Appl. No.: 16/230,971

(22) Filed: Dec. 21, 2018

(65) Prior Publication Data

US 2019/0215695 A1 Jul. 11, 2019

(51) Int. Cl.
*H04W 12/12* (2021.01)
*H04W 4/40* (2018.01)
(Continued)

(52) U.S. Cl.
CPC .......... *H04W 12/12* (2013.01); *H04L 9/3271* (2013.01); *H04W 4/40* (2018.02); *H04W 12/06* (2013.01); *H04W 12/122* (2021.01)

(58) Field of Classification Search
CPC ..... H04W 12/12; H04W 12/122; H04W 4/40; H04W 12/06; H04W 4/80; H04L 9/3271
See application file for complete search history.

(56) References Cited

U.S. PATENT DOCUMENTS

2013/0111582 A1* 5/2013 Forest ..................... G06F 21/44
726/19
2013/0212659 A1* 8/2013 Maher .................. G05D 1/0022
726/6
(Continued)

OTHER PUBLICATIONS

Brik et al., "Wireless Device Identification with Radiometric Signatures," MobiCom '08, Sep. 14-19, 2008. Retrieved from the Internet on Jun. 27, 2019, <URL: http://www.winlab.rutgers.edu/~gruteser/papers/brik_paradis.pdf> (13 pages).
(Continued)

*Primary Examiner* — Samson B Lemma
*Assistant Examiner* — Blake I Narramore
(74) *Attorney, Agent, or Firm* — Hanley, Flight & Zimmerman, LLC

(57) ABSTRACT

Methods, apparatus, systems, and articles of manufacture are disclosed to detect attacks in V2X networks. An example apparatus includes a challenge handler to (a) transmit a first challenge packet to a first vehicle to request a transmission of a first response, (b) instruct a second challenge packet to be transmitted to a second vehicle to request a transmission of a second response, (c) increment a first counter when the first response is not obtained, (d) increment a second counter when the second response is not obtained, and (e) after repeating (a)-(d), determine that the first and second vehicles are phantom vehicles associated with an attacker with a half-duplex radio when at least one of the first or second counters satisfy a threshold, and a network interface to instruct a third vehicle associated with the V2X network to ignore future messages from the phantom vehicles based on the determination.

26 Claims, 16 Drawing Sheets

(51) Int. Cl.
  *H04W 12/06* (2021.01)
  *H04L 9/32* (2006.01)
  *H04W 12/122* (2021.01)

(56) References Cited

U.S. PATENT DOCUMENTS

| | | | | |
|---|---|---|---|---|
| 2013/0279392 | A1* | 10/2013 | Rubin | H04L 67/12 370/312 |
| 2013/0279695 | A1* | 10/2013 | Rubin | G01C 21/26 380/255 |
| 2014/0082434 | A1* | 3/2014 | Knight | G06F 11/0739 714/55 |
| 2016/0105539 | A1* | 4/2016 | Maddox | H04W 4/80 455/557 |
| 2017/0132477 | A1* | 5/2017 | Kim | H04W 4/46 |
| 2017/0188391 | A1* | 6/2017 | Rajagopal | H04W 28/0284 |
| 2017/0230385 | A1* | 8/2017 | Ruvio | H04L 63/1416 |
| 2018/0039266 | A1* | 2/2018 | Dotzler | B60D 1/62 |
| 2019/0007484 | A1* | 1/2019 | Chen | H04W 4/40 |
| 2019/0041223 | A1* | 2/2019 | Yang | G08G 1/0116 |
| 2019/0045454 | A1* | 2/2019 | Haran | H04L 5/001 |
| 2019/0068639 | A1* | 2/2019 | Alexander | H04W 12/12 |
| 2020/0084738 | A1* | 3/2020 | Nguyen | H04W 64/003 |
| 2020/0099705 | A1* | 3/2020 | Xiao | H04L 63/1408 |

OTHER PUBLICATIONS

Ureten et al., "Wireless Security through RF Fingerprinting," Canadian Journal of Electrical Engineering, vol. 32, No. 1, 2007 (7 pages).

Li et al., "Securing Wireless Systems via Lower Layer Enforcements," WiSe '06, Sep. 29, 2006 (10 pages).

Mathur et al., "Exploiting the Physical Layer for Enhanced Security," IEEE Wireless Communications, Oct. 2010 (8 pages).

Rehman et al., "Radio Frequency Fingerprinting and its Challenges," IEEE CNS 2014 (2 pages).

* cited by examiner

METHODS AND APPARATUS FOR DETECTING ATTACKS IN V2X NETWORKS

FIELD OF THE DISCLOSURE

This disclosure relates generally to computer networks and, more particularly, to methods and apparatus for detecting attacks in V2X networks.

BACKGROUND

In recent years, vehicles, such as autonomous vehicles, have been developed to communicate information with other vehicles, pedestrians, and/or roadside units in the proximity of the vehicles. The communication of information with other vehicles, pedestrians, and/or roadside units can correspond to vehicle-to-everything (V2X) communication. V2X communication can be used to facilitate driving related tasks of the vehicles and/or surrounding entities.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
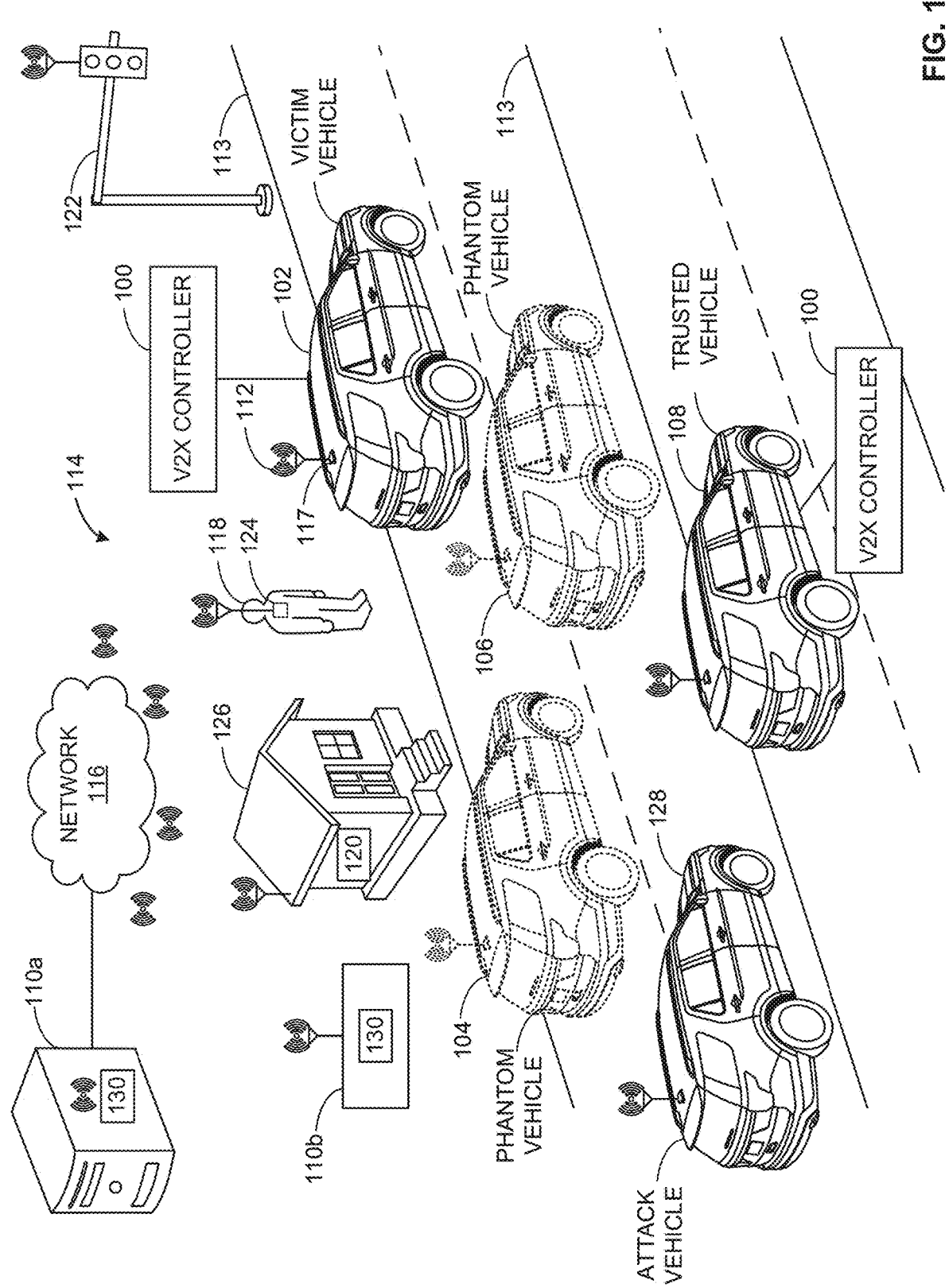
FIG. 1 is a schematic illustration of an example victim vehicle including an example V2X controller attempting to validate two example phantom vehicles by coordinating with at least one of an example central facility or an example trusted vehicle.

Vehicle-to-everything (V2X) communication enables information sharing between vehicles, pedestrians, roadside units, and/or any suitable apparatus in the proximity of V2X communication messages. V2X communication is a vehicular communication system that incorporates one or more types of communication (e.g., wireless communication), such as Vehicle-to-Device (V2D), Vehicle-to-Grid (V2G), Vehicle-to-Infrastructure (V2I), Vehicle-to-Network (V2N), Vehicle-to-Pedestrian (V2P), Vehicle-to-Vehicle (V2V), etc., to promote energy savings, road safety, and traffic efficiency of an intelligent transportation system.

With respect to autonomous vehicles, V2X communication allows an autonomous vehicle to communicate with surrounding entities (e.g., other vehicles, wearable devices and/or other computing devices associated with pedestrians, roadside units, traffic lights, etc.) to convey and/or receive messages (e.g., wireless messages) relevant to surrounding environment conditions in an intelligent transportation system. For example, if an autonomous vehicle is approaching an obstruction (e.g., a fallen tree, an article of road debris, etc.) that is blocking a roadway, other vehicles in the vicinity of the autonomous vehicle that have previously encountered the obstruction may transmit an indication of the obstruction to the autonomous vehicle. In this manner, through V2X communication, the autonomous vehicle is informed about the obstruction and can execute necessary measures to avoid the obstruction.

In an intelligent transportation system, V2X enhances the ability for vehicles to handle safety-critical applications (e.g., avoidance of vehicular collisions), vehicular infotainment systems, local cooperative driving, and/or large-scale traffic management. V2X communication in the intelligent transportation systems relies on the trusted communal exchange of messages between entities. There are instances in which the communal exchange of messages is compromised (e.g., malicious, phantom, or not trusted behavior). For example, if an unauthorized entity (e.g., a hacker, an intruder, etc.) compromises the exchange of messages sent by a first vehicle, the unauthorized entity may send falsified information to surrounding vehicles on behalf of the compromised first vehicle.

Additionally or alternatively, there may exist instances in which the unauthorized entity may exercise a similar data manipulation attack by utilizing a wireless device to pose as an additional vehicle in the intelligent transportation system. For example, the unauthorized entity may steal valid V2X credentials of a vehicle and use them to relay falsified messages using a wireless device (e.g., a software-defined radio operating in half-duplex mode, a half-duplex software-defined radio, a half-duplex radio, etc.) from an area not in the intelligent transportation system (e.g., in a neighboring building, an overpass, a vehicle tunnel, etc.) or in the intelligent transportation system (e.g., in a vehicle on a road monitored by the intelligent transportation system, along the road, etc.) to provide inaccurate data to vehicles in the intelligent transportation system to cause the vehicles to perform unexpected driving actions, behaviors, maneuvers, etc.

In some instances, the unauthorized entity may use stolen V2X credentials to generate phantom vehicles—vehicles that do not actually exist in the intelligent transportation system, but are represented in the intelligent transportation system using the stolen V2X credentials. This may be carried out by sending malicious V2X messages on behalf of the phantom vehicles. For example, a phantom vehicle may correspond to a software-defined radio generating wireless messages as if it were a vehicle, and not by an actual or genuine vehicle. As used herein, the term "software-defined radio" corresponds to a computing device including a sound card, or other analog-to-digital converter, preceded by radio-frequency front-end hardware (e.g., one or more antennae, one or more filters, one or more amplifiers, etc.). As used herein, the term "half-duplex radio" corresponds to either a software-defined radio operating in half-duplex mode or a non-software defined radio operating in the half-duplex mode, where the software-defined radio or the non-software defined radio cannot transmit and receive simultaneously.

In some instances, a genuine vehicle may receive V2X messages from the phantom vehicle and identify the V2X messages as coming from another genuine vehicle based on the stolen valid V2X credentials associated with the V2X messages. Such an attack on the intelligent transportation system may correspond to a Sybil attack, where wireless messages generated by multiple entities (e.g., two or more phantom vehicles) are transmitted by a single device (e.g., a single half-duplex software-defined radio). These fake or synthetic messages may pass cryptographic verifications supported by the intelligent transportation system and inject false data to achieve malicious intents (e.g., cause a collision, disrupt traffic flow, create congestion at an intersection, etc.) or personal gain (e.g., obtain priority access on the road at the intersection, prevent overtake, etc.), or even subvert security mechanisms (e.g., a reputation system, a majority voting system, etc.) supported by the intelligent transportation system.

Examples disclosed herein detect attacks, such as Sybil attacks, in V2X networks by subjecting candidate or suspect phantom vehicles to wireless protocol challenges to invoke responses. These challenges are easily handled with appropriate responses if the vehicle being challenged is a genuine vehicle, but cannot be handled by a single half-duplex device that is generating data corresponding to one or more phantom vehicles. Examples disclosed herein include an example V2X controller associated with a genuine vehicle to identify candidate phantom vehicles in a V2X network. For example, the V2X controller may determine that messages from two or more vehicles are potentially malicious based on a substantially similar wireless signal parameter, signal-to-noise ratio, etc., of the messages. In such examples, the V2X controller may determine that the substantially similar message characteristics indicate that the messages may be from the same device. Accordingly, the V2X controller may identify the two or more vehicles as candidate phantom vehicles for further evaluation.

To mitigate such malicious activities in V2X networks, examples disclosed herein enclose a victim vehicle, or a targeted genuine vehicle, to provide an example central facility (e.g., one or more computer servers communicatively coupled to the V2X network, one or more roadside computing devices communicatively coupled to the V2X network, etc.) information associated with one or more candidate phantom vehicles that sent V2X messages to the victim vehicle. The example central facility can schedule conflicting protocol actions for the candidate phantom vehicles. For example, the central facility may (1) transmit a first challenge packet to a first candidate phantom vehicle at a first time and (2) request a second candidate phantom vehicle to transmit a second challenge response (e.g., in response to a second challenge packet from the central facility) to the central facility at the first time. In such examples, if the first and second candidate phantom vehicles are genuine vehicles, the central facility will receive the first challenge response from the first candidate phantom vehicle at the first time and the second challenge response from the second candidate phantom vehicle at the first time. If the example central facility does not receive at least one of the first or second challenge responses, the central facility may alert the victim vehicle that the first and second candidate phantom vehicles may be phantom vehicles. Accordingly, the victim vehicle may disregard future messages from the phantom vehicles. However, such phantom detection methods, systems, apparatus, and articles of manufacture do not disable normal collision prevention systems of the vehicle such as light detection and ranging (LIDAR), etc., which provide safety in the event the phantom detection system proves to be in error so that a misidentified phantom vehicle may still be detected and avoided.

In some disclosed examples, the victim vehicle provides an example trusted vehicle (e.g., a verified genuine vehicle in the intelligent transportation system) information associated with the candidate phantom vehicles. The victim vehicle and the trusted vehicle schedule conflicting protocol actions for the candidate phantom vehicles to determine whether they are being generated from the same half-duplex radio, which cannot transmit and receive a message at the same time because the half-duplex radio can only be in either a receiving mode of operation or a transmission mode of operation. For example, the victim vehicle can (1) transmit the first challenge packet to the first candidate phantom vehicle at the first time and (2) request the second candidate phantom vehicle to transmit the second challenge response to the trusted vehicle at the first time. In such examples, if the first and second candidate phantom vehicles are genuine vehicles, the victim vehicle will receive the first challenge response from the first candidate phantom vehicle at a second time after the first time and the trusted vehicle will receive the second challenge response from the second candidate phantom vehicle at the first time. If the victim vehicle does not receive the first challenge response and/or the trusted vehicle does not receive the second challenge response, the victim vehicle may identify the first and second candidate phantom vehicles as phantom vehicles and disregard future messages from the phantom vehicles.

In some disclosed examples, the central facility, the victim vehicle, and/or the trusted vehicle schedule conflicting protocol actions for the candidate phantom vehicles using frequency-hopping spread spectrum (FHSS) transmissions. For example, the central facility may (1) transmit a first challenge packet at a first frequency to a first candidate phantom vehicle at a first time and (2) also transmit a second challenge packet at a second frequency to a second candidate phantom vehicle at the first time. In such examples, the central facility has full-duplex capability. For example, the central facility may have two or more half-duplex radios, one or more full-duplex radios, etc., and/or a combination thereof to transmit the first and second challenge packets. The first challenge packet directs the first candidate phantom vehicle to respond within a specified hopping cycle (e.g., one or more hopping cycles after receiving the first challenge packet) using a different frequency than the first frequency based on a first frequency band hopping pattern. The second challenge packet directs the second candidate phantom vehicle to respond within the same specified hopping cycle (e.g., one or more hopping cycles after receiving the second challenge packet) using a different frequency than the second frequency based on a second frequency band hopping pattern different from the first frequency band hopping pattern. In such examples, if the first and second candidate phantom vehicles are genuine vehicles, the central facility will receive the first challenge response from the first candidate phantom vehicle at the specified hopping cycle with the expected frequency based on the first frequency band hopping pattern and receive the second challenge response from the second candidate phantom vehicle at the specified hopping cycle with the expected frequency based on the second frequency band hopping pattern. If the example central facility does not receive at least one of the first or second challenge responses, the central facility may alert the victim vehicle that the first and second candidate phantom vehicles may be phantom vehicles because they may be from the same hardware that cannot transmit V2X messages using different frequency band hopping patterns at the same time. Accordingly, the victim vehicle may disregard future messages from the phantom vehicles. Again, collision avoidance systems are not disabled so a collision with a genuine vehicle misidentified as a phantom vehicle due to, for example, a transmission failure, is still avoided while reducing (e.g., eliminating) the overhead and risks associated with phantom detection (e.g., eliminating fast braking for a non-existing obstacle such as a phantom vehicle).

FIG. 1 is a schematic illustration of an example V2X controller 100 associated with an example victim vehicle 102 attempting to validate two example phantom vehicles 104, 106 by coordinating with at least one of an example trusted vehicle 108 or an example central facility 110a-b. Additionally or alternatively, the V2X controller 100 may attempt to validate one or more than two phantom vehicles. As used herein, when describing an action by the victim vehicle 102, the trusted vehicle 108, etc., the action is being facilitated, executed, and/or otherwise implemented by the V2X controller 100 associated with the victim vehicle 102, the trusted vehicle 108, etc. In FIG. 1, the V2X controller 100 is included in the victim vehicle 102 and the trusted vehicle 108. For example, the V2X controller 100 may correspond to an electronic control unit (ECU) included in at least one of the victim vehicle 102 or the trusted vehicle 108. In such examples, the V2X controller 100 can correspond to one or more processors executing machine readable instructions. In other examples, the V2X controller 100 can be a controller external to the vehicles 102, 108, such as a cloud-based controller that the victim vehicle 102, the trusted vehicle 108, etc., may communicate with via an example wireless communication link (e.g., a wireless connection) 112.

In the illustrated example of FIG. 1, the victim vehicle 102 and the trusted vehicle 108 are automobiles or other land vehicles driving on an example road (e.g., a road surface) 113 that is monitored and/or otherwise associated with an example intelligent transportation system 114. Additionally or alternatively, the victim vehicle 102 and/or the trusted vehicle 108 may be airborne vehicles such as a drone, an unmanned aerial vehicle, and/or a manned aerial vehicle. The victim vehicle 102 can interact with the intelligent transportation system 114 via the wireless communication link 112, which is communicatively coupled to an example network (e.g., an intelligent transportation system network, a V2X network, etc.) 116. For example, the victim vehicle 102, the trusted vehicle 108, etc., of FIG. 1 include an example radio 117 to facilitate wireless communication with the network 116. In FIG. 1, the radio 117 is a half-duplex radio that can receive or transmit wireless messages based on a V2X protocol (e.g., wireless messages formatted to and/or otherwise based on a V2X protocol). For example, the radio 117 may receive wireless messages from or transmit messages to the network 116 or to other computing devices and/or entities associated with the intelligent transportation system 114. However, as the radio 117 is a half-duplex radio, the radio 117 cannot receive and transmit messages at the same time. For example, the radio 117 may be in either a receive (RX) mode or a transmit (TX) mode but not both modes simultaneously. In such examples, the radio 117 will not receive messages when in the TX mode and, conversely, will not transmit messages when in the RX mode. Other computing devices and/or entities that are associated with the intelligent transportation system 114 of FIG. 1 are an example pedestrian 118, a first example roadside unit 120, and a second example roadside unit 122. Additionally or alternatively, fewer or more than the computing devices and/or entities depicted in FIG. 1 may interact with the intelligent transportation system 114.

In FIG. 1, the pedestrian 118 has an example computing device 124 that is communicatively coupled to the network 116. For example, the computing device 124 may be a mobile device (e.g., a cell phone, a smart phone, a tablet, etc.), a personal digital assistant (PDA), a smart wearable device, etc. In other examples, the computing device 124 may communicate with the radio 117 of the vehicles 102, 108 without sending messages to the network 116 (e.g., a direct wireless connection). In FIG. 1, the roadside unit 120 is a wireless beacon (e.g., a V2X beacon) included in and/or otherwise associated with an example building structure 126. For example, the V2X beacon may obtain from and/or transmit example V2X messages to the victim vehicle 102, the trusted vehicle 108, etc. In such examples, the V2X beacon can facilitate the exchange of information between the network 116 and passing vehicles traveling on the road 113.

In FIG. 1, the building structure 126 of FIG. 1 is a residential building. Alternatively, the building structure 126 may be an office building, a public transportation terminal, etc., or any other type of building structure. For example, the building structure 126 may include one or more roadside units 120 to facilitate V2X communication between the network 116 and vehicles on the road 113. In FIG. 1, the second roadside unit 122 is a traffic light. For example, the second roadside unit 122 may be a traffic light that is communicatively coupled to the network 116. In such examples, the second roadside unit 122 can transmit data including a color (e.g., red, green, yellow, etc.) or state (e.g., 5 seconds until changing color to red, 3 seconds until changing color to green, etc.) of the traffic light, a speed of oncoming vehicles, a measure of a traffic level on the road 113, etc., to the network 116. Although the V2X controller 100 is included in the victim vehicle 102 and the trusted vehicle 108 in the illustrated example of FIG. 1, additionally or alternatively, the V2X controller 100 may be located in the central facility 110a-b, in one or more of the roadside units 120, 122, the building structure 126, etc., or any other computing device in communication with the network 116, such as a router, a gateway, etc.

In the illustrated example of FIG. 1, entities of the intelligent transportation system 114 communicate with the central facility 110a-b via the network 116. The network 116 of FIG. 1 is the Internet. However, the example network 116 may be implemented using any suitable wired and/or wireless network(s) including, for example, one or more data buses, one or more Local Area Networks (LANs), one or more wireless LANs, one or more cellular networks, one or more private networks, one or more public networks, one or more V2X networks, etc. The network 116 enables at least one of the victim vehicle 102, the trusted vehicle 108, the roadside units 120, 122, the computing device 124 associated with the pedestrian 118, etc., to be in communication with the central facility 110a-b.

The central facility 110a-b of the illustrated example of FIG. 1 collects and processes V2X information and/or otherwise manages the intelligent transportation system 114. In some examples, the central facility 110a includes one or more computer servers as depicted by the central facility 110a. In other examples, the central facility 110b is a central entity corresponding to a roadside unit (e.g., a roadside computing device) proximate to the road surface 113 as depicted by the central facility 110b. For example, the central facility 110b could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)).

In FIG. 1, the central facility 110a-b includes an example network interface 130 to receive Internet messages (e.g., a HyperText Transfer Protocol (HTTP) request(s)) that include the V2X messages. Additionally or alternatively, any other method(s) to receive V2X information may be used such as, for example, a V2X protocol, a cellular or other wireless communication protocol, an HTTP Secure protocol (HTTPS), a file transfer protocol (FTP), a secure file transfer protocol (SFTP), etc.

In FIG. 1, the network interface 130 of the central facility 110a-b can obtain V2X information associated with the intelligent transportation system 114 via the wireless communication link 112. The network interface 130 of the central facility 110a-b includes one or more radios. For example, the network interface 130 may include one or more half-duplex radios (e.g., two or more half-duplex radios to execute full-duplex functions) and/or one or more full-duplex radios to transmit and/or receive wireless messages. For example, the network interface 130 may receive V2X messages from the wireless communication link 112 facilitated by the radio 117 of the victim vehicle 102, the trusted vehicle 108, etc. The wireless communication link 112 of the illustrated example is a cellular communication link. However, any other method and/or system of communication may additionally or alternatively be used such as, for example, an Ethernet connection, a Bluetooth connection, a Wi-Fi connection, etc. Further, the wireless communication link 112 of FIG. 1 implements a cellular connection via a Global System for Mobile Communications (GSM). However, any other systems and/or protocols for communications may be used such as, for example, Time Division Multiple Access (TDMA), Code Division Multiple Access (CDMA), Worldwide Interoperability for Microwave Access (WiMAX), Long Term Evolution (LTE), etc.

In the illustrated example of FIG. 1, an example attacker 128 is associated with an example vehicle (e.g., an attack vehicle) in the intelligent transportation system 114. In FIG. 1, the attacker 128 is a malicious actor that is perpetuating an attack on the intelligent transportation system 114. For example, the attacker 128, referred to herein as the attack vehicle 128, is generating the phantom vehicles 104, 106. Alternatively, the attacker 128 may be in the building structure 126, on the side of the road 113 as another pedestrian like the pedestrian 118 with the computing device 124, etc. For example, the attacker 128 may generate the phantom vehicles 104, 106 using a half-duplex radio located anywhere in the network 116 that enables radio communication with the half-duplex radio of the attacker 128. In such examples, the attacker 128 may not be physically present in proximity to the road surface 113, but instead, may be generating the phantom vehicles 104, 106 from a remote location that is in a radiofrequency range of the network 116.

In FIG. 1, the phantom vehicles 104, 106 include a first example phantom vehicle 104 and a second example phantom vehicle 106. Additionally or alternatively, fewer or more phantom vehicles 104, 106 may be generated. In such examples, the attack vehicle 128 can use a half-duplex radio or other hardware and/or software to transmit V2X messages in the intelligent transportation system 114 as originating from the phantom vehicles 104, 106 and not the attack vehicle 128. By using a half-duplex radio, the attack vehicle 128 cannot receive and transmit information at the same time. Full-duplex radio hardware (e.g., a radio capable of operating in full-duplex mode) is required to perform transmission and reception simultaneously. However, full-duplex radio hardware is prohibitively expensive for devices in V2X networks and such systems may not be available for the intelligent transportation system 114 of FIG. 1.

In some examples, the attack vehicle 128 has obtained valid V2X credentials (e.g., a digital certificate, a media access control (MAC) identifier, a wireless service set identifier SSID, etc.) associated with a compromised vehicle. The attack vehicle 128 can transmit the V2X messages to the victim vehicle 102, the trusted vehicle 108, etc., using the V2X credentials associated with the compromised vehicle to avoid being detected as the source of the V2X messages. Accordingly, the victim vehicle 102, the trusted vehicle 108, etc., may attribute the V2X messages as being generated by the phantom vehicles 104, 106 and not the attack vehicle 128. In some examples, the phantom vehicles 104, 106 are detected by the V2X controller 100 in coordination with at least one of the trusted vehicle 108 or the central facility 110a-b. In other examples, the phantom vehicles 104, 106 may be detected without involving and/or otherwise coordinating with the trusted vehicle 108 or the central facility 110a-b. For example, the phantom vehicles 104, 106 may be detected via one or more of the roadside units 120, 122, the computing device 124, etc., and/or a combination thereof.

In some examples, the central facility 110a-b implements means for distributing software and/or firmware to an entity of the intelligent transportation system 114. The means for distributing is implemented by executable instructions, which may be executed on one or more processors such as the example processor 1812 shown in the example of FIG. 18. For example, the means for distributing may be implemented as a software server and/or a virtual machine operating on a router. In other examples, the means for distributing are implemented by hardware logic, hardware implemented state machines, logic circuitry, and/or any other combination of hardware, software, and/or firmware. In some examples, the distributing means invoke the network interface 130 of the central facility 110a-b to transmit one or more executables corresponding to machine readable instructions to the V2X controller 100 of the victim vehicle 102, the trusted vehicle 108, etc., via the network 116. In other examples, the network interface 130 may transmit the one or more executables to the roadside units 120, 122, etc., via the network 116. The V2X controller 100 may use the one or more executables to upgrade and/or otherwise replace existing software and/or firmware. For example, the V2X controller 100 may deploy the one or more executables to upgrade functions associated with the radio 117 and/or the V2X controller 100.

In some examples, the distributing means distributes the one or more executables when an attack is detected in association with the network 116 and/or, more generally, in association with the intelligent transportation system 114. For example, the victim vehicle 102 and/or the trusted vehicle 108 may transmit an alert indicative of an attack (e.g., by the attacker 128) to the central facility 110a-b. In such examples, the distributing means may generate and/or transmit the one or more executables to the victim vehicle, the trusted vehicle 108, etc., where the one or more executables can include a software and/or firmware patch to mitigate and/or otherwise prevent the attacker 128 from executing the attack. In other examples, the distributing means may transmit the one or more executables when the central facility 110a-b detects the attack by the attacker 128.

In some examples, the V2X controller 100 distributes the one or more executables to an entity of the intelligent transportation system 114. For example, the V2X controller 100 of the victim vehicle 102 may obtain the one or more executables from the central facility 110a-b and query neighboring vehicles, such as the trusted vehicle 108, to determine a version of software and/or firmware being executed by the V2X controller 100 of the trusted vehicle 108. In such examples, when the V2X controller 100 of the victim vehicle 102 determines that the version of the corresponding software and/or firmware being executed by the V2X controller 100 of the trusted vehicle 108 is out-of-date (e.g., an earlier version), the V2X controller 100 of the victim vehicle 102 can transmit the one or more executables to V2X controller 100 of the trusted vehicle 108 to cause an upgrade of the out-of-date version. Alternatively, the trusted vehicle 108 may transmit the one or more executables to the victim vehicle 102 to upgrade the V2X controller 100 of the victim vehicle 102. In some examples, the V2X controller 100 transmits the one or more executables when directed by the central facility 110a-b while, in other examples, the V2X controller 100 performs the transmission and/or otherwise causes the upgrade when the attack by the attacker 128 is detected.

Figure 2:
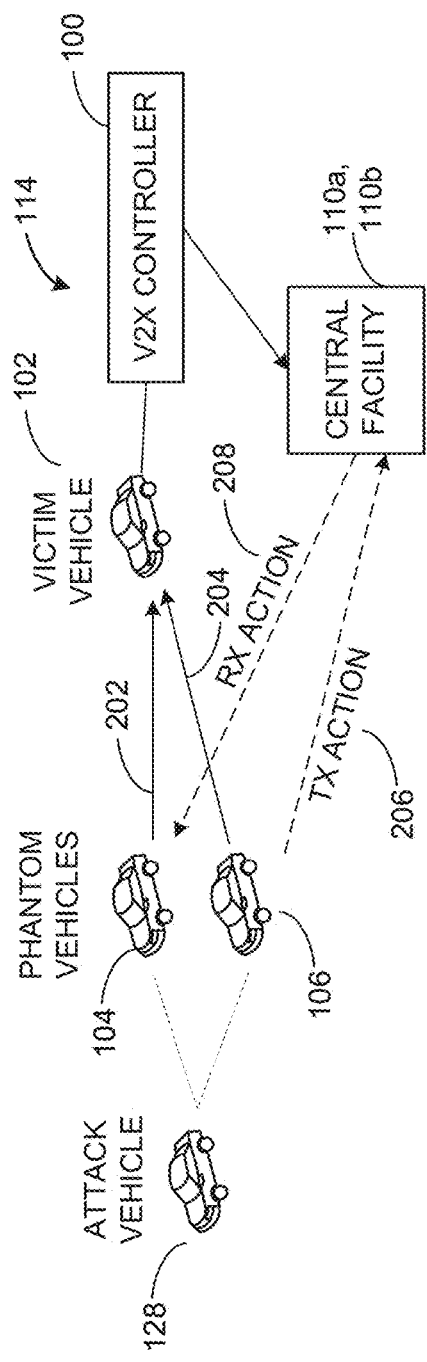
FIG. 2 is a schematic illustration of the example victim vehicle of FIG. 1 attempting to validate the example phantom vehicles of FIG. 1 by coordinating with the example central facility of FIG. 1.

FIG. 2 is a schematic illustration of the victim vehicle 102 of FIG. 1 attempting to validate the phantom vehicles 104, 106 of FIG. 1 by coordinating with the central facility 110a-b of FIG. 1. In the illustrated example of FIG. 2, the attack vehicle 128 manifests, spoofs the existence of, and/or otherwise generates the phantom vehicles 104, 106 by transmitting example V2X messages 202, 204 or other wireless messages to the victim vehicle 102 in the intelligent transportation system 114 of FIG. 1. Although they would not be sensed by physical sensors such as LIDAR, the phantom vehicles 104, 106 may be presented as genuine vehicles to the V2X controller 100 and/or, more generally, to the victim vehicle 102 (e.g., as a vehicle not within range of the physical sensors). For example, the V2X controller 100 included in and/or otherwise associated with the victim vehicle 102 may receive first example V2X messages 202 from the first phantom vehicle 104 and second example V2X messages 204 from the second phantom vehicle 106. The V2X controller 100 may initially determine that the first and second V2X messages 202, 204 are coming from different sources, namely, different genuine vehicles.

In the illustrated example of FIG. 2, the V2X controller 100 can evaluate the first and second V2X messages 202, 204 and determine that they are from candidate phantom vehicles. In some examples, the V2X controller 100 can determine that the first and second V2X messages 202, 204 have substantially similar (e.g., within a defined or specified tolerance range) signal qualities (e.g., amplitudes, energies, same sub-channel, same sub-frame, etc., and/or a combination thereof), signal-to-noise ratios, etc. In such examples, the V2X controller 100 can identify the source of the first and second V2X messages 202, 204 as likely coming from the same hardware and, thus, may classify, designate, and/or otherwise identify the phantom vehicles 104, 106 as candidate phantom vehicles.

In response to identifying the candidate phantom vehicles, the V2X controller 100 transmits information associated with the candidate phantom vehicles to the central facility 110a-b. In some examples, the V2X controller 100 transmits the V2X credentials or other identification information (e.g., a subchannel number, subframe number, etc., or other information included in the first and/or second V2X messages) to the central facility 110a-b to invoke the central facility 110a-b to perform a challenge-based authentication of the candidate phantom vehicles. For example, the V2X controller 100 may transmit a subchannel number, a subframe number, etc., associated with the phantom vehicles 104, 106 to the central facility 110a-b.

In the illustrated example of FIG. 2, the central facility 110a-b authenticates a vehicle in the V2X network 116 by scheduling conflicting V2X protocol actions for the candidate phantom vehicles. Scheduling conflicting V2X protocol actions may additionally or alternatively be implemented by the victim vehicle 102 or the trusted vehicle 108 as described in connection with FIGS. 3 and/or 4. In the illustrated example of FIG. 2, the central facility 110a-b can allocate protocol resources for reception to the first phantom vehicle 104 and allocate protocol resources for transmission to the second phantom vehicle 106. In such examples, the central facility 110a-b can allocate resources by ensuring that no other entities in the intelligent transportation system 114 is communicating on a specified subchannel, subframe, etc., during a specified time period. In other examples, the central facility 110a-b can allocate resources by sending a V2X message including sidelink control information that specifies a subchannel, a subframe, etc., for the phantom vehicles 104, 106 to use when receiving or transmitting V2X messages. For example, the central facility 110a-b can allocate receiving resources to the first phantom vehicle 104 by directing the half-duplex radio of the first phantom vehicle 104 to operate in the RX mode at a specific time or during a specified time interval. The central facility 110a-b can allocate transmitting resources to the second phantom vehicle 106 by directing the half-duplex radio of the second phantom vehicle 106 to operate in the TX mode at a specific time or during a specified time interval.

In some examples, the central facility 110a-b generates and/or transmits a challenge packet, or a challenge, at a first time that is to be received by the first phantom vehicle 104. The challenge packet may correspond to a wireless data packet, a V2X message, etc., that includes basic system information, driving attributes, a time stamp, a randomly-generated number (e.g., a nonce value), etc., and/or a combination thereof. If the first phantom vehicle 104 is a genuine vehicle, then, in response to receiving the challenge packet, the first phantom vehicle 104 can acknowledge the challenge packet with a challenge response (e.g., a response packet) at a second time after the first time. The challenge response may be a wireless data packet that includes a cryptographic proof to confirm the successful reception of the nonce value included in the challenge packet.

In some examples, to generate the cryptographic proof, if a responder (e.g., a genuine vehicle) and a challenger (e.g., the central facility 110a-b) share a symmetric cryptographic key, then the responder may use the symmetric key to compute a message authentication code (MAC) based on the nonce value and transmit the MAC to the challenger (e.g., the central facility 110a-b) as the cryptographic proof. In other examples, if the intelligent transportation system 114 is based on a Public Key Infrastructure (PKI) where asymmetric cryptography is used, then the responder may sign the nonce value (e.g., generate a hash value by calculating a hash function using the nonce value as an input) with its private key to generate a signature and transmit the signature to the challenger as the cryptographic proof after a specified number of slots (e.g., wireless subframes) have elapsed. For example, the responder may perform a signature computation or generation by calculating a hash value using a hash function with the nonce value from the challenger as the hash input. The challenger may validate the signature using a public key associated with the responder. Additionally or alternatively, any other type of cryptographic authentication method may be used by the central facility 110a-b.

In operation, the central facility 110a-b can determine whether one or more of the candidate phantom vehicles identified by the victim vehicle 102 are phantom vehicles, such as the phantom vehicles 104, 106 by scheduling conflicting protocol actions using timing-based challenge messages. For example, the central facility 110a-b may use timing-based challenge messages by invoking a transmission protocol action at a half-duplex radio of the attacker 128 by transmitting a first challenge (e.g., a first timing-based challenge message) to the half-duplex radio and invoke a receive protocol action at the half-duplex radio by transmitting a second challenge (e.g., a second timing-based challenge message) to the half-duplex radio. In such examples, the half-duplex radio is unable to transmit and receive at the same time (e.g., cannot process the first and second timing-based challenge messages or operations at the same time).

The central facility 110a-b can make the determination by subjecting the candidate phantom vehicles to an example transmit (TX) protocol action 206 and an example receive (RX) protocol action 208 at the same time. For example, the TX protocol action 206 may correspond to a first timing-based challenge message or operation and the RX protocol action 208 may correspond to a second timing-based challenge message or operation. In FIG. 2, the central facility 110a-b subjects the second phantom vehicle 106 to the TX action 206. The TX action 206 of FIG. 2 can correspond to the central facility 110a-b allocating transmission resources to the second phantom vehicle 106 by directing the half-duplex radio of the second phantom vehicle 106 to operate in the TX mode at a specified time. In FIG. 2, the central facility 110a-b transmits a second challenge packet to be received by the second phantom vehicle 106 at a first time. In response to receiving the second challenge packet, the second phantom vehicle 106 is to transmit a second challenge response at a second time after the first time to the central facility 110a-b.

In FIG. 2, the central facility 110a-b subjects the first phantom vehicle 104 to the RX action 208. The RX action 208 can correspond to the central facility 110a-b allocating reception resources to the first phantom vehicle 104 by directing the half-duplex radio of the first phantom vehicle 104 to operate in the RX mode at a specified time. In FIG. 2, the central facility 110a-b transmits a first challenge packet to be received by the first phantom vehicle 104 at the second time. In FIG. 2, the first and second challenge packets are different while in other examples they may be the same. If the attack vehicle 128 generated the phantom vehicles 104, 106, then the first phantom vehicle 104 cannot complete the RX action 208 (e.g., receive the first challenge packet) at the same time that the second phantom vehicle 106 is to complete the TX action 206 (e.g., transmit the second challenge response to the central facility 110a-b) because the phantom vehicles 104, 106 are generated by the same half-duplex radio of the attack vehicle 128 and, thus, cannot receive and transmit messages at the same time. For example, the half-duplex radio generating both phantom vehicles 104, 106 is operating in the TX mode at the second time in preparation for transmitting the second challenge response and, thus, cannot receive the first challenge packet because the half-duplex radio is not listening for messages (e.g., the first challenge packet).

When the attack vehicle 128 is using half-duplex radio hardware, the attack vehicle 128 cannot complete the TX action 206 at the same time as the RX action 208. Accordingly, the central facility 110a-b can determine that the candidate phantom vehicles are phantom vehicles, such as the phantom vehicles 104, 106, when the central facility 110a-b does not receive at least one of the first challenge response from first phantom vehicle 104 or the second challenge response from the second phantom vehicle 106. In FIG. 2, the central facility 110a-b may receive the second challenge response from the second phantom vehicle 106 but does not receive the first challenge response from the first phantom vehicle 104 because the first challenge packet was not received.

In some examples, the central facility 110a-b re-triggers the authentication of at least one of the phantom vehicles 104, 106 when the central facility 110a-b does not receive one or more challenge responses. For example, the first or second challenge response may have been generated but has been interfered with due to an obstruction on the road (e.g., a passing truck vehicle, dense tree coverage, etc.). For example, even though the second challenge response may have been generated, it may not have been received by the central facility 110a-b due to a passing truck vehicle at the time of transmission. In such examples, the central facility 110a-b can repeat at least one of the TX action 206 or the RX action 208 for a quantity of times until a counter threshold has been satisfied. For example, the central facility 110a-b may increment a first counter (e.g., a first retransmission counter) associated with the first phantom vehicle 104 and increment a second counter (e.g., a second retransmission counter) associated with the second phantom vehicle 106 in response to both challenge responses not being received. In such examples, the central facility 110a-b can re-trigger the authentication process by re-sending the second challenge packet at the first time and re-sending the first challenge packet at the second time. In some examples, in response to at least one of the first counter or the second counter satisfying a counter threshold being satisfied, the central facility 110a-b identifies the candidate phantom vehicles as the phantom vehicles 104, 106. Alternatively, the phantom vehicles 104, 106 may be detected using the method or process of FIG. 2 without involving the trusted vehicle 108 or the central facility 110a-b.

Figure 3:
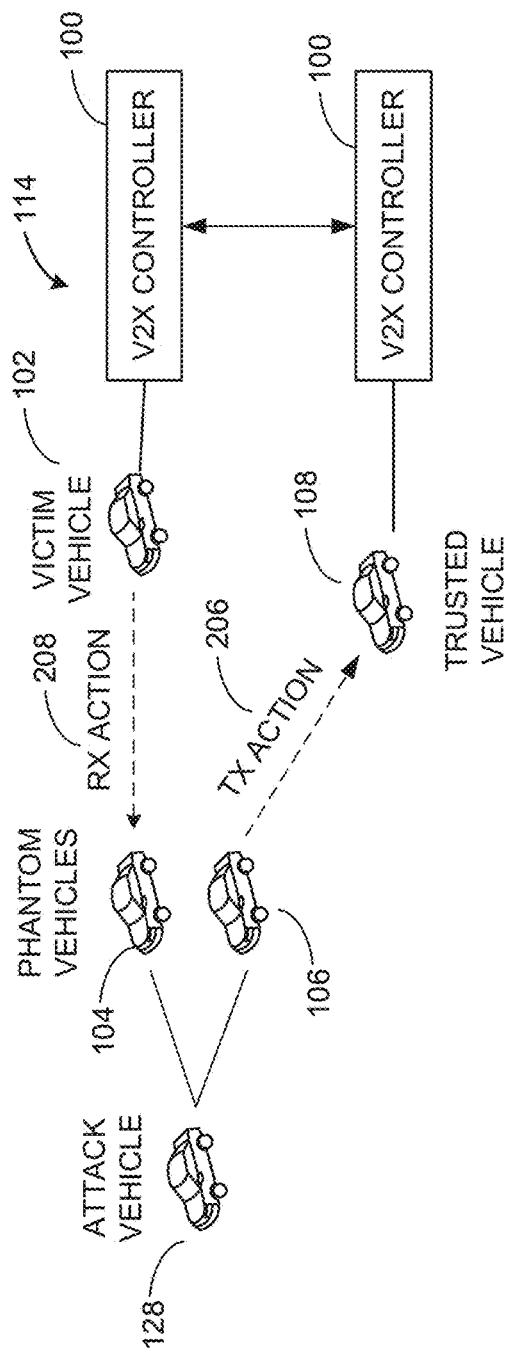
FIG. 3 is a schematic illustration of the example victim vehicle of FIGS. 1-2 attempting to validate the example phantom vehicles of FIGS. 1-2 by coordinating with the example trusted vehicle of FIG. 1.

FIG. 3 is a schematic illustration of the victim vehicle 102 of FIGS. 1-2 attempting to validate the phantom vehicles 104, 106 of FIGS. 1-2 by coordinating with the trusted vehicle 108 of FIG. 1. For example, the victim vehicle 102 and the trusted vehicle 108 may use timing-based challenge messages to attempt validating the phantom vehicles 104, 106. In the illustrated example of FIG. 3, the attack vehicle 128 generates the phantom vehicles 104, 106 by transmitting V2X messages or other wireless messages to the victim vehicle 102 in the intelligent transportation system 114 of FIG. 1. In FIG. 3, the victim vehicle 102 may determine whether one or more of the phantom vehicles 104, 106 are candidate phantom vehicles based on a signal quality, a signal-to-noise ratio, etc., associated with the V2X messages received from the phantom vehicles 104, 106.

In the illustrated example of FIG. 3, the V2X controller 100 of the victim vehicle 102 coordinates with the V2X controller 100 of the trusted vehicle 108 to authenticate the phantom vehicles 104, 106. In FIG. 3, the victim vehicle 102 and the trusted vehicle 108 can subject the candidate phantom vehicles to the TX protocol action 206 and the RX protocol action 208 of FIG. 2 at the same time. In FIG. 3, the trusted vehicle 108 subjects the second phantom vehicle 106 to the TX action 206. For example, the trusted vehicle 108 may transmit a second challenge packet to be received by the second phantom vehicle 106 at a first time. The second challenge packet includes information and/or otherwise directs the second phantom vehicle 106 to transmit a second challenge response in response to receiving the second challenge packet. For example, in response to receiving the second challenge packet, the second phantom vehicle 106 is directed to transmit the second challenge response at a second time after the first time to the trusted vehicle 108. At the second time, the half-duplex radio associated with the second phantom vehicle 106 is operating in the TX mode.

In FIG. 3, the victim vehicle 102 subjects the first phantom vehicle 104 to the RX action 208. For example, the victim vehicle 102 may transmit a first challenge packet to be received by the first phantom vehicle 104 at the second time. In FIG. 3, the first and second challenge packets are different while in other examples they may be the same. If the attack vehicle 128 is generating the phantom vehicles 104, 106, then the first phantom vehicle 104 cannot complete the RX action 208 at the same time that the second phantom vehicle 106 is to complete the TX action 206 because the phantom vehicles 104, 106 are generated by the same half-duplex radio of the attack vehicle 128. For example, the half-duplex radio is in the TX mode in response to receiving the second challenge packet at the first time and, thus, does not receive the first challenge packet at the second time because the half-duplex radio cannot be in the RX mode and the TX mode at the same time.

Accordingly, the V2X controller 100 of FIG. 3 can determine that the candidate phantom vehicles are phantom vehicles, such as the phantom vehicles 104, 106, based on not receiving at least one of the second challenge response from the second phantom vehicle 106 or the first challenge response from the first phantom vehicle 104. For example, the trusted vehicle 108 may receive the second challenge response at the second time because the half-duplex radio associated with the phantom vehicles 104, 106 is in the TX mode and successfully transmits the second challenge response to the trusted vehicle 108. However, the half-duplex radio is not listening for the first challenge packet at the second time and does not know to transmit the first challenge response.

In some examples, the victim vehicle 102 re-triggers the authentication of at least one of the phantom vehicles 104, 106 when the victim vehicle 102 or the trusted vehicle 108 does not receive a respective challenge response. For example, the first challenge response may not be received because the phantom vehicles 104, 106 are generated by the same hardware. In other examples, the first and/or second challenge response may have been generated by genuine vehicles but have been interfered with due to an obstruction on the road. In yet other examples, the first challenge response may not have been generated and consequently not received by the victim vehicle 102 while the second challenge response may have been generated but interfered with and ultimately not received by the trusted vehicle 108. In such examples, the victim vehicle 102 and the trusted vehicle 108 can repeat at least one of the TX action 206 or the RX action 208 for a quantity of times until a counter threshold has been satisfied. In response to the counter threshold being satisfied, the victim vehicle 102 and/or the trusted vehicle 108 may identify the candidate phantom vehicles as the phantom vehicles 104, 106.

Figure 4:
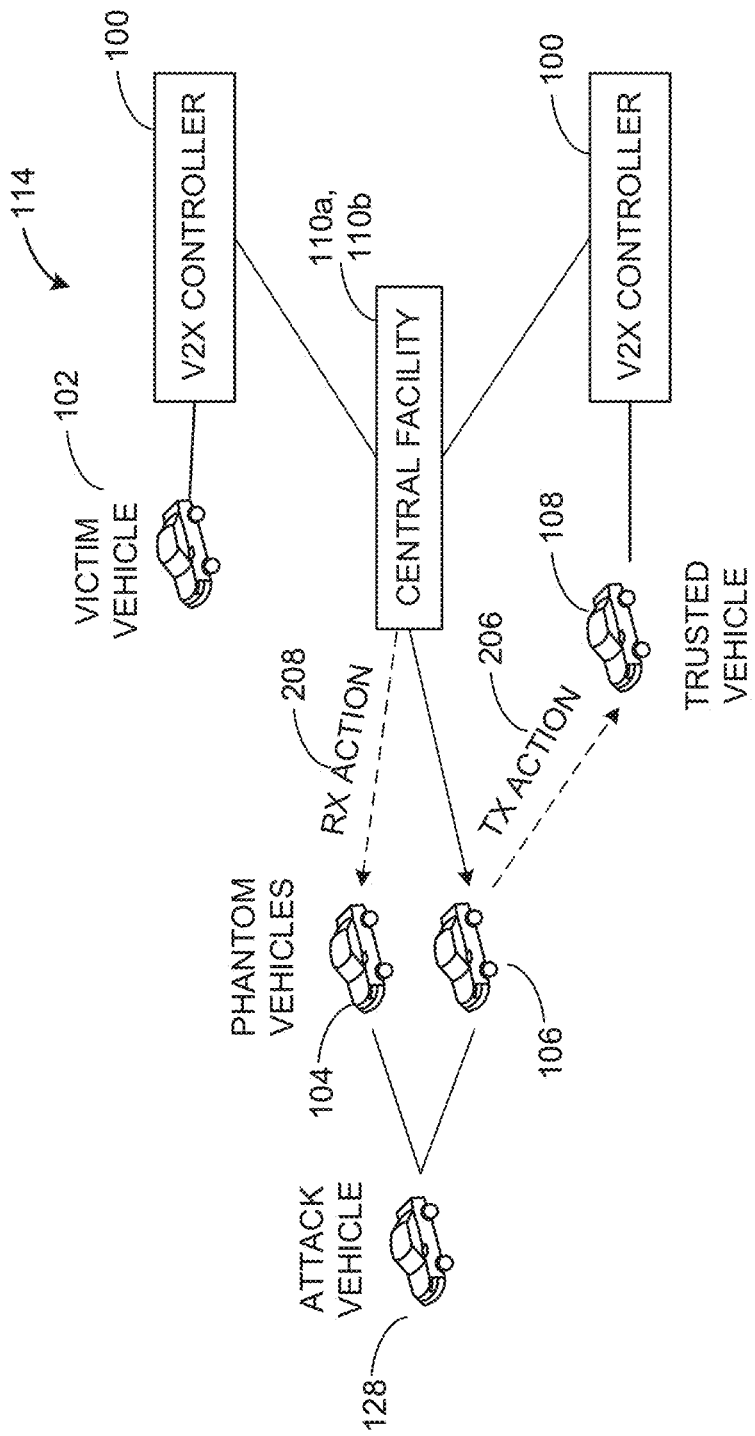
FIG. 4 is a schematic illustration of the example victim vehicle of FIGS. 1-3 attempting to validate the example phantom vehicles of FIGS. 1-3 by coordinating with the example central facility of FIGS. 1-2 and the example trusted vehicle of FIGS. 1 and 3.

FIG. 4 is a schematic illustration of the victim vehicle 102 of FIGS. 1-3 attempting to validate the phantom vehicles 104, 106 of FIGS. 1-3 by coordinating with the central facility 110a-b of FIGS. 1-2 and the trusted vehicle 108 of FIGS. 1 and 3. For example, the victim vehicle 102, the trusted vehicle 108, and/or the central facility 110a-b may use timing-based challenge messages to attempt validating the phantom vehicles 104, 106. In the illustrated example of FIG. 4, the attack vehicle 128 generates the phantom vehicles 104, 106 by transmitting V2X messages or other wireless messages to the victim vehicle 102 in the intelligent transportation system 114 of FIG. 1. In FIG. 4, the victim vehicle 102 may determine whether one or more of the phantom vehicles 104, 106 are candidate phantom vehicles based on a signal quality, a signal-to-noise ratio, etc., associated with V2X messages received from the phantom vehicles 104, 106.

In the illustrated example of FIG. 4, the V2X controller 100 of the victim vehicle 102 coordinates with the central facility 110a-b to authenticate the phantom vehicles 104, 106. In FIG. 4, the central facility 110a-b can subject the candidate phantom vehicles to the TX protocol action 206 and the RX protocol action 208 of FIGS. 2-3 at the same time. In FIG. 4, the central facility 110a-b subjects the second phantom vehicle 106 to the TX action 206. For example, the central facility 110a-b may transmit a second challenge packet to be received by the second phantom vehicle 106 at a first time. In response to receiving the second challenge packet, the second phantom vehicle 106 is to transmit a second challenge response at a second time after the first time to the trusted vehicle 108.

In FIG. 4, the central facility 110a-b subjects the first phantom vehicle 104 to the RX action 208. For example, the central facility 110a-b may transmit a first challenge packet to be received by the first phantom vehicle 104 at the second time. In FIG. 4, the first and second challenge packets are different while in other examples they may be the same. If the attack vehicle 128 is generating the phantom vehicles 104, 106, then the first phantom vehicle 104 cannot complete the RX action 208 at the same time that the second phantom vehicle 106 is to complete the TX action 206 because the phantom vehicles 104, 106 are generated by the same half-duplex radio of the attack vehicle 128. Accordingly, the central facility 110a-b can determine that the candidate phantom vehicles are phantom vehicles, such as the phantom vehicles 104, 106, based on at least one of the central facility 110a-b not receiving a first challenge response from the first phantom vehicle 104 or the trusted vehicle 108 not receiving the second challenge response from the second phantom vehicle 106. For example, the V2X controller 100 of the trusted vehicle 108 may transmit a challenge report (e.g., a challenge response report) to the central facility 110a-b that corresponds to one or more messages that include an indication that the trusted vehicle 108 did not receive the second challenge response, the second challenge response did not match an expected second challenge response, etc. Alternatively, the phantom vehicles 104, 106 may be detected using the method or process of FIG. 4 without involving the trusted vehicle 108 or the central facility 110a-b.

Figure 5:
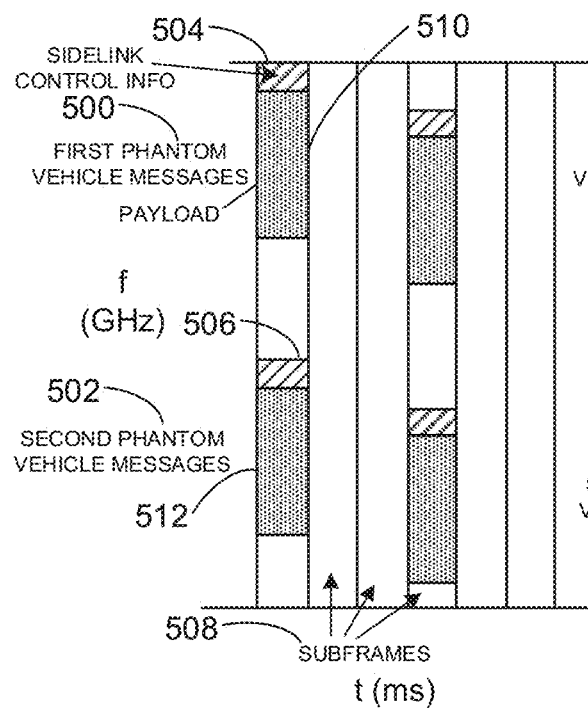
FIG. 5 is a schematic illustration of first example wireless messages associated with the example attacker of FIGS. 1-4 and second example wireless messages associated with one of the example phantom vehicles of FIGS. 1-4 that are created in the same subframe.

FIG. 5 is a schematic illustration of first example wireless messages 500 associated with the first phantom vehicle 104 of FIGS. 1-4 and second example wireless messages 502 associated with the second phantom vehicle 106 of FIGS. 1-4, where the first and second wireless messages 500, 502 are created in the same subframe. For example, the attack vehicle 128 may generate the first wireless messages 500 with first V2X credentials (e.g., first valid V2X credentials that have been stolen from a first compromised vehicle) and generate the second wireless messages 502 with second V2X credentials (e.g., second valid V2X credentials that have been stolen from a second compromised vehicle different from the first compromised vehicle).

In the illustrated example of FIG. 5, the wireless messages 500, 502 include example sidelink control information (SCI) 504, 506. The SCI 504, 506 corresponds to information in SCI format that a radio may require to be able to receive and demodulate a wireless message. For example, the SCI 504, 506 may correspond to and/or otherwise include scheduling information that a radio may use to schedule a transmission or a reception of wireless data. The SCI 504, 506 may include one or more parameters including a frequency band hopping parameter, a resource allocation parameter, etc.

In FIG. 5, the first wireless messages 500 include first example SCI 504 and the second wireless messages 502 include second example SCI 506. For example, the attack vehicle 128 may transmit the first and second wireless messages 500, 502 to the victim vehicle 102. The victim vehicle 102 may receive and interpret the first and second wireless messages 500, 502 based on respective ones of the first and second SCI 504, 506. For example, the victim vehicle 102 may interpret the first and second wireless messages 500, 502 as coming from the first and second phantom vehicles 104, 106, respectively.

In the illustrated example of FIG. 5, the first wireless messages 500 and the second wireless messages 502 are disposed in example subframes 508. The subframes 508 correspond to divisions or portions of a wireless frame. For example, twenty of the subframes 508 may correspond to one wireless frame. Each of the subframes 508 have a specified time duration. For example, each of the subframes 508 may span 10 milliseconds (ms). Each of the subframes 508 is also function of frequency. For example, the subframes 508 may span the Intelligent Transportation Systems (ITS) band from 5.85 gigahertz (GHz) to 5.925 GHz. In FIG. 5, a first wireless message 510 of the wireless messages 500 is at a first one of the subframes 508 and may correspond to a frequency of 5.925 GHz. Alternatively, the first wireless message 510 may be transmitted using a different frequency.

In the illustrated example of FIG. 5, the attack vehicle 128 is generating the first and second wireless messages 500, 502 in the same subframes 508. For example, the attack vehicle 128 may transmit (1) the first wireless message 510 as coming from the first phantom vehicle 104 in a first one of the subframes 508 and (2) a second example wireless message 512 as coming from the second phantom vehicle 106 in the first one of the subframes 508. In the illustrated example of FIG. 5, the V2X controller 100 can determine that the first wireless message 510 and the second wireless message 512 are from candidate phantom vehicles based on the first and second wireless messages 510, 512 being in the same subframe.

Figure 6:
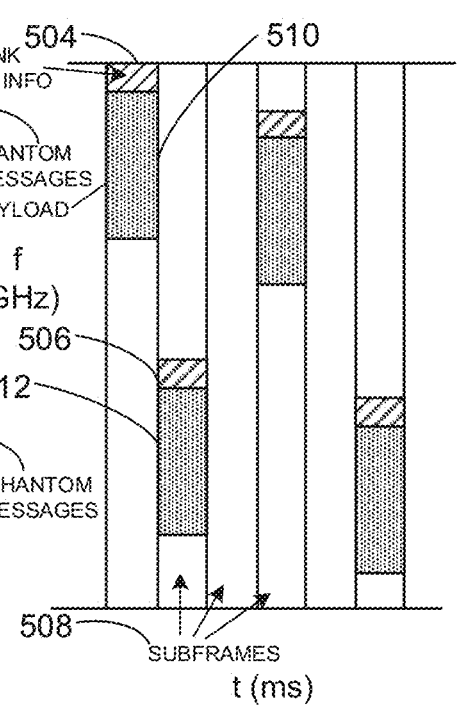
FIG. 6 is a schematic illustration of the first example wireless messages of FIG. 5 associated with the example attacker of FIGS. 1-4 and the second example wireless messages of FIG. 5 associated with the example phantom vehicles of FIGS. 1-4 that are created in different subframes.

Alternatively, the attack vehicle 128 may transmit (1) the first wireless message 510 as coming from the first phantom vehicle 104 in the first one of the subframes 508 and (2) the second wireless message 512 as coming from the second phantom vehicle 106 in a second one of the subframes 508 as depicted in the illustrated example of FIG. 6. In the illustrated example of FIG. 6, the V2X controller 100 can determine that the first wireless message 510 and the second wireless message 512 are from candidate phantom vehicles based on the first and second wireless messages 510, 512 being in neighboring subframes (e.g., an immediately preceding or an immediately following subframe), proximate subframes (e.g., two or fewer subframes apart, three or fewer subframes apart, etc.), etc.

Figure 7:
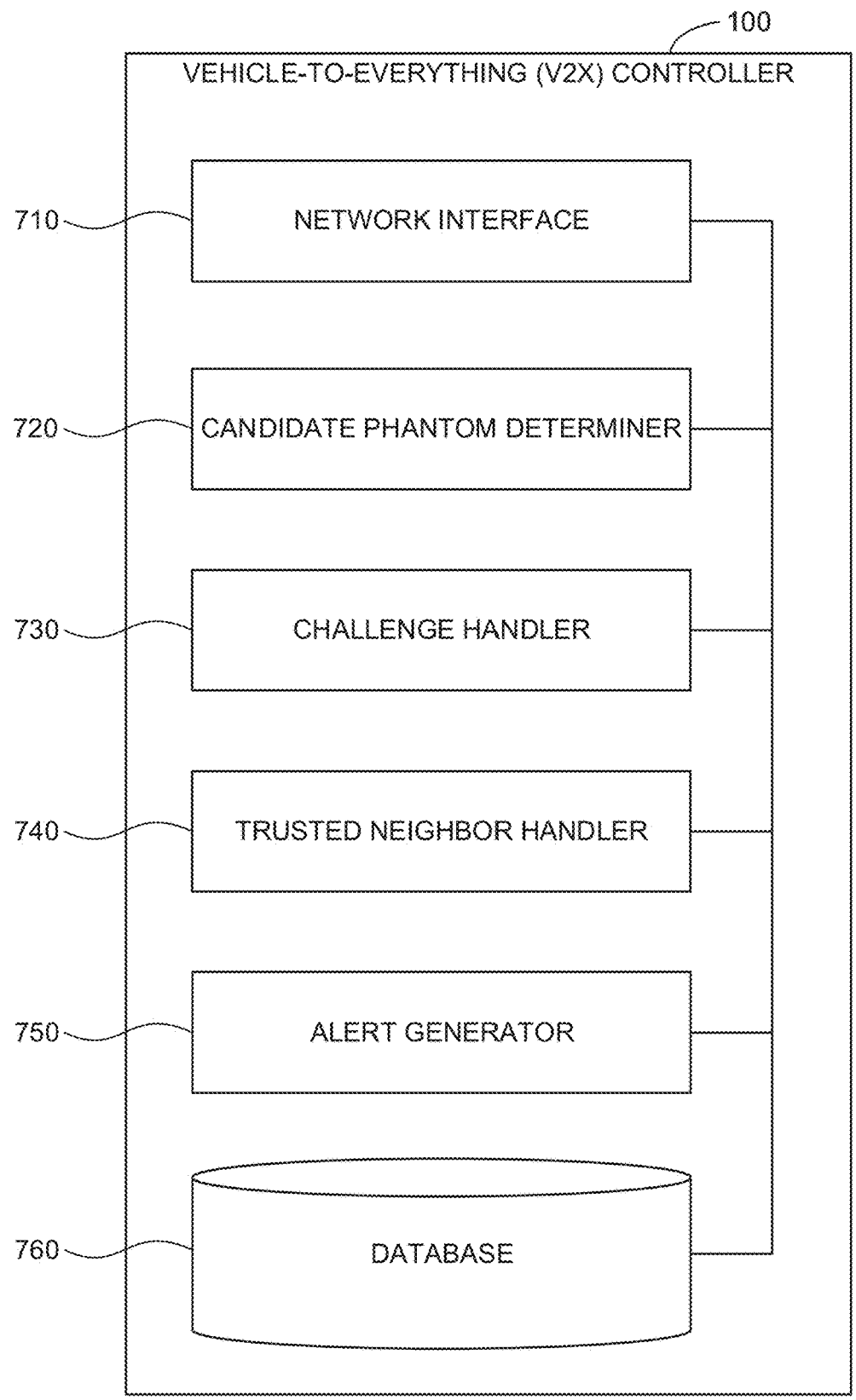
FIG. 7 is a block diagram of an example implementation of the example V2X controller of FIGS. 1-4 to implement the examples disclosed herein.

FIG. 7 is a block diagram of an example implementation of the V2X controller 100 of FIGS. 1-4 to facilitate the identification of an attack on the intelligent transportation system 114 by the phantom vehicles 104, 106 of FIGS. 1-4. The V2X controller 100 attempts to authenticate a vehicle in the network 116, such as the phantom vehicles 104, 106 of FIGS. 1-4. In the illustrated example of FIG. 7, the V2X controller 100 includes an example network interface 710, an example candidate phantom determiner 720, an example challenge handler 730, an example trusted neighbor handler 740, an alert generator 750, and a first example database 760.

In the illustrated example of FIG. 7, the V2X controller 100 includes the network interface 710 to obtain information from and/or transmit information to an entity of the intelligent transportation system 114 of FIG. 1. For example, the network interface 710 may receive data from and/or transmit data to the victim vehicle 102, the phantom vehicles 104, 106, the network 116, the roadside units 120, 122, the computing device 124, and/or the attack vehicle 128 of FIG. 1.

In some examples, the network interface 710 implements means for interfacing with the V2X network 116 and/or, more generally, the intelligent transportation system 114 of FIG. 1. In some examples, the interfacing means interfaces and/or otherwise facilitates communication with the network 116 to receive and/or transmit executables, packets, messages, etc. The interfacing means is implemented by executable instructions such as that implemented by at least block 1302 of FIG. 13, block 1502 of FIG. 15, and blocks 1602 and 1608 of FIG. 16, which may be executed on at least one processor such as the example processor 1712 shown in the example of FIG. 17. In other examples, the interfacing means is implemented by hardware logic, hardware implemented state machines, logic circuitry, and/or any other combination of hardware, software, and/or firmware.

In some examples, the network interface 710 interfaces with the network 116, the radio 117, etc., of FIG. 1. In some examples, the network interface 710 implements a web server that receives V2X messages from, transmits V2X messages to, etc., the network 116. For example, the information managed by the network interface 710 may be formatted as one or more HTTP messages. However, any other message format and/or protocol may additionally or alternatively be used such as, for example, a file transfer protocol (FTP), a simple message transfer protocol (SMTP), an HTTP secure (HTTPS) protocol, etc.

In some examples, the network interface 710 implements a half-duplex radio that receives V2X messages from, transmits V2X messages to, etc., another entity of the intelligent transportation system 114. For example, the information managed by the network interface 710 may be formatted using Dedicated Short Range Communications (DSRC), Cellular V2X (C-V2X) communications, etc. In such examples, the network interface 710 can use a specified bandwidth (e.g., 50 megahertz (MHz), 75 MHz, 100 MHz, etc.) at a specified ITS band (e.g., 5.8 GHz ITS band, 5.9 GHz ITS band, etc.).

In the illustrated example of FIG. 7, the V2X controller 100 includes the candidate phantom determiner 720 to identify candidate phantom vehicles in the intelligent transportation system 114. In some examples, the candidate phantom determiner 720 implements means for identifying a candidate phantom vehicle. The identifying means is implemented by executable instructions such as that implemented by at least block 1302 of FIG. 13, block 1502 of FIG. 15, and block 1602 of FIG. 16, which may be executed on at least one processor such as the example processor 1712 shown in the example of FIG. 17. In other examples, the identifying means is implemented by hardware logic, hardware implemented state machines, logic circuitry, and/or any other combination of hardware, software, and/or firmware.

In some examples, the candidate phantom determiner 720 identifies one or more of the phantom vehicles 104, 106 as a candidate phantom vehicle based on a signal quality, a signal-to-noise ratio, a frequency band, a subframe (e.g., two or more messages received during the same subframe, a neighboring subframe, a proximate subframe, etc.), a subchannel, etc., associated with V2X messages of the phantom vehicles 104, 106. For example, the candidate phantom determiner 720 may determine that a first wireless message from the first phantom vehicle 104 has a first signal-to-noise ratio of 7.4 and a second wireless message from the second phantom vehicle 106 has a second signal-to-noise ratio of 7.5. In such examples, the candidate phantom determiner 720 may identify that the first and second phantom vehicles 104, 106 are candidate phantom vehicles based on the comparison of the first and second signal-to-noise ratio. In response to identifying one or more candidate phantom vehicles, the candidate phantom determiner 720 may transmit information associated with the one or more candidate phantom vehicles to the central facility 110*a-b*. In such examples, the candidate phantom determiner 720 can invoke the network interface 710 to transmit a subchannel number, a subframe number, etc., to the central facility 110*a-b* to identify the one or more candidate phantom vehicles.

In the illustrated example of FIG. 7, the V2X controller 100 includes the challenge handler 730 to generate challenge packets and evaluate challenge responses. In some examples, the challenge handler 730 implements means for challenging vehicles to test their authenticity. The challenging means is implemented by executable instructions such as that implemented by at least block 1310 of FIG. 13, blocks 1402, 1404, 1406, 1408, 1410, 1412, 1414 of FIG. 14, and blocks 1604, 1606, 1608, 1610, 1612, and 1614 of FIG. 16, which may be executed on at least one processor such as the example processor 1712 shown in the example of FIG. 17. In other examples, the challenging means is implemented by hardware logic, hardware implemented state machines, logic circuitry, and/or any other combination of hardware, software, and/or firmware. The challenge handler 730 does not disable normal collision prevention systems, such as a camera system, a LIDAR system, etc., included in and/or otherwise associated with the vehicles 102, 108, which provide safety in the event the challenge handler 730 proves to be in error so that a misidentified phantom vehicle may still be detected and avoided.

In some examples, the challenge handler 730 facilitates challenging vehicles by facilitating a transmission of a challenge packet and/or facilitating a receipt of a challenge response. For example, the challenge handler 730 may use timing-based challenge messages to attempt authentication of the phantom vehicles 104, 106 of FIG. 1. In some examples, the challenge handler 730 generates a challenge packet and invokes the network interface 710 to transmit the challenge packet to a candidate phantom vehicle. For example, the challenge handler 730 may generate the challenge packet in accordance with a symmetric key cryptographic operation. In such examples, the challenge handler 730 can generate the challenge packet to include basic system information, driving attributes, a time stamp, a nonce value, etc. In other examples, the challenge handler 730 may generate the challenge packet in accordance with a PKI or asymmetric key operation. For example, the challenge handler 730 may generate the challenge packet to include the nonce value based on a private key.

The challenge handler 730 of FIG. 7 can transmit the challenge packet to cause and/or otherwise instruct the challenged candidate phantom vehicle to transmit a challenge response (e.g., an acknowledgment packet) at a specific time, after a quantity of subframes have elapsed, etc., where the challenge response includes a signature of the nonce included in the challenge packet based on a private key of the challenged candidate phantom vehicle. In such examples, the challenge handler 730 can allocate transmission resources to the challenged candidate phantom vehicle by directing the challenged candidate phantom vehicle to operate in the TX mode at a time specified by the challenge packet.

In some examples, the challenge handler 730 generates challenge packets based on frequency band hopping patterns (also referred to herein as "frequency hopping patterns" or "hopping patterns" and are used interchangeable). For example, V2X communication protocols can support sets of frequency band hopping patterns in FHSS based on the repeated switching of frequencies during radio transmission, which can be used to reduce interference and avoid interception. In FHSS, the transmitter (e.g., the network interface 710) hops between available narrowband frequencies within a specified broad channel in a pseudo-random sequence, of frequency band hopping pattern, known to both sender and receiver. In this example, the challenge handler 730 can generate a challenge packet that directs a candidate phantom vehicle to generate a challenge response based on a frequency band hopping pattern. The challenge packet may include SCI specifying the frequency band hopping pattern and the challenge packet can instruct the candidate phantom vehicle to generate the challenge response based on the frequency band hopping pattern. In such examples, a short burst of data corresponding to one or more messages is transmitted on the current narrowband channel, then the transmitter and responder tune to the next frequency based on the frequency band hopping pattern to process the next burst of data.

In some examples, the challenge handler 730 performs a first authentication process of the phantom vehicles 104, 106 based on scheduling conflicting protocol actions (e.g., by using timing-based challenge messages) without performing a second authentication process of the phantom vehicles 104, 106 based on frequency band hopping patterns (e.g., by using frequency hopping based challenge messages). For example, the challenge handler 730 may perform the first authentication process of the phantom vehicles 104, 106 without forcing or attempting to force a half-duplex radio of the attacker 128 generating the phantom vehicles 104, 106 to fail to respond due to being unable to transmit V2X messages at different frequencies at the same time. In other examples, the challenge handler 730 performs the second authentication process and does not perform the first authentication process. For example, the challenge handler 730 may perform the second authentication process of the phantom vehicles 104, 106 without forcing or attempting to force a half-duplex radio of the attacker 128 generating the phantom vehicles 104, 106 to fail to respond due to being unable to transmit a first V2X message and receive a second V2X message at the same time.

In some examples, the challenge handler 730 performs the first authentication process and the second authentication process of the phantom vehicles 104, 106 sequentially. For example, the challenge handler 730 may perform the second authentication process of the phantom vehicles 104, 106 when the first authentication process fails, or vice versa. In some examples, the challenge handler 730 performs the first and second authentication processes concurrently. For example, the challenge handler 730 may perform the first and second authentication processes of the phantom vehicles 104, 106 within a specified time period (e.g., within one minute of each other, within 10 or fewer subframes of each other, etc.). In such examples, the challenge handler 730 may perform the authentication processes concurrently by (1) transmitting a first challenge packet at a first time to the first phantom vehicle 104 to request a first challenge response at a second time after the first time and (2) transmitting a second challenge packet to the first phantom vehicle 104 at a first frequency at the first time or a time between the first and second times to request a second challenge response at a second frequency different from the first frequency at the second time or a time after the second time. In such examples, the challenge handler 730 may (1) transmit a third challenge packet at the second time to the second phantom vehicle 106 to request a third challenge response at a third time after the second time and (2) transmit a fourth challenge packet to the second phantom vehicle 106 at a third frequency at the second time or a time between the second and third times to request a fourth challenge response at a fourth frequency different from the third frequency at the third time or a time after the third time. The challenge handler 730 may compare (1) the first challenge response to a first expected challenge response, (2) the second challenge response to a second expected challenge response, (3) the third challenge response to a third expected challenge response, and (4) the fourth challenge response to a fourth expected challenge response. The challenge handler 730 may repeat transmitting the first through fourth challenge packets when at least one of the first through fourth challenge responses does not match respective one(s) of the first through fourth expected challenge responses. Alternatively, the challenge handler 730 may determine that the phantom vehicles 104, 106 are genuine vehicles when the first through fourth challenge responses match the first through fourth expected challenge responses.

In some examples, if there are 6 wireless bands available (e.g., 6 ITS bands) for communications and a 3 slots long hopping pattern is used, then 120 hopping patterns are available (e.g., $P_6^3$=120 hopping patterns). The challenge handler 730 may apply frequency band hopping patterns to DSRC, C-V2X communications, etc. In the example of DSRC, the challenge handler 730 may direct the network interface 710 to transmit V2X messages using a 75 MHz bandwidth at the 5.9 GHz ITS band. The challenge handler 730 may divide the 75 MHz bandwidth into 7 channels with 10 MHz bandwidth. Alternatively, other bandwidths, a different quantity of channels and corresponding bandwidths, etc., may be used.

In the example of the victim vehicle 102 coordinating with the trusted vehicle 108, the challenge handler 730 of the victim vehicle 102 may specify different frequency band hopping patterns for different candidate phantom vehicles. For example, the challenge handler 730 may use frequency hopping based challenge messages to attempt authentication of the phantom vehicles 104, 106 of FIG. 1. In such examples, the challenge handler 730 of the victim vehicle 102 can specify a first frequency band hopping pattern for a first candidate phantom vehicle (e.g., the phantom vehicle 104) and a second frequency band hopping pattern for a second candidate phantom vehicle (e.g., the second phantom vehicle 106). In other examples, the challenge handler 730 of the trusted vehicle 108 can specify the different frequency band hopping patterns for the different candidate phantom vehicles.

Because the attacker 128 cannot communicate with the victim vehicle 102 and the trusted vehicle 108 using different hopping patterns using the same radiofrequency hardware (e.g., the same half-duplex radio), the victim vehicle 102 and/or the trusted vehicle 108 can determine whether one or more of the candidate phantom vehicles are phantom vehicles when one or more of the challenges fail. For example, the victim vehicle 102 may transmit a first challenge packet at a first frequency (e.g., a first frequency hopping based challenge message) to the half-duplex radio associated with the first phantom vehicle 104 to direct the half-duplex radio to transmit a first challenge response at a second frequency different from the first frequency based on a first hopping pattern specified in the SCI included in the first challenge packet. In such examples, the trusted vehicle 108 may transmit a second challenge packet at a third frequency (e.g., a second frequency hopping based challenge message) to the half-duplex radio associated with the second phantom vehicle 106 to direct the half-duplex radio to transmit a second challenge response at a fourth frequency different from the third frequency based on a second hopping pattern different from the first hopping pattern specified in the SCI included in the second challenge packet. If the half-duplex radio for the phantom vehicles 104, 106 are the same, then the half-duplex radio will (1) transmit the first challenge response at the second frequency and not transmit the second challenge response at all, (2) transmit the second challenge response at the fourth frequency and not transmit the first challenge response at all, or (3) not transmit either the first or second challenge responses because the half-duplex radio is unable to handle receipt and/or processing of both challenge packets at the same time.

In some examples, the challenge handler 730 compares a challenge response to an expected challenge response. For example, the challenge handler 730 may compare a challenge response (e.g., a response packet including a cryptographic proof, a signed nonce value, etc.) from a candidate phantom vehicle to an expected challenge response (e.g., an expected cryptographic proof, an expected signed nonce value, etc.) generated and/or otherwise determined by the challenge handler 730. In some examples, the challenge handler 730 determines whether a challenge has failed. For example, the challenge handler 730 may determine that a challenge is successful when the challenge response matches the expected challenge response. In other examples, the challenge handler 730 can determine that a challenge has failed when the challenge response does not match the expected challenge response, such as when the challenge handler 730 does not receive the challenge response after a time-out period or duration has elapsed, or the challenge response and the expected challenge response are generated using different cryptographic algorithms, operations, etc.

In some examples, the challenge handler 730 generates a challenge report based on the challenge response from a candidate phantom vehicle. In some examples, the challenge report corresponds to one or more V2X messages indicative of whether a challenge is successful. For example, the challenge handler 730 may generate a challenge report including an indication that the challenge failed when the challenge response does not match the expected challenge response. In other examples, the challenge handler 730 can generate a challenge report indicative of the failed challenge when the challenge handler 730 does not receive the challenge response at an expected time, after an expected quantity of subframes have elapsed, etc. In yet other examples, the challenge handler 730 can generate a challenge report indicative of a successful challenge when the challenge response matches the expected challenge response.

In some examples, the challenge handler 730 compares outcomes of a first challenge and/or a second challenge. For example, the challenge handler 730 may compare a first challenge corresponding to the first phantom vehicle 104 receiving the first challenge packet and transmitting the first challenge response. The challenge handler 730 may compare a second challenge corresponding to the second phantom vehicle 106 receiving the second challenge packet, transmitting the second challenge response to the trusted vehicle 108, the central facility 110a-b, etc., causing a respective one of the trusted vehicle 108, the central facility 110a-b, etc., to generate a challenge report. In such examples, the challenge handler 730 can compare a first outcome corresponding to whether the first challenge failed or succeeded to a second outcome corresponding to whether the second challenge failed or succeeded, where the second outcome is based on the challenge report. In some examples, the challenge handler 730 determines that an overall challenge (e.g., a challenge including the first and second challenges) is successful based on the first outcome of success matching the second outcome of success. In other examples, the challenge handler 730 can determine that the overall challenge failed based on the first outcome of failure not matching the second outcome of failure, or the first and second outcomes both being failures.

In the illustrated example of FIG. 7, the V2X controller 100 includes the trusted neighbor handler 740 to identify a trusted vehicle, such as the trusted vehicle 108 of FIGS. 1 and 3-4, and coordinate with the trusted vehicle to authenticate one or more candidate phantom vehicles in the intelligent transportation system 114. In some examples, the trusted neighbor handler 740 implements means for selecting a trusted neighbor. The selecting means is implemented by executable instructions such as that implemented by at least block 1402 of FIG. 14 and block 1602 of FIG. 16, which may be executed on at least one processor such as the example processor 1712 shown in the example of FIG. 17. In other examples, the selecting means is implemented by hardware logic, hardware implemented state machines, logic circuitry, and/or any other combination of hardware, software, and/or firmware.

In some examples, the trusted neighbor handler 740 identifies the trusted vehicle 108 by performing one or more asymmetric or symmetric cryptographic operations as described above in connection with the challenge handler 730. For example, the trusted neighbor handler 740 of the victim vehicle 102 may request the trusted vehicle 108 to compute a MAC based on a symmetric key, transmit a signed nonce value based on an asymmetric key, etc. For example, the trusted neighbor handler 740 may identify a first candidate trusted vehicle (e.g., the trusted vehicle 108) of one or more candidate trusted vehicles in the V2X network 116. In such examples, the trusted neighbor handler 740 can identify the first candidate trusted vehicle by transmitting ping or query packets to neighboring or proximate vehicles in the intelligent transportation system 114. The trusted neighbor handler 740 may generate a first MAC based on a nonce value. The trusted neighbor handler 740 may transmit an authentication packet to the first candidate trusted vehicle, where the authentication packet includes the nonce value. In response to transmitting the authentication packet to the first candidate trusted vehicle, the first candidate trusted vehicle is invoked to transmit an authentication response. In response to receiving the authentication response from the first candidate trusted vehicle, the trusted neighbor handler 740 may compare the first MAC to a second MAC included in the authentication response. The second MAC is to be generated by the first candidate trusted vehicle in response to receiving the authentication packet. The trusted neighbor handler 740 may generate a trusted vehicle list including the first candidate trusted vehicle when the first MAC matches the second MAC. In such examples, the trusted neighbor handler 740 can select the first candidate trusted vehicle to transmit the second challenge packet when the first candidate trusted vehicle is included in the trusted vehicle list.

In some examples, the trusted neighbor handler 740 of the victim vehicle 102 can identify the trusted vehicle 108 by confirming an existence of the trusted vehicle 108 with one or more sensors. For example, the trusted neighbor handler 740 may identify the trusted vehicle 108 based on a measurement from one or more cameras, one or more LIDAR sensors, one or more depth sensors, etc., included in and/or otherwise associated with the vehicles 102, 108. In other examples, the trusted neighbor handler 740 of the victim vehicle 102 can query the central facility 110*a-b* for a previously authenticated trusted vehicle. The trusted neighbor handler 740 may store a list of trusted vehicles (e.g., a trusted vehicle list) including the trusted vehicle 108, information associated with an identified trusted vehicle, such as the trusted vehicle 108 of FIGS. 1, 2, and 4, etc., in the first database 760. In some examples, the trusted neighbor handler 740 periodically updates the list of trusted vehicles (e.g., every 10 minutes, every hour, etc.). In other examples, the trusted neighbor handler 740 can update the list of trusted vehicles in response to an event (e.g., entering the road 113 of FIG. 1, exiting the road 113, etc.).

In the illustrated example of FIG. 7, the V2X controller 100 includes the alert generator 750 to generate an alert when a phantom vehicle, a malicious entity, etc., is identified. In some examples, the alert generator 750 implements means for generating an alert. The generating means is implemented by executable instructions such as that implemented by at least block 1416 of FIG. 14 and block 1616 of FIG. 16, which may be executed on at least one processor such as the example processor 1712 shown in the example of FIG. 17. In other examples, the generating means is implemented by hardware logic, hardware implemented state machines, logic circuitry, and/or any other combination of hardware, software, and/or firmware.

In some examples, the alert generator 750 generates an alert to an entity of the intelligent transportation system 114, such as the trusted vehicle 108, the roadside units 120, 122, etc., that the phantom vehicles 104, 106 are not genuine vehicles. In some examples, the alert includes an instruction to drop and/or otherwise ignore V2X messages from the phantom vehicles 104, 106. In some examples, the alert generator 750 instructs an entity of the intelligent transportation system 114 to change a communication parameter to avoid being compromised by the attacker 128. For example, the alert generator 750 may direct the V2X controller 100 of the trusted vehicle 108 to change a subchannel number, a subframe number, SCI info such as a frequency band hopping parameter, etc. In other examples, the alert generator 750 may direct the V2X controller 100 of the trusted vehicle 108 to adjust a bandwidth, a frequency, etc., being used by the radio 117 of FIG. 1 when transmitting or receiving V2X messages. In some examples, the alert generator 750 invokes the network interface 710 to transmit one or more executables to another entity, such as the trusted vehicle 108, to upgrade the V2X controller 100 of the trusted vehicle 108.

In the illustrated example of FIG. 7, the V2X controller 100 includes the first database 760 to store or record data including the list of trusted vehicles, information associated with trusted vehicles, one or more executables, wireless communication parameters (e.g., a subchannel number, a subframe number, SCI info such as frequency, etc.), etc. The first database 760 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The first database 760 may additionally or alternatively be implemented by one or more double data rate (DDR) memories, such as DDR, DDR2, DDR3, mobile DDR (mDDR), etc. The first database 760 may additionally or alternatively be implemented by one or more mass storage devices such as hard disk drive(s), compact disk drive(s) digital versatile disk drive(s), etc. While in the illustrated example the first database 760 is illustrated as a single database, the first database 760 may be implemented by any number and/or type(s) of databases. Furthermore, the data stored in the first database 760 may be in any data format such as, for example, binary data, comma delimited data, tab delimited data, structured query language (SQL) structures, etc.

While an example manner of implementing the V2X controller 100 of FIGS. 1-4 is illustrated in FIG. 7, one or more of the elements, processes, and/or devices illustrated in FIG. 7 may be combined, divided, re-arranged, omitted, eliminated, and/or implemented in any other way. Further, the example network interface 710, the example candidate phantom determiner 720, the example challenge handler 730, the example trusted neighbor handler 740, the alert generator 750, the first example database 760, and/or, more generally, the example V2X controller 100 of FIGS. 1-4 may be implemented by hardware, software, firmware, and/or any combination of hardware, software, and/or firmware. Thus, for example, any of the example network interface 710, the example candidate phantom determiner 720, the example challenge handler 730, the example trusted neighbor handler 740, the alert generator 750, the first example database 760, and/or, more generally, the example V2X controller 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example network interface 710, the example candidate phantom determiner 720, the example challenge handler 730, the example trusted neighbor handler 740, the alert generator 750, and/or the first example database 760 is/are hereby expressly defined to include a non-transitory computer readable storage device or storage disk such as a memory, a digital versatile disk (DVD), a compact disk (CD), a Blu-ray disk, etc., including the software and/or firmware. Further still, the example V2X controller 100 of FIGS. 1-4 may include one or more elements, processes, and/or devices in addition to, or instead of, those illustrated in FIG. 7, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
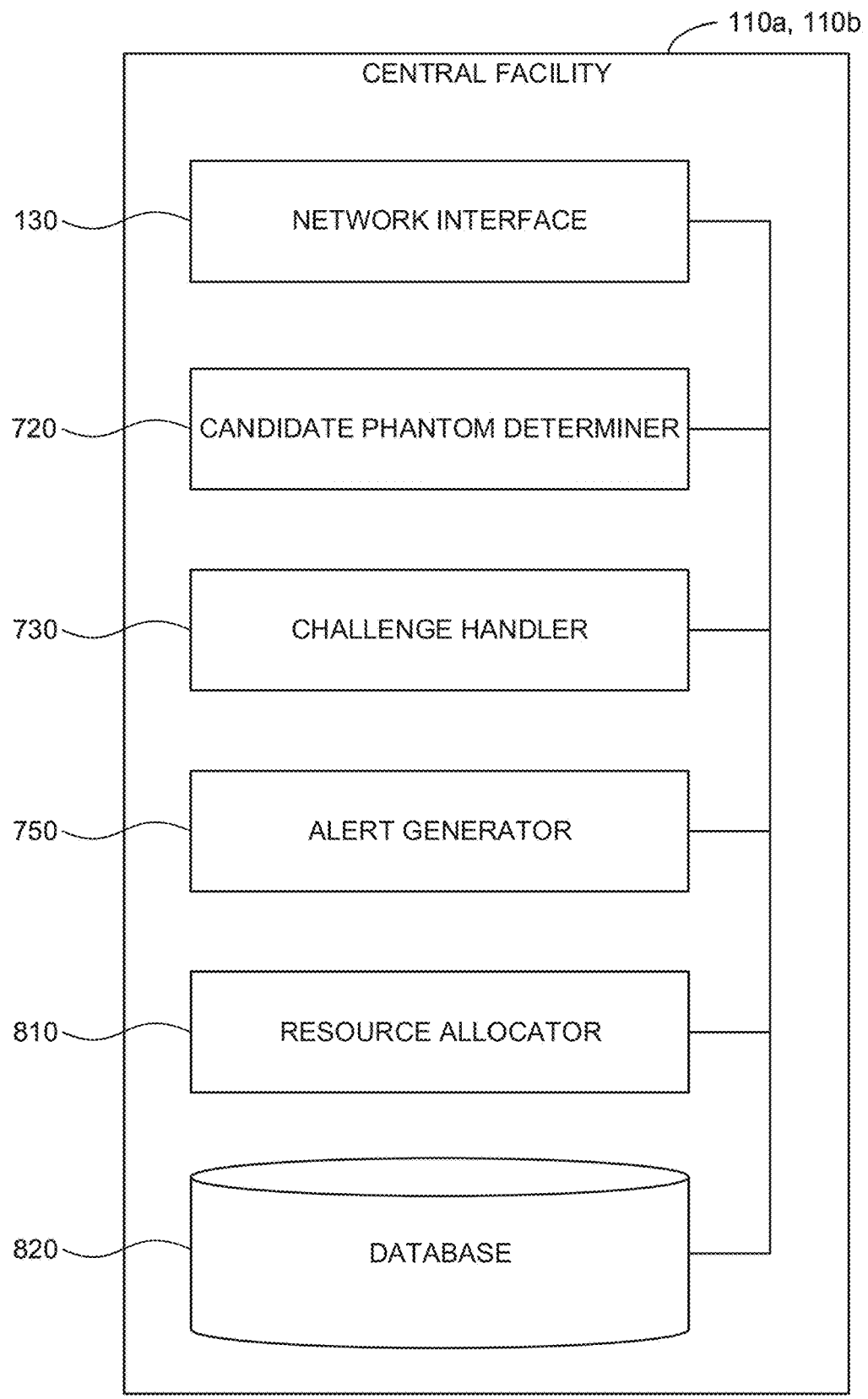
FIG. 8 is a block diagram of an example implementation of the example central facility of FIGS. 1, 2 and 4 to implement the examples disclosed herein.

FIG. 8 is a block diagram of an example implementation of the central facility 110*a-b* of FIGS. 1, 2, and 4 to facilitate the identification of an attack on the intelligent transportation system 114 by the phantom vehicles 104, 106 of FIGS.

1-4. In the illustrated example of FIG. 8, the central facility 110a-b includes the network interface 130 of FIG. 1, the candidate phantom determiner 720 of FIG. 7, the challenge handler 730 of FIG. 7, the alert generator 750 of FIG. 7, an example resource allocator 810, and a second example database 820.

In the illustrated example of FIG. 8, the central facility 110a-b includes the network interface 130 to obtain information from and/or transmit information to an entity of the intelligent transportation system 114 of FIG. 1. For example, the network interface 130 may receive data from and/or transmit data to the victim vehicle 102, the phantom vehicles 104, 106, the network 116, the roadside units 120, 122, the computing device 124, and/or the attack vehicle 128 of FIG. 1.

In some examples, the network interface 130 implements means for interfacing with the V2X network 116. The interfacing means is implemented by executable instructions such as that implemented by at least block 1310 of FIG. 13, which may be executed on at least one processor such as the example processor 1812 shown in the example of FIG. 18. In other examples, the interfacing means is implemented by hardware logic, hardware implemented state machines, logic circuitry, and/or any other combination of hardware, software, and/or firmware.

In some examples, the network interface 130 implements a web server that receives V2X messages from, transmits V2X messages to, etc., the network 116 via one or more of the wireless communication links 112. For example, the information managed by the network interface 130 may be formatted as one or more HTTP messages. However, any other message format and/or protocol may additionally or alternatively be used such as, for example, a file transfer protocol (FTP), a simple message transfer protocol (SMTP), an HTTP secure (HTTPS) protocol, etc. In some examples, the network interface 130 interfaces with wireless messages, such as interfacing with radio messages by implementing a half-duplex radio that receives V2X messages from, transmits V2X messages to, etc., another entity of the intelligent transportation system 114. For example, the information managed by the network interface 130 may be formatted using DSRC, C-V2X, etc. In such examples, the network interface 130 can use a specified bandwidth (e.g., 50 megahertz (MHz), 75 MHz, 100 MHz, etc.) at a specified ITS band (e.g., 5.8 GHz ITS band, 5.9 GHz ITS band, etc.).

In the illustrated example of FIG. 8, the central facility 110a-b includes the candidate phantom determiner 720 to identify candidate phantom vehicles in the intelligent transportation system 114. In some examples, the candidate phantom determiner 720 implements means for identifying a candidate phantom vehicle. The identifying means is implemented by executable instructions such as that implemented by at least block 1304 of FIG. 13 and block 1504 of FIG. 15, which may be executed on at least one processor such as the example processor 1812 shown in the example of FIG. 18. In other examples, the identifying means is implemented by hardware logic, hardware implemented state machines, logic circuitry, and/or any other combination of hardware, software, and/or firmware.

In some examples, the candidate phantom determiner 720 of the central facility 110a-b obtains information associated with the candidate phantom vehicles from the victim vehicle 102. For example, the candidate phantom determiner 720 of the central facility 110a-b may identify one or more of the phantom vehicles 104, 106 as a candidate phantom vehicle based on a signal quality, a signal-to-noise ratio, a frequency band, a subframe (e.g., two or more messages received during the same subframe, a neighboring subframe, a proximate subframe), a subchannel, etc., associated with V2X messages of the phantom vehicles 104, 106. Additionally or alternatively, the candidate phantom determiner 720 of FIG. 8 may implement any other functions, methods, processes, etc., described above in connection with the candidate phantom determiner 720 of FIG. 7.

In the illustrated example of FIG. 8, the central facility 110a-b includes the challenge handler 730 to generate challenge packets and to evaluate challenge responses. In some examples, the challenge handler 730 implements means for challenging vehicles to test their authenticity. The challenging means is implemented by executable instructions such as that implemented by at least blocks 1308, 1312, 1314, and 1316 of FIG. 13 and blocks 1508, 1510, 1512, 1514, and 1516 of FIG. 15, which may be executed on at least one processor such as the example processor 1812 shown in the example of FIG. 18. In other examples, the challenging means is implemented by hardware logic, hardware implemented state machines, logic circuitry, and/or any other combination of hardware, software, and/or firmware.

In some examples, the challenge handler 730 generates a challenge packet and invokes the network interface 130 to transmit the challenge packet to a candidate phantom vehicle. For example, the challenge handler 730 may use timing-based challenge messages to authenticate a candidate phantom vehicle. The challenge handler 730 of the central facility 110a-b may instruct the first phantom vehicle 104 to perform the TX action 206 or the RX action 208 of FIGS. 2-4. In such examples, the challenge handler 730 can transmit the challenge packet to the first phantom vehicle 104 to perform the RX action 208. In other examples, the challenge handler 730 can transmit the challenge packet to the second phantom vehicle 106 to perform the TX action 206.

In some examples, the challenge handler 730 generates challenge packets based on frequency band hopping patterns. For example, the challenge handler 730 may use frequency hopping based challenge messages to authenticate a candidate phantom vehicle. In the example of the victim vehicle 102 coordinating with the central facility 110a-b, the challenge handler 730 of the central facility 110a-b may specify different hopping patterns for different candidate phantom vehicles. For example, the challenge handler 730 of the central facility 110a-b may specify a first hopping pattern for a first candidate phantom vehicle (e.g., the phantom vehicle 104) and a second hopping pattern for a second candidate phantom vehicle (e.g., the second phantom vehicle 106). In other examples, the challenge handler 730 of the victim vehicle 102 may specify the different hopping patterns for the different candidate phantom vehicles. Because the attacker 128 cannot communicate with the victim vehicle 102 and the central facility 110a-b using different hopping patterns using the same radiofrequency hardware (e.g., the same half-duplex radio), the victim vehicle 102 and/or the central facility 110a-b can determine whether one or more of the candidate phantom vehicles are phantom vehicles when one or more of the respective challenges fail.

In some examples, the challenge handler 730 of the central facility 110a-b identifies a phantom vehicle based on a challenge response from a candidate phantom vehicle. For example, the challenge handler 730 may compare a cryptographic proof, a signed nonce value, etc., to an expected cryptographic proof, an expected signed nonce value, etc. For example, the challenge handler 730 may determine that the candidate phantom vehicle is a phantom vehicle, such as one of the phantom vehicles 104, 106, when the cryptographic proof, the signed nonce value, etc., does not match the expected cryptographic proof, the expected signed nonce value, etc. In other examples, the challenge handler 730 can determine that the candidate phantom vehicle is a phantom vehicle when the challenge handler 730 does not receive the challenge response at an expected time, after an expected quantity of subframes have elapsed, etc. Additionally or alternatively, the challenge handler 730 of FIG. 8 may implement any other functions, methods, processes, etc., described above in connection with the challenge handler 730 of FIG. 7.

In the illustrated example of FIG. 8, the central facility 110a-b includes the alert generator 750 to generate an alert when a phantom vehicle, a malicious entity, etc., is identified. In some examples, the alert generator 750 implements means for generating an alert. The generating means is implemented by executable instructions such as that implemented by at least block 1318 of FIG. 13 and block 1518 of FIG. 15, which may be executed on at least one processor such as the example processor 1812 shown in the example of FIG. 18. In other examples, the generating means is implemented by hardware logic, hardware implemented state machines, logic circuitry, and/or any other combination of hardware, software, and/or firmware.

In some examples, the alert generator 750 implements generates an alert to an entity of the intelligent transportation system 114, such as the victim vehicle 102, the trusted vehicle 108, the roadside units 120, 122, etc., that the phantom vehicles 104, 106 are not genuine vehicles and to drop and/or otherwise ignore V2X messages from the phantom vehicles 104, 106. In some examples, the alert generator 750 instructs an entity of the intelligent transportation system 114 to change a communication parameter to avoid being compromised by the attacker 128. For example, the alert generator 750 may direct the V2X controller 100 of the victim vehicle 102, the trusted vehicle 108, etc., to change a subchannel number, a subframe number, SCI info such as a frequency band hopping parameter, etc. In other examples, the alert generator 750 may direct the V2X controller of the victim vehicle 102, the trusted vehicle 108, etc., to adjust a bandwidth, a frequency, etc., being used when transmitting or receiving V2X messages.

In some examples, the alert generator 750 of the central facility 110a-b invokes the network interface 130 to transmit one or more executables to another entity, such as the victim vehicle 102, the trusted vehicle 108, etc., to upgrade the V2X controller 100 of the victim vehicle 102, the trusted vehicle 108, etc. For example, the central facility 110a-b may transmit one or more executables to the victim vehicle 102, the trusted vehicle 108, the roadside units 120, 122, etc., when an attack (e.g., an attack, a network intrusion, etc., by the attacker 128) is detected. Additionally or alternatively, the alert generator 750 of FIG. 8 may implement any other functions, methods, processes, etc., described above in connection with the alert generator 750 of FIG. 7.

In the illustrated example of FIG. 8, the central facility 110a-b includes the resource allocator 810 to allocate wireless resources in the intelligent transportation system 114. In some examples, the resource allocator 810 implements means for allocating receiving and/or transmission resources. The allocating means is implemented by executable instructions such as that implemented by at least block 1306 of FIG. 13 and block 1506 of FIG. 15, which may be executed on at least one processor such as the example processor 1812 shown in the example of FIG. 18. In other examples, the allocating means is implemented by hardware logic, hardware implemented state machines, logic circuitry, and/or any other combination of hardware, software, and/or firmware.

In some examples, the resource allocator 810 allocates wireless resources for reception. For example, the resource allocator 810 may allocate first wireless resources to the first phantom vehicle 104 for the RX action 208. In some examples, the resource allocator 810 allocates wireless resources for transmission. For example, the resource allocator 810 may allocate second wireless resources to the second phantom vehicle 106 for the TX action 206. In some examples, the resource allocator 810 can allocate wireless resources by ensuring that no other entities in the intelligent transportation system 114 is transmitting or receiving on a specified subchannel, subframe, etc., during a specified time period corresponding to the allocated wireless resources. In other examples, the resource allocator 810 can allocate resources by sending a V2X message including SCI that specifies a subchannel, a subframe, etc., for the phantom vehicles 104, 106 to use when receiving or transmitting V2X messages. In some examples, the SCI directs the phantom vehicles 104, 106 to operate in the TX mode or the RX mode at a specific time or for a specified time duration.

In the illustrated example of FIG. 8, the central facility 110a-b includes the second database 820 to store or record data including the list of trusted vehicles, information associated with trusted vehicles, one or more executables, wireless communication parameters of an entity of the intelligent transportation system 114 (e.g., a subchannel number, a subframe number, SCI info such as frequency, etc.), etc. The second database 820 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The second database 820 may additionally or alternatively be implemented by one or more double data rate (DDR) memories, such as DDR, DDR2, DDR3, mobile DDR (mDDR), etc. The second database 820 may additionally or alternatively be implemented by one or more mass storage devices such as hard disk drive(s), compact disk drive(s) digital versatile disk drive(s), etc. While in the illustrated example the second database 820 is illustrated as a single database, the second database 820 may be implemented by any number and/or type(s) of databases. Furthermore, the data stored in the second database 820 may be in any data format such as, for example, binary data, comma delimited data, tab delimited data, structured query language (SQL) structures, etc.

While an example manner of implementing the central facility 110a-b of FIGS. 1, 2, and 4 is illustrated in FIG. 8, one or more of the elements, processes, and/or devices illustrated in FIG. 8 may be combined, divided, re-arranged, omitted, eliminated, and/or implemented in any other way. Further, the example network interface 130, the example candidate phantom determiner 720, the example challenge handler 730, the example alert generator 750, the example resource allocator 810, the example database 820, and/or, more generally, the example central facility 110a-b of FIGS. 1, 2, and 4 may be implemented by hardware, software, firmware, and/or any combination of hardware, software, and/or firmware. Thus, for example, any of the example network interface 130, the example candidate phantom determiner 720, the example challenge handler 730, the example alert generator 750, the example resource allocator 810, the example database 820, and/or, more generally, the example central facility 110a-b could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example network interface 130, the example candidate phantom determiner 720, the example challenge handler 730, the example alert generator 750, the example resource allocator 810, and/or the example database 820 is/are hereby expressly defined to include a non-transitory computer readable storage device or storage disk such as a memory, a digital versatile disk (DVD), a compact disk (CD), a Blu-ray disk, etc., including the software and/or firmware. Further still, the example central facility 110a-b of FIGS. 1, 2, and 4 may include one or more elements, processes, and/or devices in addition to, or instead of, those illustrated in FIG. 8, and/or may include more than one of any or all of the illustrated elements, processes, and devices.

Data diagrams and flowcharts representative of example hardware logic, machine readable instructions, hardware implemented state machines, and/or any combination thereof for implementing the V2X controller 100 of FIGS. 1-4 and 7 and/or the central facility 110a-b of FIGS. 1, 2, 4, and 8 are shown in FIGS. 9-16. The machine readable instructions may be an executable program or portion of an executable program for execution by a computer processor such as a first example processor 1712 and/or a second example processor 1812 shown in the example processor platforms 1700, 1800 discussed below in connection with FIGS. 17 and/or 18. The program may be embodied in software stored on a non-transitory computer readable storage medium such as a CD-ROM, a floppy disk, a hard drive, a DVD, a Blu-ray disk, or a memory associated with the processors 1712, 1812, but the entire program and/or parts thereof could alternatively be executed by a device other than the processors 1712, 1812 and/or embodied in firmware or dedicated hardware. Further, although the example program is described with reference to the data diagrams and flowcharts illustrated in FIGS. 9-16, many other methods of implementing the example V2X controller 100 and/or the central facility 110a-b may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 9-16 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 9:
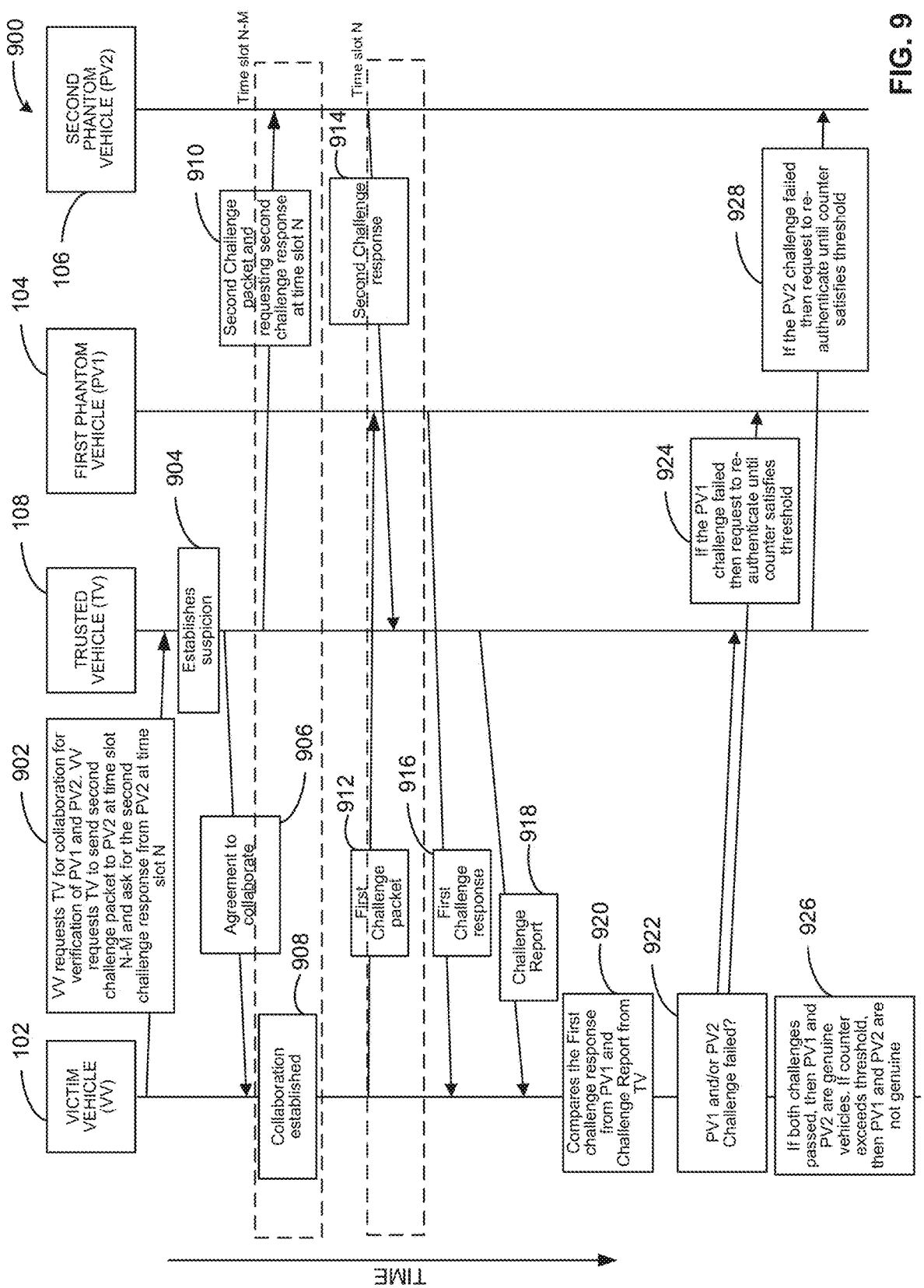
FIG. 9 is an example data flow diagram representative of the example victim vehicle of FIGS. 1-4 coordinating with the example trusted vehicle of FIGS. 1, 3, and 4 to authenticate the example phantom vehicles of FIGS. 1-4.

FIG. 9 is an example data flow diagram 900 representative of the victim vehicle 102 of FIGS. 1-4 coordinating with the trusted vehicle 108 of FIGS. 1, 3, and 4 to authenticate the phantom vehicles 104, 106 of FIGS. 1-4. For example, the data flow diagram 900 of FIG. 9 may correspond to the schematic illustration of the example of FIG. 3. The data flow diagram 900 of FIG. 9 corresponds to the victim vehicle 102 and the trusted vehicle 108 using timing-based challenge messages to authenticate the phantom vehicles 104, 106. The data flow diagram 900 begins at a first example operation 902, at which the victim vehicle 102 transmits information associated with candidate phantom vehicles to the trusted vehicle 108 indicative of a request for collaboration for verification of the phantom vehicles 104, 106. In the example of FIG. 9, the information includes a request to the trusted vehicle 108 to trigger a second challenge by sending a second challenge packet to the second phantom vehicle 106 at time slot N-M and asking for a second challenge response from the second phantom vehicle 106 at time slot N, where N and M are subframe numbers.

At a second example operation 904, the trusted vehicle 108 establishes suspicion of the phantom vehicles 104, 106. For example, the V2X controller 100 of the trusted vehicle 108 may identify the phantom vehicles 104, 106 as candidate phantom vehicles based on a signal quality, a signal-to-noise ratio, etc., associated with V2X messages transmitted from the phantom vehicles 104, 106. At a third example operation 906, the trusted vehicle 108 transmits a V2X message to the victim vehicle 102 to establish and/or otherwise confirm the collaboration. At a fourth example operation 908, the victim vehicle 102 receives the agreement to collaborate from the trusted vehicle 108 and confirms the collaboration (e.g., generate and transmit an acknowledgement packet to the trusted vehicle 108).

At a fifth example operation 910, the trusted vehicle 108 triggers the second challenge by transmitting the second challenge packet to the second phantom vehicle 106 and requesting the second phantom vehicle 106 to transmit the second challenge response to the trusted vehicle 108 at time slot N. For example, the second challenge packet is to be received by the second phantom vehicle 106 when the second phantom vehicle 106 is in the RX mode and the second challenge packet is to instruct the second phantom vehicle 106 to change to the TX mode at the time slot N. At a sixth example operation 912, at the time slot N, the victim vehicle 102 triggers a first challenge by transmitting the first challenge packet to the first phantom vehicle 104. At a seventh example operation 914, at the time slot N (e.g., at the same time as the sixth operation 912), the second phantom vehicle 106 is to transmit the second challenge response to the trusted vehicle 108.

If the phantom vehicles 104, 106 are genuine vehicles, then the second phantom vehicle 104 can transmit the second challenge response at the seventh operation 914 and the first phantom vehicle 104 can transmit the first challenge response to the victim vehicle 102 at an eighth example operation 916. If the phantom vehicles 104, 106 are not genuine vehicles, then at least one of the following will not occur because the phantom vehicles 104, 106 correspond to the same half-duplex radio and, thus, cannot transmit and receive at the same time: (1) the first phantom vehicle 104 receives the first challenge packet or 2) the second phantom vehicle 106 transmits the second challenge response. Accordingly, the half-duplex radio associated with the phantom vehicles 104, 106 is in the TX mode at the time slot N and cannot receive the first challenge packet at the time slot N.

At a ninth example operation 918, the trusted vehicle 108 generates a challenge report. For example, the trusted vehicle 108 may generate a challenge report representative of an indication that the second challenge response does not match a second expected challenge response. In other examples, the challenge report can be indicative of the second challenge response matching and/or otherwise correlating to the second expected challenge response.

At a tenth example operation 920, the victim vehicle 102 compares the first challenge response from the first phantom vehicle 104 and the challenge report from the trusted vehicle 108 to determine whether the outcomes agree. For example, the challenge handler 730 of the victim vehicle 102 may determine that the challenge outcomes agree when (1) the first challenge response matches the first expected challenge response and (2) the second challenge response matches the second expected challenge response based on the challenge report. In other examples, the challenge handler 730 of the victim vehicle 102 may determine that the challenge outcomes agree when both the first and second challenge responses were not received. In yet other examples, the challenge handler 730 of the victim vehicle 102 may determine that the outcomes do not agree when (1) the first challenge response does not match the first expected challenge response while (2) the second challenge response matches the second expected challenge response, or vice versa.

At an eleventh example operation 922, the victim vehicle 102 determines whether at least one of the first challenge or the second challenge has failed. For example, the victim vehicle 102 may determine that the first challenge has failed because the first challenge response does not match and/or otherwise correspond to the first expected challenge response. In other examples, the victim vehicle 102 can determine that the second challenge has failed because the challenge report indicates that the second challenge response does not match and/or otherwise correspond to the second expected challenge response.

If, at the eleventh operation 922, the victim vehicle 102 determines that at least one of the first challenge or the second challenge failed, then the victim vehicle 102 re-triggers the authentication for one or both phantom vehicles 104, 106. For example, if the victim vehicle 102 determines that the first challenge failed, then the victim vehicle 102 may re-trigger the authentication process for the first phantom vehicle 104 at a twelfth example operation 924. Alternatively, the victim vehicle 102 may re-trigger the authentication process for both phantom vehicles 104, 106 by re-sending the first challenge packet to the first phantom vehicle 104 and re-sending the second challenge packet to the second phantom vehicle 106 as described above.

If the first phantom vehicle 104 fails the authentication process a quantity of times greater than a first counter threshold, then the victim vehicle 102 transmits an alert to the trusted vehicle 108 indicative that the first phantom vehicle 104 is a phantom vehicle and not a genuine vehicle at a thirteenth example operation 926. By identifying the first phantom vehicle 104 as a phantom vehicle, the victim vehicle 102 can drop and/or otherwise ignore future messages from the first phantom vehicle 104 and/or instruct other entities in the intelligent transportation system 114, such as the trusted vehicle 108, to ignore future messages from the first phantom vehicle 104. Additionally or alternatively, the victim vehicle 102, the trusted vehicle 108, etc., can generate an alert to the central facility 110a-b indicating an attack is being executed on the intelligent transportation system 114.

If, at the eleventh operation 922, the victim vehicle 102 determines that the second challenge failed, then the victim vehicle 102 may re-trigger the authentication process for the second phantom vehicle 106 at a fourteenth example operation 928. Alternatively, the victim vehicle 102 may re-trigger the authentication process for both phantom vehicles 104, 106 as described above. If the second phantom vehicle 106 fails the authentication process a quantity of times greater than a second counter threshold, then the victim vehicle 102 transmits an alert to the trusted vehicle 108 indicative that the second phantom vehicle 106 is a phantom vehicle and not a genuine vehicle at the twelfth operation 924. For example, re-triggering the authentication process may correspond to repeating at least one of operations 910, 912, 914, 916, 918, 920, or 922. After repeating the operations, the victim vehicle 102 may determine that the phantom vehicles 104, 106 are phantom vehicles associated with an attacker (e.g., the attacker 128) with a half-duplex radio when at least one of the first counter or the second counter satisfies a threshold (e.g., the first counter threshold, the second counter threshold, etc.). In some examples, the first counter threshold is the same as the second counter threshold while, in other examples, the first counter threshold is different from the second counter threshold.

By identifying the second phantom vehicle 106 as a phantom vehicle, the victim vehicle 102 can drop and/or otherwise ignore future messages from the second phantom vehicle 106 and/or instruct other entities in the intelligent transportation system 114, such as the trusted vehicle 108, to ignore future messages from the second phantom vehicle 106. Additionally or alternatively, the victim vehicle 102, the trusted vehicle 108, etc., can generate an alert to the central facility 110a-b indicating an attack is being executed on the intelligent transportation system 114. In some examples, the alert can instruct one or more entities of the intelligent transportation system 114 to adjust a parameter of respective ones of the radios 117 such as, a sub-channel number, a sub-frame number, a frequency, etc., in response to detecting the attack.

Figure 10:
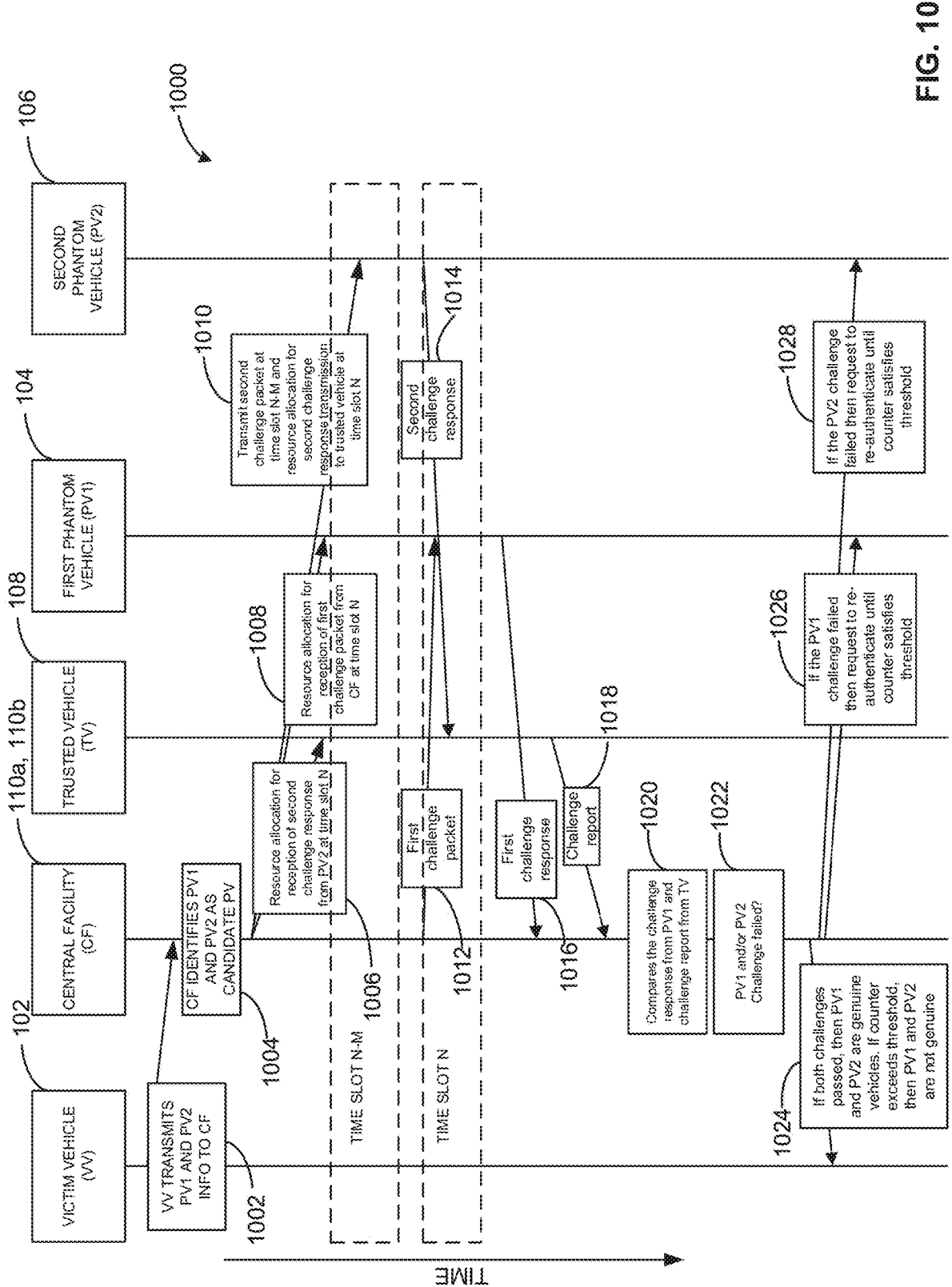
FIG. 10 is an example data flow diagram representative of the example victim vehicle of FIGS. 1-4 coordinating with the example central facility of FIGS. 1, 2, and 4 and the example trusted vehicle of FIGS. 1, 3, and 4 to authenticate the example phantom vehicles of FIGS. 1-4.

FIG. 10 is an example data flow diagram 1000 representative of the victim vehicle 102 of FIGS. 1-4 coordinating with the central facility 110a-b of FIGS. 1, 2, and 4 and the trusted vehicle 108 of FIGS. 1, 3, and 4 to authenticate the phantom vehicles 104, 106 of FIGS. 1-4. For example, the data flow diagram 1000 of FIG. 10 may correspond to the schematic illustration of the example of FIG. 4. The data flow diagram 1000 of FIG. 10 corresponds to the victim vehicle 102, the trusted vehicle 108, and the central facility 110a-b using timing-based challenge messages to authenticate the phantom vehicles 104, 106. The data flow diagram 1000 begins at a first example operation 1002 when the victim vehicle 102 transmits information associated with candidate phantom vehicles to the central facility 110a-b. For example, the V2X controller 100 of the victim vehicle 102 may identify the phantom vehicles 104, 106 as candidate phantom vehicles and transmit information associated with the candidate phantom vehicles to the central facility 110a-b.

At a second example operation 1004, the central facility 110a-b determines that the information indicates that the phantom vehicles 104, 106 are candidate phantom vehicles. Alternatively, the central facility 110a-b may independently identify that the phantom vehicles 104, 106 are candidate phantom vehicles. At a third example operation 1006, the central facility 110a-b allocates resources to the trusted vehicle 108 for reception of a second challenge response from the second phantom vehicle 106 at time slot N. At a fourth example operation 1008, the central facility 110a-b allocates resources to the first phantom vehicle 104 for reception of a first challenge packet from the central facility 110a-b at time slot N. For example, the central facility 110a-b may direct the first phantom vehicle 104 to be in the RX mode at time slot N. At a fifth example operation 1010, the central facility 110a-b initiates and/or otherwise triggers a second challenge by transmitting a second challenge packet to the second phantom vehicle 106 at time slot N-M (i.e., M time slot(s) less than N) and allocating resources to the second phantom vehicle 106 for transmission of the second challenge response to the trusted vehicle 108 at time slot N. For example, the central facility 110a-b may instruct the second phantom vehicle 106 to be in the TX mode at time slot N.

In the data flow diagram 1000 of FIG. 10, at a sixth example operation 1012, the central facility 110a-b triggers a first challenge by transmitting the first challenge packet to the first phantom vehicle 104 at time slot N. At a seventh example operation 1014, the second phantom vehicle 106 is to transmit the second challenge response to the trusted vehicle 108. At an eighth example operation 1016, the first phantom vehicle 104 is to transmit the first challenge response to the central facility 110a-b.

At a ninth example operation 1018, the trusted vehicle 108 generates a challenge report. For example, the trusted vehicle 108 may compare the second challenge response from the second phantom vehicle 106 to a second expected challenge response. In such examples, the trusted vehicle 108 can determine that the second challenge response does not match the second expected challenge response based on the comparison. In other examples, the trusted vehicle 108 can generate a challenge report indicating that the second challenge response does not match the second expected challenge response because the trusted vehicle 108 did not receive the second challenge response. For example, the second phantom vehicle 106 may have transmitted the second challenge response but an obstruction (e.g., a passing truck, a tree, etc.) may have interfered with the transmission.

At a tenth example operation 1020, the central facility 110a-b compares the first challenge response from the first phantom vehicle 104 and the challenge report from the trusted vehicle 108 to determine whether the outcomes agree. For example, the challenge handler 730 of the central facility 110a-b may determine that the first challenge response and the challenge report do not agree because (1) the first challenge response is indicative that the first challenge response matches a first expected challenge response and (2) the challenge report is indicative that the second challenge response does not match the second expected challenge response or the second challenge response was not received. In other examples, the challenge handler 730 of the central facility 110a-b may determine that the first challenge response and the challenge report do not agree because (1) the first challenge response does not match the first expected challenge response because the first challenge response was not received and (2) the challenge report is indicative that the second challenge response matches the second expected challenge response.

At an eleventh example operation 1022, the central facility 110a-b determines whether at least one of the first challenge or the second challenge has failed. For example, the central facility 110a-b may determine that the first challenge associated with the first phantom vehicle 104 and the second challenge associated with the second phantom vehicle 106 succeeded. In other examples, the central facility 110a-b can determine that at least one of the first challenge or the second challenge failed.

If, at the eleventh operation 1022, the central facility 110a-b determines that both the first and second challenges passed or succeeded, then the central facility 110a-b transmits an alert to the victim vehicle 102 indicative that the phantom vehicles 104, 106 are genuine vehicles at a twelfth example operation 1024. If, at the eleventh operation 1022, the central facility 110a-b determines that the first challenge failed, then the central facility 110a-b re-triggers the authentication process for the first phantom vehicle 104 and/or the second phantom vehicle 106 at a thirteenth example operation 1026. If the first phantom vehicle 104 fails the authentication process a quantity of times greater than a first counter threshold, then the central facility 110a-b transmits an alert to the victim vehicle 102 indicative that the first phantom vehicle 104 is a phantom vehicle and not a genuine vehicle at the twelfth operation 1024.

If, at the eleventh operation 1022, the central facility 110a-b determines that the second challenge failed, then the central facility 110a-b re-triggers the authentication process for the second phantom vehicle 106 and/or the first phantom vehicle 104 at a fourteenth example operation 1028. If the second phantom vehicle 106 fails the authentication process a quantity of times greater than a second counter threshold, then the central facility 110a-b transmits an alert to the victim vehicle 102 indicative that the second phantom vehicle 106 is a phantom vehicle and not a genuine vehicle at the twelfth operation 1024. For example, re-triggering the authentication process may correspond to repeating at least one of operations 1006, 1008, 1010, 1012, 1014, 1016, 1018, 1020, or 1022. After repeating the operations, the central facility 110*a*-*b* may determine that the phantom vehicles 104, 106 are phantom vehicles associated with an attacker (e.g., the attacker 128) with a half-duplex radio when at least one of the first counter or the second counter satisfies a threshold (e.g., the first counter threshold, the second counter threshold, etc.). In some examples, the first counter threshold is the same as the second counter threshold while, in other examples, the first counter threshold is different from the second counter threshold.

Figure 11:
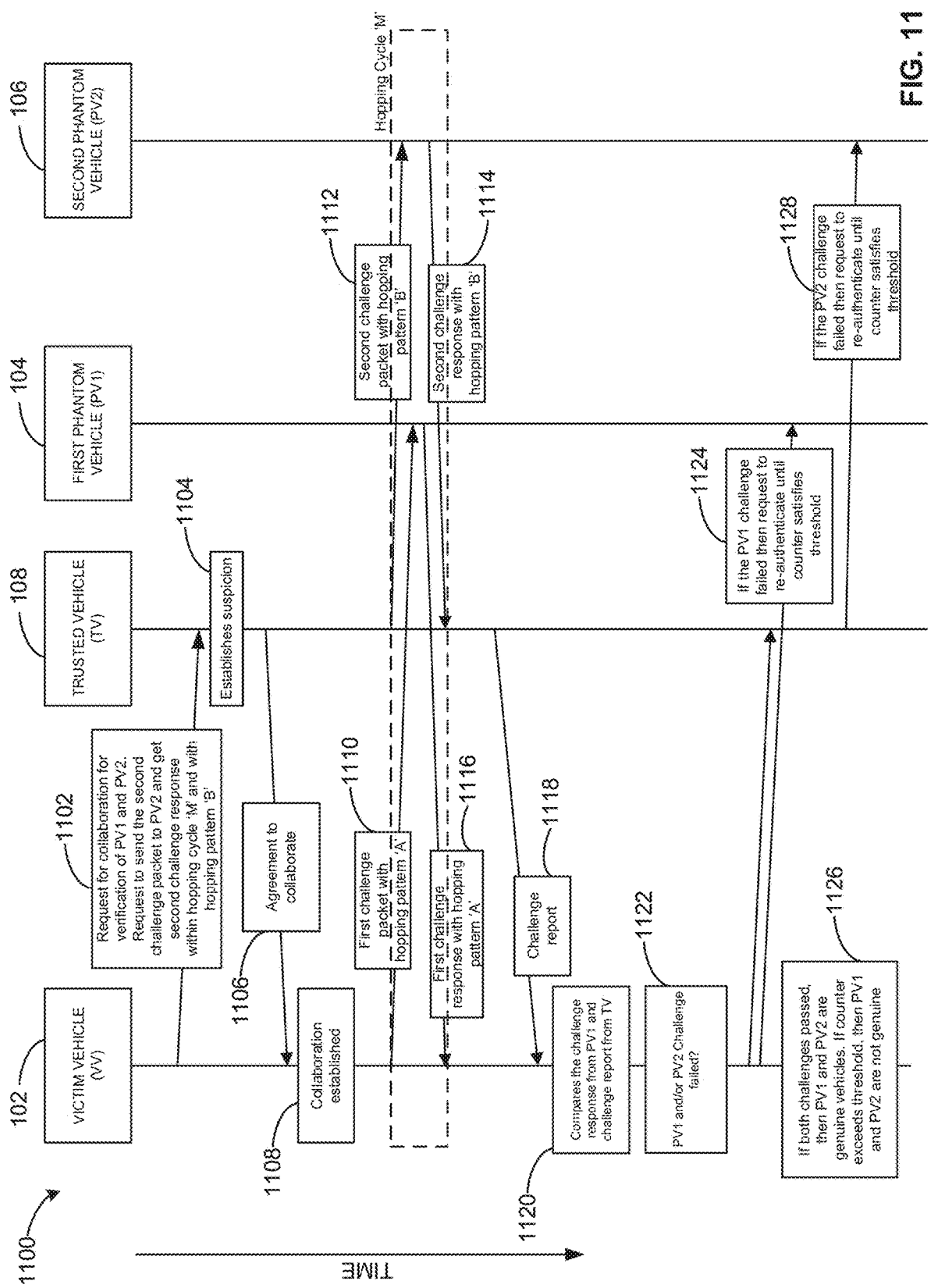
FIG. 11 is an example data flow diagram representative of the example victim vehicle of FIGS. 1-4 coordinating with the example trusted vehicle of FIGS. 1, 3, and 4 to authenticate the example phantom vehicles of FIGS. 1-4 using frequency band hopping patterns.

FIG. 11 is an example data flow diagram 1100 representative of the victim vehicle 102 of FIGS. 1-4 coordinating with the trusted vehicle 108 of FIGS. 1, 3, and 4 to authenticate the phantom vehicles 104, 106 of FIGS. 1-4 using frequency band hopping patterns (e.g., using frequency hopping based challenge messages). For example, the data flow diagram 1100 of FIG. 11 may correspond to the schematic illustration of the example of FIG. 3.

The data flow diagram 1100 of FIG. 11 begins at a first example operation 1102 when the victim vehicle 102 requests the trusted vehicle 108 (e.g., by looking up the trusted vehicle 108 in a trusted vehicle list included in the first database 760 of FIG. 7) for collaboration of authenticating identified candidate phantom vehicles (e.g., the phantom vehicles 104, 106). At the first operation 1102, the victim vehicle 102 requests the trusted vehicle 108 to transmit a second challenge packet at a third frequency to the second phantom vehicle 106 in hopping cycle M (e.g., a specified hopping cycle) to direct the second phantom vehicle 106 to transmit a second challenge response at a fourth frequency within the hopping cycle M. The fourth frequency is different from the third frequency based on a second frequency band hopping pattern (i.e., hopping pattern B). For example, the second challenge packet may include SCI that, when accessed, directs the second phantom vehicle 106 to generate the second challenge response in accordance with and/or otherwise based on the second frequency band hopping pattern (e.g., by hopping from the third frequency to the fourth frequency based on the second frequency band hopping pattern).

At a second example operation 1104, the trusted vehicle 108 establishes suspicion of the phantom vehicles 104, 106. For example, the V2X controller 100 of the trusted vehicle 108 may confirm the identification of the phantom vehicles 104, 106 as candidate phantom vehicles based on a signal quality, a signal-to-noise ratio, etc., associated with V2X messages transmitted from the phantom vehicles 104, 106. At a third example operation 1106, the trusted vehicle 108 transmits a V2X message (e.g., a collaboration message, a handshake message, etc.) to the victim vehicle 102 to establish and/or otherwise confirm the collaboration. At a fourth example operation 1108, the victim vehicle 102 receives the agreement to collaborate from the trusted vehicle 108 and confirms the collaboration.

At a fifth example operation 1110, at the hopping cycle M, the victim vehicle 102 triggers a first challenge by transmitting the first challenge packet at a first frequency to the first phantom vehicle 104 with a first frequency band hopping pattern (i.e., hopping pattern A) different from the second frequency band hopping pattern associated with the second challenge. In response to receiving the first challenge packet, the first phantom vehicle 104 is to transmit the first challenge response at a second frequency, where the second frequency is hopped from the first frequency based on the first frequency band hopping pattern.

At a sixth example operation 1112, the trusted vehicle 108 triggers a second challenge by transmitting the second challenge packet at the third frequency to the second phantom vehicle 106 based on the band hopping pattern B and requesting the second phantom vehicle 106 to transmit the second challenge response at the fourth frequency to the trusted vehicle 108 within the hopping cycle M. At a seventh example operation 1114, within the hopping cycle M, the second phantom vehicle 106 is to transmit the second challenge response at the fourth frequency to the trusted vehicle 108 based on the band hopping pattern B. At an eighth example operation 1116, within the hopping cycle M (e.g., at the same time as the seventh operation 1114), the first phantom vehicle 104 is to transmit the first challenge response at the second frequency to the victim vehicle 102 with the band hopping pattern A.

If the phantom vehicles 104, 106 are genuine vehicles, then the first phantom vehicle 104 can transmit the first challenge response at the second frequency determined by the first frequency band hopping pattern to the victim vehicle 102 at the eighth operation 1116 and the second phantom vehicle 106 can transmit the second challenge response at the fourth frequency determined by the second frequency band hopping pattern to the trusted vehicle 108 at the seventh operation 1114. If the phantom vehicles 104, 106 are not genuine vehicles, then at least one of the following will not occur because the phantom vehicles 104, 106 correspond to the same half-duplex radio and, thus, cannot transmit challenge responses using different frequency band hopping patterns: (1) the victim vehicle 102 obtains the first challenge response at the second frequency or (2) the trusted vehicle 108 obtains the second challenge response at the fourth frequency.

At a ninth example operation 1118, the trusted vehicle 108 generates a challenge report. For example, the trusted vehicle 108 may generate a challenge report that includes an indication that the second challenge response does not match a second expected challenge response. For example, the trusted vehicle 108 may not receive the second challenge response or may receive the second challenge response at a different frequency than the expected fourth frequency. In other examples, the challenge report can include an indication the second challenge response matches and/or otherwise correlates to the second expected challenge response.

At a tenth example operation 1120, the victim vehicle 102 compares the first challenge response from the first phantom vehicle 104 and the challenge report from the trusted vehicle 108 to determine whether the challenge results or outcomes agree. At an eleventh example operation 1122, the victim vehicle 102 determines whether at least one of the first challenge or the second challenge has failed. For example, the victim vehicle 102 may determine that the first challenge has failed because the first challenge response does not match and/or otherwise correspond to the first expected challenge response. In other examples, the victim vehicle 102 can determine that the second challenge has failed because the challenge report indicates that the second challenge response does not match and/or otherwise correspond to the second expected challenge response.

If, at the eleventh operation 1122, the victim vehicle 102 determines that at least one of the first challenge or the second challenge failed, then the victim vehicle 102 re-triggers the authentication for one or both phantom vehicles 104, 106. For example, if the victim vehicle 102 determines that the first challenge failed, then the victim vehicle 102 re-triggers the authentication process for the first phantom vehicle 104 and/or the second phantom vehicle 106 at a twelfth example operation 1124. If the first phantom vehicle 104 fails the authentication process a quantity of times greater than a first counter threshold, then the victim vehicle 102 transmits an alert to the trusted vehicle 108 indicative that the first phantom vehicle 104 is a phantom vehicle and not a genuine vehicle at a thirteenth example operation 1126.

If, at the eleventh operation 1122, the victim vehicle 102 determines that the second challenge failed, then the victim vehicle 102 re-triggers the authentication process for one or both phantom vehicles 104, 106 at a fourteenth example operation 1128. If the second phantom vehicle 106 fails the authentication process a quantity of times greater than a second counter threshold, then the victim vehicle 102 transmits an alert to the trusted vehicle 108 indicative that the second phantom vehicle 106 is a phantom vehicle and not a genuine vehicle at the twelfth operation 1124. For example, re-triggering the authentication process may correspond to repeating at least one of operations 1110, 1112, 1114, 1116, 1118, 1120, or 1122. After repeating the operations, the victim vehicle 102 may determine that the phantom vehicles 104, 106 are phantom vehicles associated with an attacker (e.g., the attacker 128) with a half-duplex radio when at least one of the first counter or the second counter satisfies a threshold (e.g., the first counter threshold, the second counter threshold, etc.). In some examples, the first counter threshold is the same as the second counter threshold while, in other examples, the first counter threshold is different from the second counter threshold. Alternatively, the data flow diagram 1100 of FIG. 11 may be used in combination with the data flow diagram 900 of FIG. 9.

Figure 12:
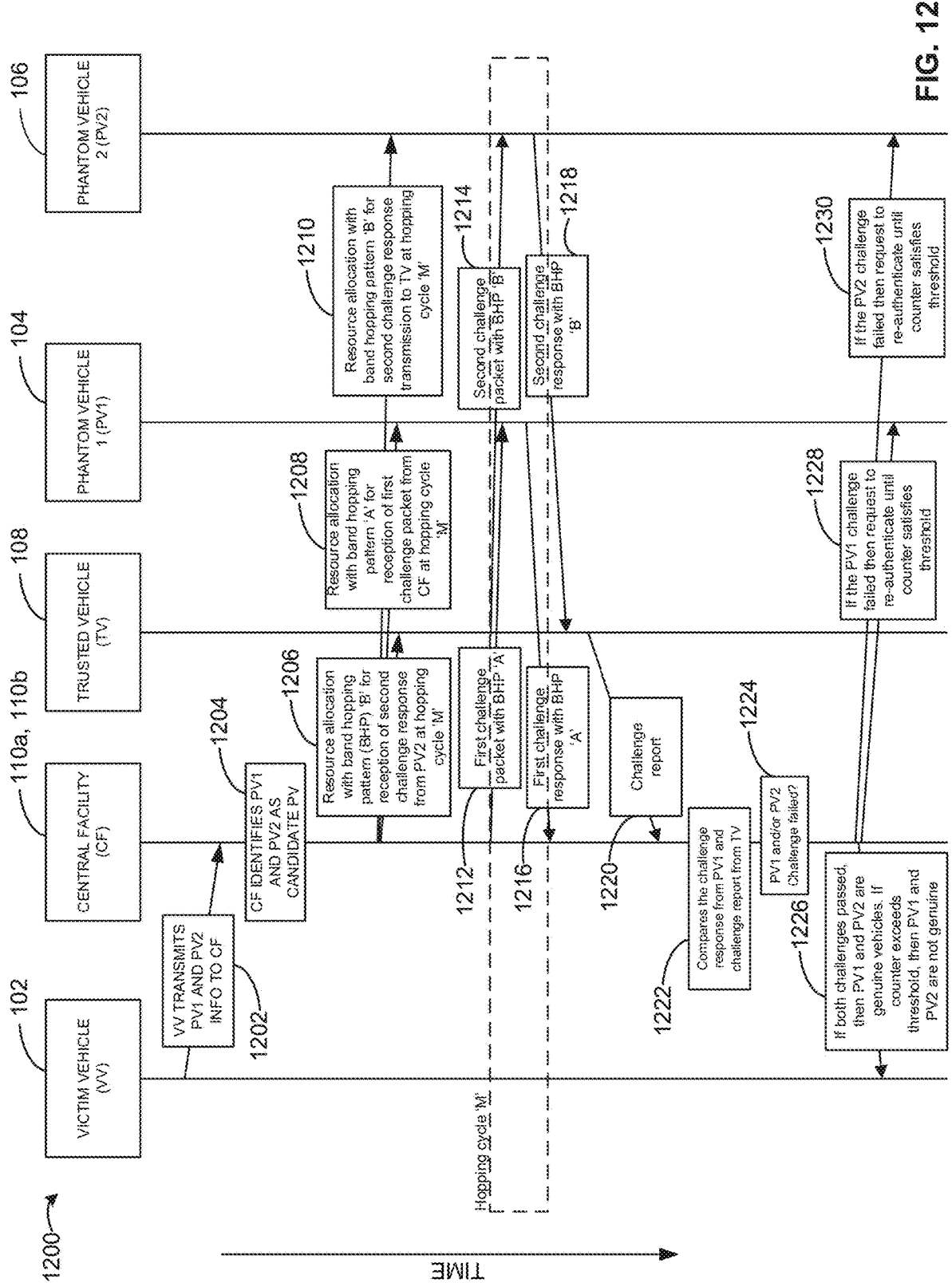
FIG. 12 is an example data flow diagram representative of the example victim vehicle of FIGS. 1-4 coordinating with the example central facility of FIGS. 1, 2, and 4 and the example trusted vehicle of FIGS. 1, 3, and 4 to authenticate the example phantom vehicles of FIGS. 1-4 using frequency band hopping patterns.

FIG. 12 is an example data flow diagram 1200 representative of the victim vehicle 102 of FIGS. 1-4 coordinating with the central facility 110*a-b* of FIGS. 1, 2, and 4 and the trusted vehicle 108 of FIGS. 1, 3, and 4 to authenticate the phantom vehicles 104, 106 of FIGS. 1-4 using frequency band hopping patterns (e.g., using frequency hopping based challenge messages). For example, the data flow diagram 1200 of FIG. 12 may correspond to the schematic illustration of the example of FIG. 4.

The data flow diagram 1200 begins at a first example operation 1202 when the victim vehicle 102 transmits information associated with candidate phantom vehicles to the central facility 110*a-b*. For example, the V2X controller 100 of the victim vehicle 102 may identify the phantom vehicles 104, 106 as candidate phantom vehicles and transmit information associated with the candidate phantom vehicles to the central facility 110*a-b*.

At a second example operation 1204, the central facility 110*a-b* determines that the information indicates that the phantom vehicles 104, 106 are candidate phantom vehicles. Alternatively, the central facility 110*a-b* may independently identify that the phantom vehicles 104, 106 are candidate phantom vehicles. At a third example operation 1206, the central facility 110*a-b* allocates resources with a second band hopping pattern B to the trusted vehicle 108 for reception of a second challenge response from the second phantom vehicle 106 at a hopping cycle M (e.g., M is an integer and corresponds to a specified hopping cycle).

At a fourth example operation 1208, the central facility 110*a-b* allocates resources to the first phantom vehicle 104 with a first hopping band pattern A for reception of a first challenge packet from the central facility 110*a-b* at the hopping cycle M. At a fifth example operation 1210, the central facility 110*a-b* triggers a second challenge by transmitting a second challenge packet at a third frequency with the second band hopping pattern B to the second phantom vehicle 106 and allocating resources with the second band hopping pattern B to the second phantom vehicle 106 for transmission of the second challenge response at a fourth frequency to the trusted vehicle 108 at the hopping cycle M. For example, the fourth frequency is determined by hopping from the third frequency to the fourth frequency based on the second hopping pattern B.

In the data flow diagram 1200 of FIG. 12, at a sixth example operation 1212, the central facility 110*a-b* triggers a first challenge by transmitting the first challenge packet at a first frequency with the first band hopping pattern A to the first phantom vehicle 104 within the hopping cycle M. At a seventh example operation 1214, the trusted vehicle 108 triggers a second challenge by transmitting the second challenge packet at the third frequency with the second band hopping pattern B to the second phantom vehicle 106 within the hopping cycle M.

At an eighth example operation 1216, the first phantom vehicle 104 is to transmit the first challenge response at a second frequency based on the first band hopping pattern A to the central facility 110*a-b* within the hopping cycle M. At a ninth example operation 1218, the second phantom vehicle 106 is to transmit the second challenge response at the fourth frequency based on the second band hopping pattern B to the trusted vehicle 108 within the hopping cycle M.

At a tenth example operation 1220, the trusted vehicle 108 is to generate a challenge report. For example, the trusted vehicle 108 may compare the second challenge response from the second phantom vehicle 106 to a second expected challenge response. In such examples, the trusted vehicle 108 can determine that the second challenge response does not match the second expected challenge response based on the comparison. In other examples, the trusted vehicle 108 can generate a challenge report indicating that the second challenge response does not match the second expected challenge response because the trusted vehicle 108 did not receive the second challenge response. In yet other examples, the trusted vehicle 108 can generate a challenge report indicative of the second challenge response matching the second expected challenge response.

At an eleventh example operation 1222, the central facility 110*a-b* compares the first challenge response from the first phantom vehicle 104 and the challenge report from the trusted vehicle 108 to determine if the outcomes agree. For example, the central facility 110*a-b* may determine that the first challenge response and the challenge report do not agree because (1) the first challenge response is indicative that the first challenge response does not match the first expected challenge response and (2) the challenge report is indicative that the second challenge response matches the second expected challenge response.

At a twelfth example operation 1224, the central facility 110*a-b* determines whether at least one of the first challenge or the second challenge failed. For example, the central facility 110*a-b* may determine that the first challenge associated with the first phantom vehicle 104 and the second challenge associated with the second phantom vehicle 106 were successful. In other examples, the central facility 110*a-b* can determine that at least one of the first challenge or the second challenge failed.

If, at the twelfth operation 1224, the central facility 110*a-b* determines that both the first and second challenges succeeded, then the central facility 110*a-b* transmits an alert to the victim vehicle 102 indicative that the phantom vehicles 104, 106 are genuine vehicles at a thirteenth example operation 1226. If, at the twelfth operation 1224, the central facility 110*a-b* determines that the first challenge failed, then the central facility 110*a-b* re-triggers the authentication process for the first phantom vehicle 104 and/or the second phantom vehicle 106 at a fourteenth example operation 1228. If the first phantom vehicle 104 fails the authentication process a quantity of times greater than a first counter threshold, then the central facility 110*a-b* transmits an alert to the victim vehicle 102 indicative that the first phantom vehicle 104 is a phantom vehicle and not a genuine vehicle at the thirteenth operation 1226.

If, at the twelfth operation 1224, the central facility 110*a-b* determines that the second challenge failed, then the central facility 110*a-b* re-triggers the authentication process for the second phantom vehicle 106 and/or the first phantom vehicle 104 at a fifteenth example operation 1230. If the second phantom vehicle 106 fails the authentication process a quantity of times greater than a second counter threshold, then the central facility 110*a-b* transmits an alert to the victim vehicle 102 indicative that the second phantom vehicle 106 is a phantom vehicle and not a genuine vehicle at the thirteenth operation 1226. For example, re-triggering the authentication process may correspond to repeating at least one of operations 1206, 1208, 1210, 1212, 1214, 1216, 1218, 1220, or 1222. After repeating the operations, the central facility 110*a-b* may determine that the phantom vehicles 104, 106 are phantom vehicles associated with an attacker (e.g., the attacker 128) with a half-duplex radio when at least one of the first counter or the second counter satisfies a threshold (e.g., the first counter threshold, the second counter threshold, etc.). In some examples, the first counter threshold is the same as the second counter threshold while, in other examples, the first counter threshold is different from the second counter threshold. Alternatively, the data flow diagram 1200 of FIG. 12 may be used in combination with the data flow diagram 1000 of FIG. 10.

Figure 13:
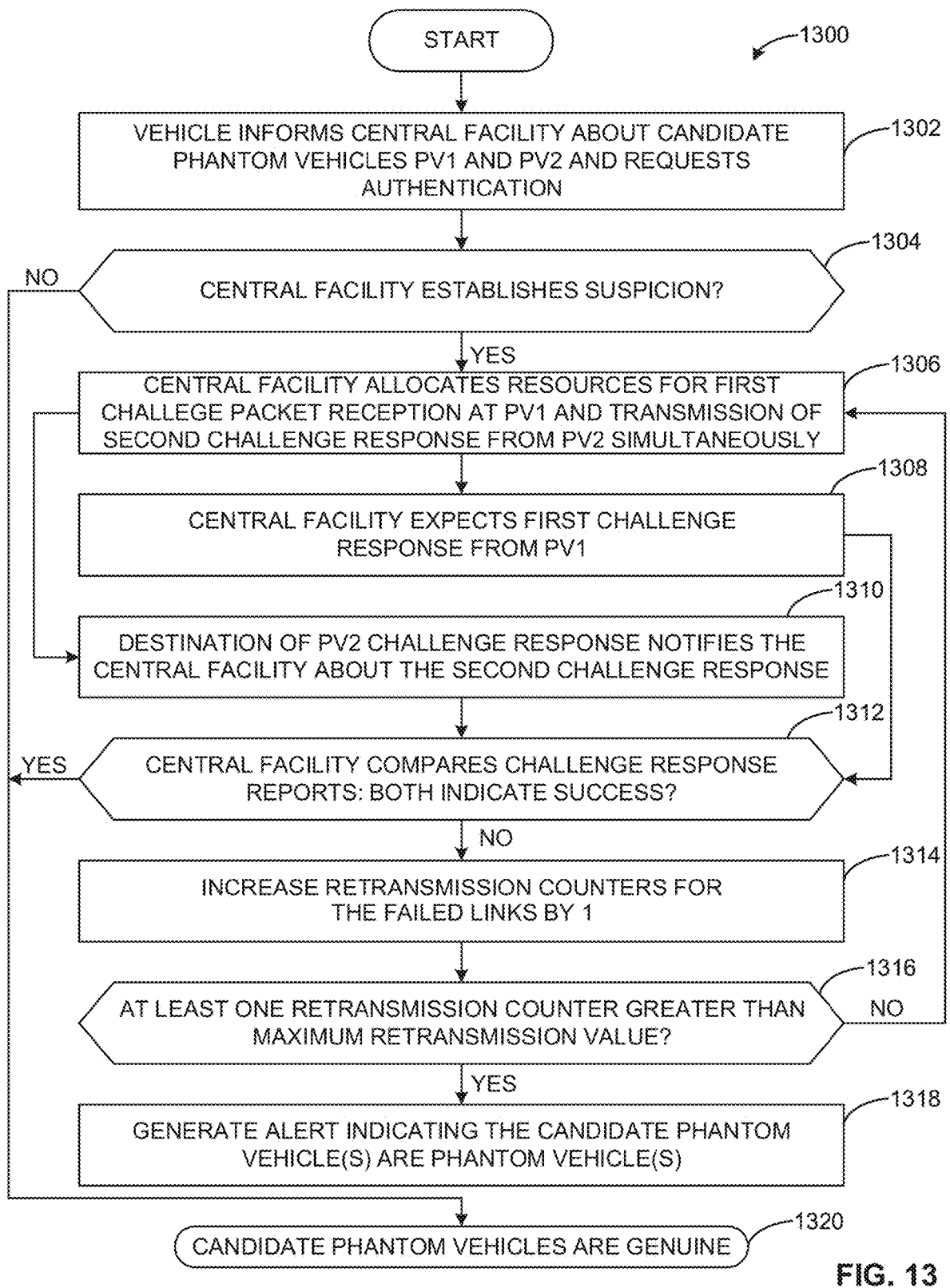
FIG. 13 is a flowchart representative of example machine readable instructions that may be executed to implement the example V2X controller of FIGS. 1-4 and 7 and/or the example central facility of FIGS. 1, 2, 4, and 8 to authenticate the example phantom vehicles of FIGS. 1-4.

FIG. 13 is a flowchart representative of example machine readable instructions 1300 that may be executed by the V2X controller 100 of FIGS. 1-4 and 7 and/or the central facility 110*a-b* of FIGS. 1, 2, 4, and 8 to authenticate the phantom vehicles 104, 106 of FIGS. 1-4. The machine readable instructions 1300 of FIG. 13 begin at block 1302, at which the victim vehicle 102 informs the central facility 110*a-b* about candidate phantom vehicles PV1 (i.e., phantom vehicle 1) and PV2 (i.e., phantom vehicle 2) and requests authentication. For example, the candidate phantom determiner 720 (FIG. 7) may invoke the network interface 710 (FIG. 7) of the victim vehicle 102 to transmit a subchannel number, a subframe number, etc., associated with the phantom vehicles 104, 106 to the central facility 110*a-b* for authentication.

At block 1304, the central facility 110*a-b* determines whether to establish suspicion. For example, the candidate phantom determiner 720 (FIG. 8) of the central facility 110*a-b* may determine that the phantom vehicles 104, 106 are candidate phantom vehicles based on a signal quality, a signal-to-noise ratio, etc., associated with V2X messages transmitted by the phantom vehicles 104, 106. In such examples, the candidate phantom determiner 720 can obtain the V2X messages from the phantom vehicles 104, 106 or the victim vehicle 102.

If, at block 1304, the central facility 110*a-b* determines that the candidate phantom vehicles are genuine vehicles, control proceeds to block 1320 to identify the candidate phantom vehicles as genuine vehicles. If, at block 1304, the central facility 110*a-b* determines that the candidate phantom vehicles are suspicious and/or otherwise identifiable as candidate phantom vehicles, then, at block 1306, the central facility 110*a-b* allocates resources for a first challenge packet reception at PV1 and transmission of a second challenge response from PV2 simultaneously. For example, the resource allocator 810 (FIG. 8) may allocate resources for reception of a first challenge packet at the first phantom vehicle 104 at a second time and allocate resources for reception of a second challenge packet at a first time and transmission of a second challenge response at the second phantom vehicle 106 at the second time.

At block 1308, the central facility 110*a-b* expects the first challenge response from PV1. For example, the challenge handler 730 (FIG. 8) may wait for an expected quantity of time to receive the first challenge response from the first phantom vehicle 104. In response to the allocation of resources at block 1306, the destination of the PV2 challenge response notifies the central facility 110*a-b* about the second challenge response at block 1310. For example, the challenge handler 730 of the trusted vehicle 108 may transmit a challenge report to the network interface 130 (FIG. 7) of the central facility 110*a-b* indicative of whether the second challenge response received by the trusted vehicle 108 from the second phantom vehicle 106 matches a second expected challenge response.

At block 1312, the central facility 110*a-b* compares the challenge response reports and determine whether they both indicate success. For example, the challenge handler 730 of the central facility 110*a-b* may determine that at least one of the first challenge report associated with the first challenge response or a second challenge report generated by the trusted vehicle 108 that is associated with the second challenge response does not indicate success. If, at block 1312, the central facility 110*a-b* determines that both challenge response reports indicate success, control proceeds to block 1320 to identify the candidate phantom vehicles as genuine vehicles. If, at block 1312, the central facility 110*a-b* determines that both challenge response reports do not indicate success, then, at block 1314, the central facility 110*a-b* increases retransmission counters for the failed links by 1. For example, the challenge handler 730 of the central facility 110*a-b* may increment a first counter when the central facility 110*a-b* does not receive the first challenge response and/or a increment a second counter when the trusted vehicle 108 does not receive the second challenge response.

At block 1316, the central facility 110*a-b* determines whether at least one retransmission counter is greater than a maximum retransmission value. For example, if the first counter has a value of 3 and the maximum retransmission value is 2, then the challenge handler 730 of the central facility 110*a-b* may determine that the first phantom vehicle 104 is a phantom vehicle because the challenge associated with the first phantom vehicle 104 iteratively fails.

If, at block 1316, the central facility 110*a-b* determines that at least one retransmission counter is not greater than the maximum retransmission value, control returns to block 1306 to retrigger the authentication of PV1 and PV2. If, at block 1316, the central facility 110*a-b* determines that at least one retransmission counter is greater than the maximum retransmission value, then, at block 1318, the central facility 110*a-b* generates an alert indicating the candidate phantom vehicle(s) are phantom vehicle(s). For example, the challenge handler 730 of the central facility 110*a-b* may determine that the first phantom vehicle 104 is a phantom vehicle based on the first counter satisfying and/or otherwise being greater than the maximum retransmission value. In other examples, the challenge handler 730 of the central facility 110*a-b* may determine that both phantom vehicles 104, 106 are phantom vehicles based on at least one of the first counter or the second counter satisfying the maximum retransmission threshold value. In such examples, the alert generator 750 (FIG. 8) can generate an alert to the victim vehicle 102, the trusted vehicle 108, or any other entity of the intelligent transportation system 114 that the phantom vehicles 104, 106 are phantom vehicles and, thus, to drop and/or otherwise ignore future communication from the phantom vehicles 104, 106. Additionally or alternatively, the alert may direct one or more entities of the intelligent transportation system 114 to adjust a parameter of the radio 117 of FIG. 1 such as a subchannel number, a subframe number, a frequency, etc. In response to generating the alert at block 1318, the machine readable instructions 1300 of FIG. 13 conclude.

Figure 14:
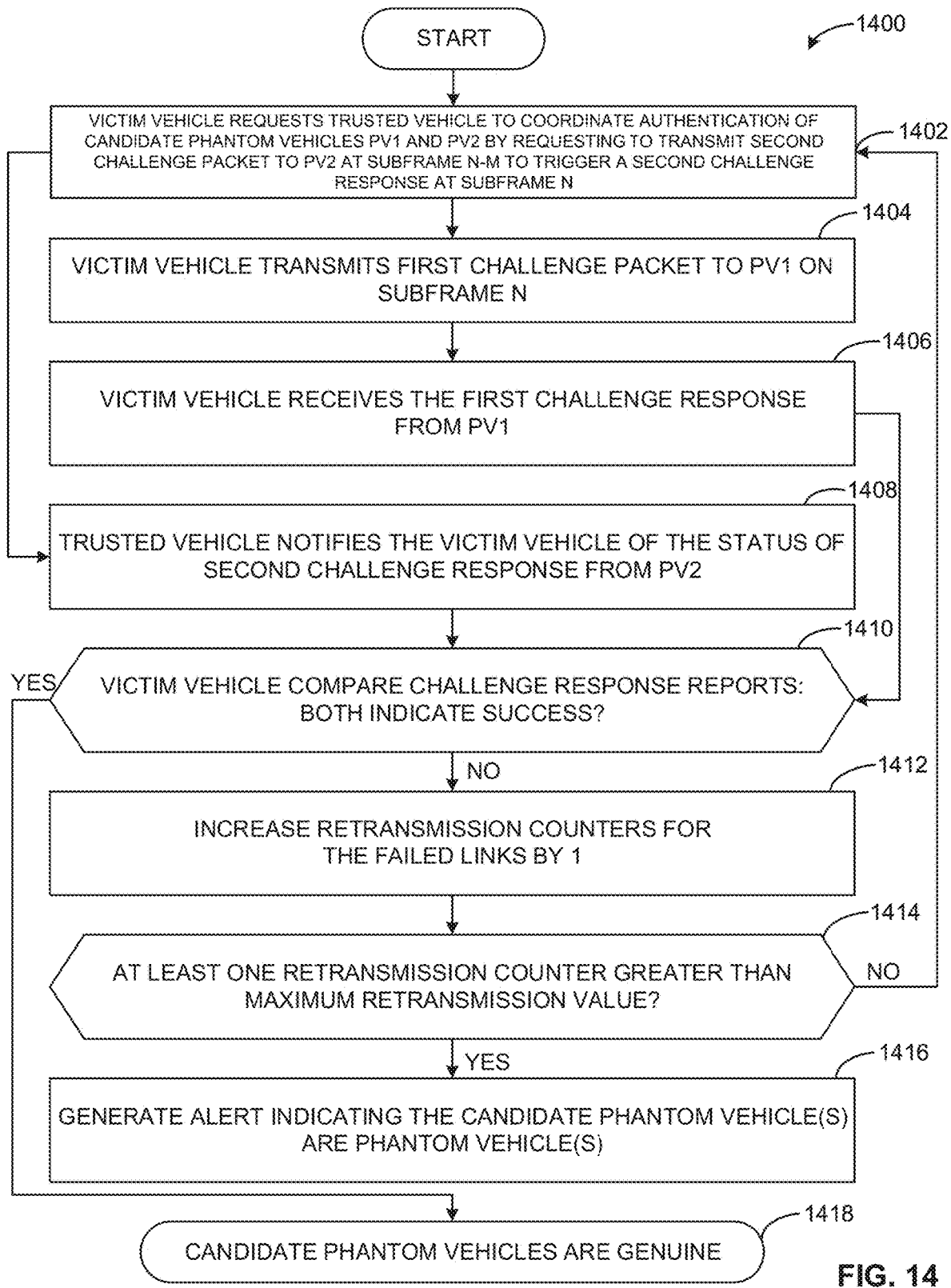
FIG. 14 is a flowchart representative of example machine readable instructions that may be executed to implement the example V2X controller of FIGS. 1-4 and 7 of the example trusted vehicle of FIGS. 1-4 and the example trusted vehicle of FIGS. 1, 3, and 4 to authenticate the example phantom vehicles of FIGS. 1-4.

FIG. 14 is a flowchart representative of example machine readable instructions 1400 that may be executed by the V2X controller 100 of FIGS. 1-4 and 7 of the victim vehicle 102 of FIGS. 1-4 and the trusted vehicle 108 of FIGS. 1, 3, and 4 to authenticate the phantom vehicles 104, 106 of FIGS. 1-4. The machine readable instructions 1400 of FIG. 14 begin at block 1402, at which the victim vehicle 102 requests the trusted vehicle 108 to coordinate authentication of candidate phantom vehicles PV1 and PV2 by requesting the victim vehicle 102 to transmit a second challenge packet to PV2 at subframe N-M to trigger a second challenge response at subframe N. For example, the trusted neighbor handler 740 (FIG. 7) of the victim vehicle 102 may select the trusted vehicle 108 when the trusted vehicle 108 is in a trusted vehicle list stored in the first database 760 (FIG. 7). In response to selecting the trusted vehicle 108, the challenge handler 730 (FIG. 7) of the victim vehicle 102 may request the challenge handler 730 of the trusted vehicle 108 to transmit the second challenge packet to the second phantom vehicle 106 at subframe N-M.

At block 1404, the victim vehicle 102 transmits a first challenge packet to PV1 on subframe N. For example, the challenge handler 730 of the victim vehicle 102 may transmit the first challenge packet to the first phantom vehicle 104 on subframe N. At block 1406, the victim vehicle 102 receives the first challenge response from PV1. For example, the challenge handler 730 may obtain the first challenge response from the first phantom vehicle 104.

At block 1408, the trusted vehicle 108 notifies the victim vehicle 102 of the status of the second challenge response from PV2. For example, the challenge handler 730 of the trusted vehicle 108 may transmit a second challenge report associated with the second challenge response to the victim vehicle 102.

At block 1410, the victim vehicle 102 compares the challenge response reports and determine whether they both indicate success. For example, the challenge handler 730 of the trusted vehicle 108 may determine that at least one of the first challenge report associated with the first challenge response or the second challenge report from the trusted vehicle 108 that is associated with the second challenge response does not indicate success.

If, at block 1410, the victim vehicle 102 determines that both challenge response reports indicate success, control proceeds to block 1418 to identify the candidate phantom vehicles as genuine vehicles. If, at block 1410, the victim vehicle 102 determines that both challenge response reports do not indicate success, then, at block 1412, the victim vehicle 102 increases retransmission counters for the failed links by 1. For example, the challenge handler 730 of the victim vehicle 102 may increment a first counter when the victim vehicle 102 does not receive the first challenge response and/or a second counter when the trusted vehicle 108 does not receive the second challenge response.

At block 1414, the victim vehicle 102 determines whether at least one retransmission counter is greater than a maximum retransmission value. For example, if the first counter has a value of 3 and the maximum retransmission value is 2, then the challenge handler 730 of the victim vehicle 102 may determine that the first phantom vehicle 104 is a phantom vehicle because the challenge associated with the first phantom vehicle 104 iteratively fails.

If, at block 1414, the victim vehicle 102 determines that at least one retransmission counter is not greater than the maximum retransmission value, control returns to block 1402 to retrigger the authentication of PV1 and PV2. If, at block 1414, the victim vehicle 102 determines that at least one retransmission counter is greater than the maximum retransmission value, then, at block 1416, the victim vehicle 102 generates an alert indicating the candidate phantom vehicle(s) are phantom vehicle(s). For example, the challenge handler 730 of the victim vehicle 102 may determine that the first phantom vehicle 104 is a phantom vehicle based on the first counter satisfying and/or otherwise being greater than the maximum retransmission value. In other examples, the challenge handler 730 of the victim vehicle 102 may determine that both phantom vehicles 104, 106 are phantom vehicles based on at least one of the first counter or the second counter satisfying the maximum retransmission threshold value. In such examples, the alert generator 750 (FIG. 7) of the victim vehicle 102 can generate an alert to the trusted vehicle 108, or any other entity of the intelligent transportation system 114 that the phantom vehicles 104, 106 are phantom vehicles and, thus, to drop and/or otherwise ignore future communication from the phantom vehicles 104, 106. In response to generating the alert at block 1416, the machine readable instructions 1400 of FIG. 14 conclude.

Figure 15:
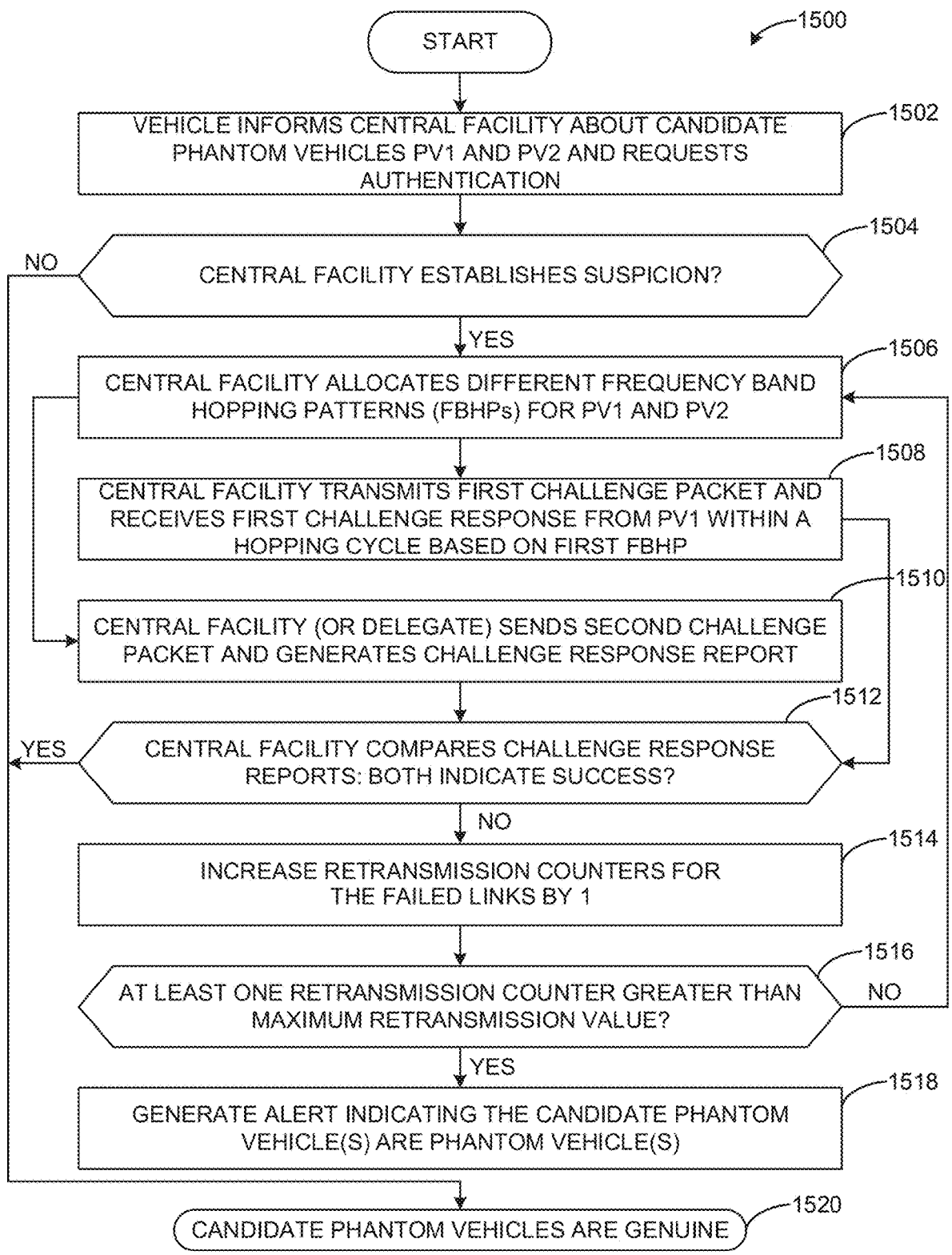
FIG. 15 is a flowchart representative of example machine readable instructions that may be executed to implement the example V2X controller of FIGS. 1-4 and 7 and/or the example central facility of FIGS. 1, 2, 4, and 8 to authenticate the example phantom vehicles of FIGS. 1-4 using frequency band hopping patterns.

FIG. 15 is a flowchart representative of example machine readable instructions 1500 that may be executed by the V2X controller 100 of FIGS. 1-4 and 7 and/or the central facility 110*a-b* of FIGS. 1, 2, 4, and 8 to authenticate the phantom vehicles 104, 106 of FIGS. 1-4 using frequency band hopping band patterns. The machine readable instructions 1500 of FIG. 15 begin at block 1502, at which the victim vehicle 102 informs the central facility 110*a-b* about candidate phantom vehicles PV1 and PV2 and requests authentication. For example, the candidate phantom determiner 720 (FIG. 7) of the victim vehicle 102 may invoke the network interface 710 (FIG. 7) of the victim vehicle 102 to transmit a subchannel number, a subframe number, etc., associated with the phantom vehicles 104, 106 to the central facility 110*a-b* to authenticate.

At block 1504, the central facility 110*a-b* determines whether to establish suspicion. For example, the candidate phantom determiner 720 (FIG. 8) of the central facility 110*a-b* may determine that the phantom vehicles 104, 106 are candidate phantom vehicles based on a signal quality, a signal-to-noise ratio, etc., associated with V2X messages transmitted by the phantom vehicles 104, 106.

If, at block 1504, the central facility 110*a-b* determines that the candidate phantom vehicles are genuine vehicles, control proceeds to block 1520 to identify the candidate phantom vehicles as genuine vehicles. If, at block 1504, the central facility 110*a-b* determines that the candidate phantom vehicles are suspicious and/or otherwise identifiable as candidate phantom vehicles, then, at block 1506, the central facility 110*a-b* allocates different frequency band hopping patterns for PV1 and PV2. For example, the resource allocator 810 (FIG. 8) may allocate resources for reception of a first challenge packet with a first frequency band hopping pattern at the first phantom vehicle 104 at a first time and allocate resources for reception of a second challenge packet with a second frequency band hopping pattern at the first time at the second phantom vehicle 106.

At block 1508, the central facility 110a-b transmits the first challenge packet and receives the first challenge response from PV1 within a hopping cycle based on the first frequency band hopping pattern. For example, the challenge handler 730 (FIG. 8) of the central facility 110a-b may transmit the first challenge packet with the first frequency band hopping pattern to the first phantom vehicle 104 within a hopping cycle M. In such examples, the challenge handler 730 of the central facility 110a-b can receive the first challenge response with the first frequency band hopping pattern from the first phantom vehicle 104 within the hopping cycle M.

At block 1510, the central facility 110a-b (or delegate) sends the second challenge packet and generates a challenge response report. For example, the challenge handler 730 of the central facility 110a-b may transmit the second challenge packet with the second frequency band hopping pattern to the second phantom vehicle 106 within the hopping cycle M. In such examples, the challenge handler 730 of the central facility 110a-b can generate the challenge response report based on receiving the second challenge response with the second frequency band hopping pattern from the second phantom vehicle 106 within the hopping cycle M. In other examples, the challenge handler 730 of the central facility 110a-b can generate the challenge response report based on not receiving the second challenge response or receiving the second challenge response at a different frequency than expected. Alternatively, the central facility 110a-b may instruct a delegate, such as the trusted vehicle 108, to send the second challenge packet and generate the challenge response report.

At block 1512, the central facility 110a-b compares the challenge response reports and determine whether they both indicate success. For example, the challenge handler 730 of the central facility 110a-b may determine that at least one of a first challenge report associated with the first challenge response or a second challenge report associated with the second challenge response does not indicate success. If, at block 1512, the central facility 110a-b determines that the challenge response reports both indicate success, control proceeds to block 1520 to identify the candidate phantom vehicles as genuine vehicles. If, at block 1512, the central facility 110a-b determines that both challenge response reports do not indicate success, then, at block 1514, the central facility 110a-b increases retransmission counters for the failed links by 1. For example, the challenge handler 730 of the central facility 110a-b may increment a first counter when the central facility 110a-b does not receive the first challenge response and/or a second counter when the central facility 110a-b or the trusted vehicle 108 does not receive the second challenge response.

At block 1516, the central facility 110a-b determines whether at least one retransmission counter is greater than a maximum retransmission value. For example, if the first counter has a value of 3 and the maximum retransmission value is 2, then the challenge handler 730 of the central facility 110a-b may determine that the first phantom vehicle 104 is a phantom vehicle because the challenge associated with the first phantom vehicle 104 iteratively fails.

If, at block 1516, the central facility 110a-b determines that at least one retransmission counter is not greater than the maximum retransmission value, control returns to block 1506 to retrigger the authentication of PV1 and PV2. If, at block 1516, the central facility 110a-b determines that at least one retransmission counter is greater than the maximum retransmission value, then, at block 1518, the central facility 110a-b generates an alert indicating the candidate phantom vehicle(s) are phantom vehicle(s). For example, the challenge handler 730 of the central facility 110a-b may determine that the first phantom vehicle 104 is a phantom vehicle based on the first counter satisfying and/or otherwise being greater than the maximum retransmission value. In other examples, the challenge handler 730 of the central facility 110a-b may determine that both phantom vehicles 104, 106 are phantom vehicles based on at least one of the first counter or the second counter satisfying the maximum retransmission threshold value. In such examples, the alert generator 750 (FIG. 8) of the central facility 110a-b can generate an alert to the victim vehicle 102, the trusted vehicle 108, or any other entity of the intelligent transportation system 114 that the phantom vehicles 104, 106 are phantom vehicles and, thus, to drop and/or otherwise ignore future communication from the phantom vehicles 104, 106. In response to generating the alert at block 1518, the machine readable instructions 1500 of FIG. 15 conclude.

Figure 16:
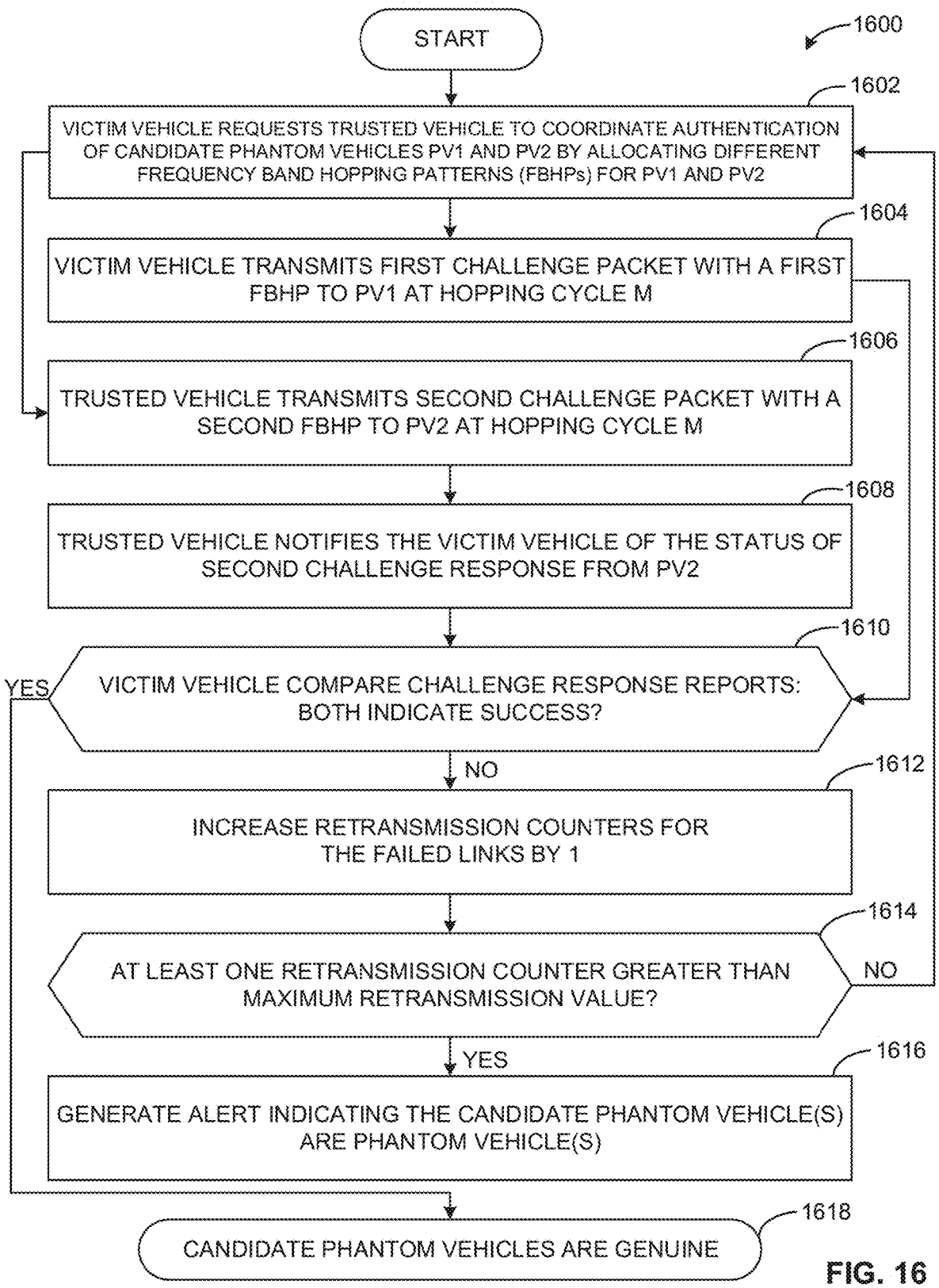
FIG. 16 is a flowchart representative of example machine readable instructions that may be executed to implement the example V2X controller of FIGS. 1-4 and 7 of the example trusted vehicle of FIGS. 1-4 and the example trusted vehicle of FIGS. 1, 3, and 4 to authenticate the example phantom vehicles of FIGS. 1-4 using frequency band hopping patterns.

FIG. 16 is a flowchart representative of example machine readable instructions 1600 that may be executed by the V2X controller 100 of FIGS. 1-4 and 7 of the victim vehicle 102 of FIGS. 1-4 and the trusted vehicle 108 of FIGS. 1, 3, and 4 to authenticate the phantom vehicles 104, 106 of FIGS. 1-4 using frequency band hopping patterns. The machine readable instructions 1600 of FIG. 16 begin at block 1602, at which the victim vehicle 102 requests the trusted vehicle 108 to coordinate authentication of candidate phantom vehicles PV1 and PV2 by allocating different frequency band hopping patterns for PV1 and PV2. For example, the trusted neighbor handler 740 (FIG. 7) of the victim vehicle 102 may select the trusted vehicle 108 when the trusted vehicle 108 is in a trusted vehicle list stored in the first database 760 (FIG. 7). In response to selecting the trusted vehicle 108, the candidate phantom determiner 720 (FIG. 7) of the victim vehicle 102 may invoke the network interface 710 (FIG. 7) of the victim vehicle 102 to transmit a subchannel number, a subframe number, etc., associated with the phantom vehicles 104, 106 to the trusted vehicle 108 to authenticate.

At block 1604, the victim vehicle 102 transmits a first challenge packet with a first frequency band hopping pattern to PV1 at a hopping cycle M. For example, the challenge handler 730 (FIG. 7) of the victim vehicle 102 may transmit the first challenge packet with the first frequency band hopping pattern to the first phantom vehicle 104 within a hopping cycle M.

At block 1606, the trusted vehicle 108 transmits a second challenge packet with a second frequency band hopping pattern to PV2 at the hopping cycle M. For example, the challenge handler 730 of the trusted vehicle 108 may transmit the second challenge packet with the second frequency band hopping pattern to the second phantom vehicle 106 within the hopping cycle M.

At block 1608, the trusted vehicle 108 notifies the victim vehicle 102 of the status of the second challenge response from PV2. For example, the challenge handler 730 of the trusted vehicle 108 may generate a second challenge response report. For example, the network interface 710 of the trusted vehicle 108 may transmit the second challenge packet with the second frequency band hopping pattern to the second phantom vehicle 106 within the hopping cycle M. In such examples, the challenge handler 730 of the trusted vehicle 108 can generate the second challenge response report based on receiving the second challenge response with the second frequency band hopping pattern from the second phantom vehicle 106 within the hopping cycle M. In other examples, the challenge handler 730 of the trusted vehicle 108 can generate the second challenge response report based on not receiving the second challenge response or receiving the second challenge response at a different frequency than expected. In such examples, the challenge handler 730 of the trusted vehicle 108 can notify the victim vehicle 102 of the status by transmitting the second challenge response report to the victim vehicle 102.

At block 1610, the victim vehicle 102 compares the challenge response reports and determine whether they both indicate success. For example, the challenge handler 730 of the victim vehicle 102 may determine that at least one of a first challenge report associated with the first challenge response or a second challenge report associated with the second challenge response does not indicate success. If, at block 1610, the victim vehicle 102 determines that the challenge response reports both indicate success, control proceeds to block 1618 to identify the candidate phantom vehicles as genuine vehicles. If, at block 1610, the victim vehicle 102 determines that both challenge response reports do not indicate success, then, at block 1612, the victim vehicle 102 increases retransmission counters for the failed links by 1. For example, the challenge handler 730 of the victim vehicle 102 may increment a first counter when the victim vehicle 102 does not receive the first challenge response and/or a second counter when the second challenge response report indicates that the trusted vehicle 108 does not receive the second challenge response.

At block 1614, the victim vehicle 102 determines whether at least one retransmission counter is greater than a maximum retransmission value. For example, if the first counter has a value of 3 and the maximum retransmission value is 2, then the challenge handler 730 of the victim vehicle 102 may determine that the first phantom vehicle 104 is a phantom vehicle because the challenge associated with the first phantom vehicle 104 iteratively fails.

If, at block 1614, the victim vehicle 102 determines that at least one retransmission counter is not greater than the maximum retransmission value, control returns to block 1602 to retrigger the authentication of PV1 and PV2. If, at block 1614, the victim vehicle 102 determines that at least one retransmission counter is greater than the maximum retransmission value, then, at block 1616, the victim vehicle 102 generates an alert indicating the candidate phantom vehicle(s) are phantom vehicle(s). For example, the challenge handler 730 of the victim vehicle 102 may determine that the first phantom vehicle 104 is a phantom vehicle based on the first counter satisfying and/or otherwise being greater than the maximum retransmission value. In other examples, the challenge handler 730 of the victim vehicle 102 may determine that both phantom vehicles 104, 106 are phantom vehicles based on at least one of the first counter or the second counter satisfying the maximum retransmission threshold value. In such examples, the alert generator 750 (FIG. 7) of the victim vehicle 102 can generate an alert to the trusted vehicle 108 or any other entity of the intelligent transportation system 114 that the phantom vehicles 104, 106 are phantom vehicles and, thus, to drop and/or otherwise ignore future communication from the phantom vehicles 104, 106. In response to generating the alert at block 1616, the machine readable instructions 1600 of FIG. 16 conclude.

Figure 17:
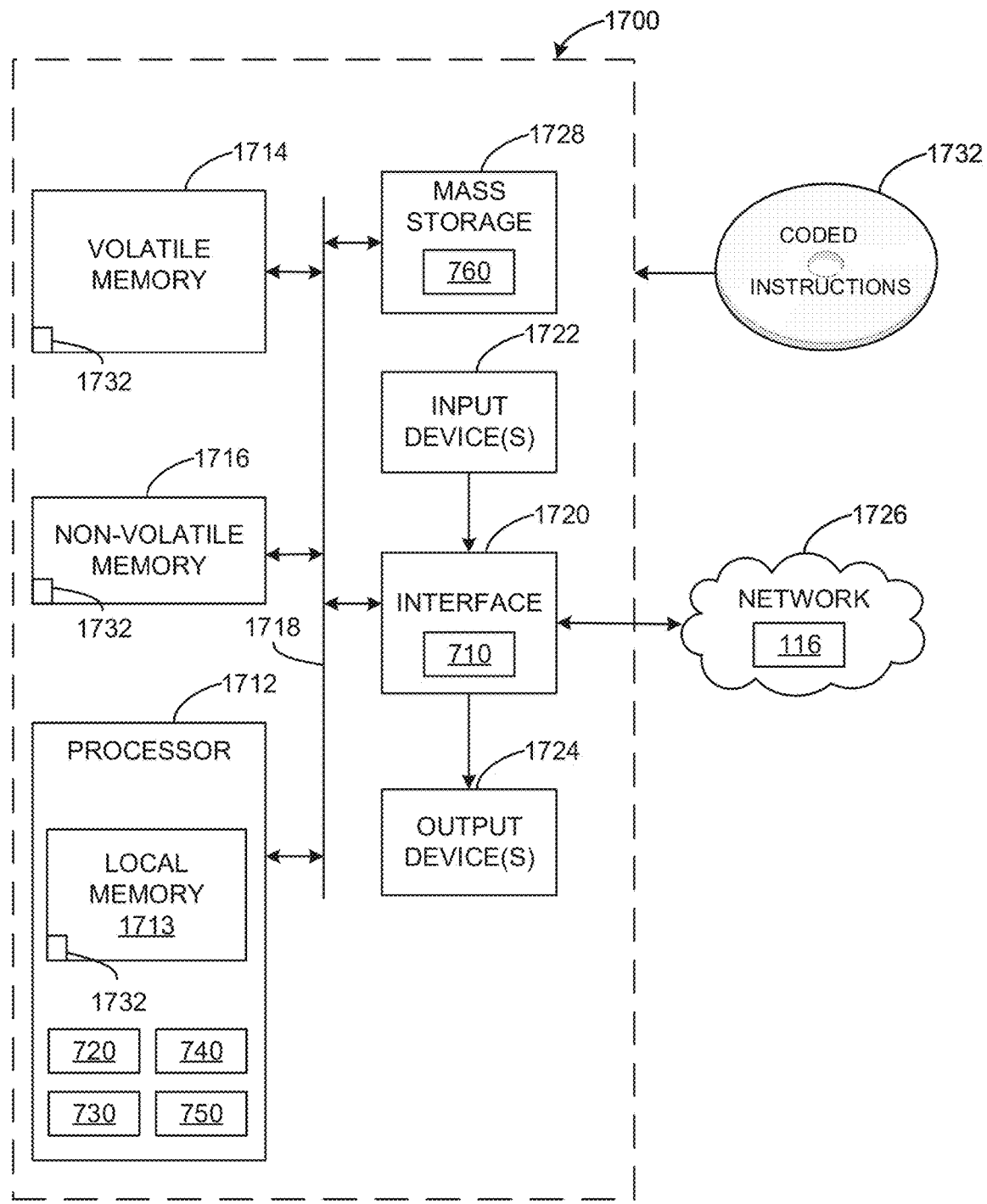
FIG. 17 is a block diagram of an example processing platform structured to execute the instructions of FIGS. 9-16 to implement the example V2X controller of FIGS. 1-4 and 7.

FIG. 17 is a block diagram of an example processor platform 1700 structured to execute the instructions of FIGS. 9-16 to implement the V2X controller 100 of FIGS. 1-4 and 7. The processor platform 1700 can be, for example, an electronic control unit (ECU), a server, a personal computer, a workstation, a mobile device (e.g., a cell phone, a smart phone, a tablet such as an iPad™), or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1712 implements the candidate phantom determiner 720, the challenge handler 730, the trusted neighbor handler 740, and the alert generator 750 of FIG. 7.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), a Bluetooth® interface, a near field communication (NFC) interface, and/or a PCI express interface. In this example, the interface circuit 1720 implements the network interface 710 of FIG. 7.

In the illustrated example, one or more input devices 1722 are connected to the interface circuit 1720. The input device(s) 1722 permit(s) a user to enter data and/or commands into the processor 1712. The input device(s) 1722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1720 of the illustrated example, thus, typically includes a graphics driver card, a graphics driver chip, and/or a graphics driver processor.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc. In this example, the network 1726 implements the network 116 of FIG. 1.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives. In this example, the one or more mass storage devices 1728 implement the first database 760 of FIG. 7.

The machine executable instructions 1732 of FIGS. 9-16 may be stored in the mass storage device 1728, in the volatile memory 1714, in the non-volatile memory 1716, and/or on a removable non-transitory computer readable storage medium such as a CD or DVD.

Figure 18:
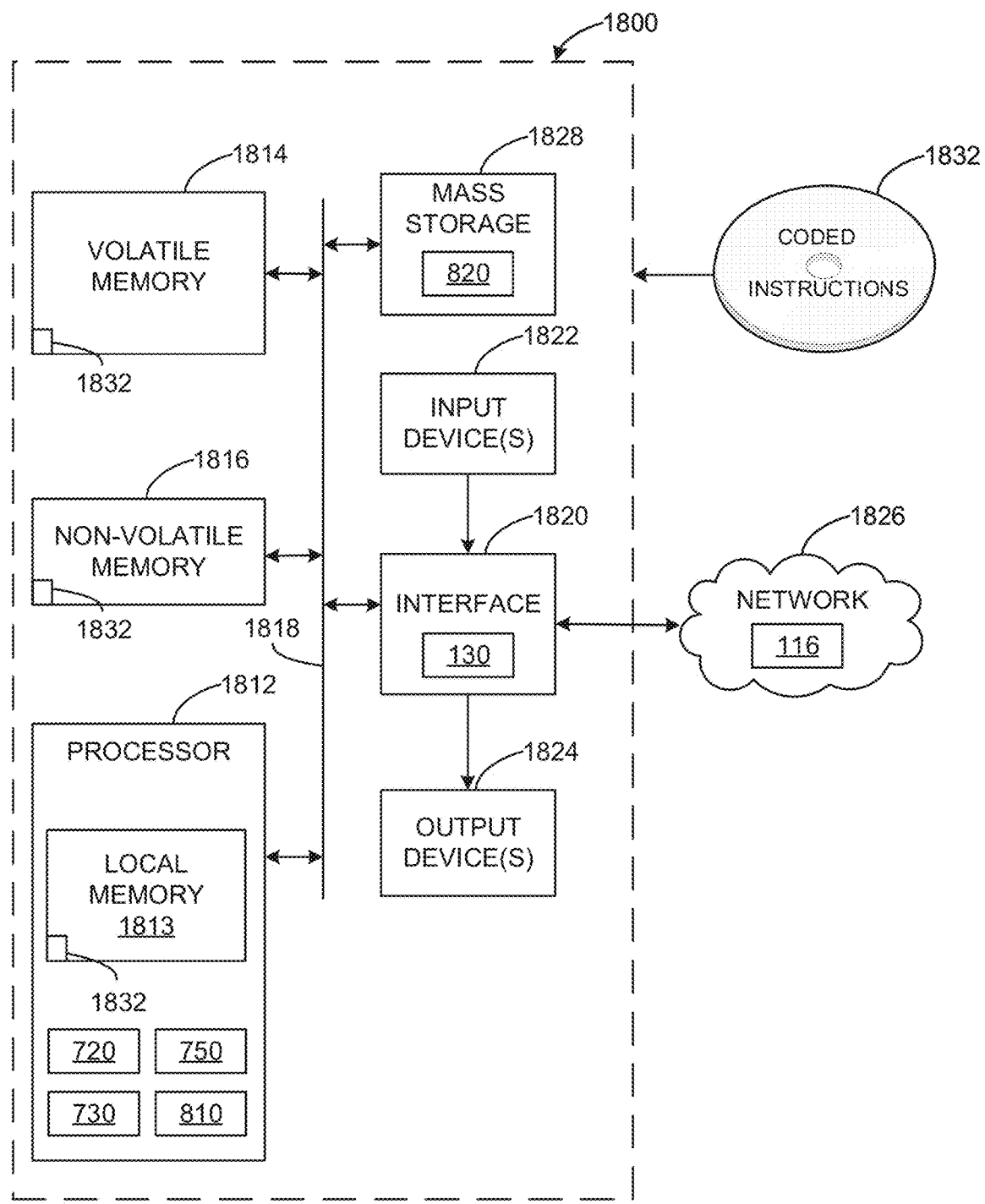
FIG. 18 is a block diagram of an example processing platform structured to execute the instructions of FIGS. 10, 12, 13, and 15 to implement the example central facility of FIGS. 1, 2, 4, and 8.

FIG. 18 is a block diagram of an example processor platform 1800 structured to execute the instructions of FIGS. 10, 12, 13, and 15 to implement the central facility 110*a-b* of FIGS. 1, 2, 4, and 8. The processor platform 1800 can be, for example, an electronic control unit (ECU), a server, a personal computer, a workstation, a mobile device (e.g., a cell phone, a smart phone, a tablet such as an iPad™), or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1812 implements the example candidate phantom determiner 720, the challenge handler 730, the alert generator 750, and the resource allocator 810 of FIGS. 7 and/or 8.

The processor 1812 of the illustrated example includes a local memory 1813 (e.g., a cache). The processor 1812 of the illustrated example is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), a Bluetooth® interface, a near field communication (NFC) interface, and/or a PCI express interface. In this example, the interface circuit 1820 implements the network interface 130 of FIGS. 1 and 8.

In the illustrated example, one or more input devices 1822 are connected to the interface circuit 1820. The input device(s) 1822 permit(s) a user to enter data and/or commands into the processor 1812. The input device(s) 1822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1820 of the illustrated example, thus, typically includes a graphics driver card, a graphics driver chip, and/or a graphics driver processor.

The interface circuit 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1826. The communication can be via, for example, an Ethernet connection, a digital subscriber line (DSL) connection, a telephone line connection, a coaxial cable system, a satellite system, a line-of-site wireless system, a cellular telephone system, etc. In this example, the network 1726 implements the network 116 of FIG. 1.

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, redundant array of independent disks (RAID) systems, and digital versatile disk (DVD) drives. In this example, the one or more mass storage devices 1828 implement the second database 820 of FIG. 8.

The machine executable instructions 1832 of FIGS. 10, 12, 13, and 15 may be stored in the mass storage device 1828, in the volatile memory 1814, in the non-volatile memory 1816, and/or on a removable non-transitory computer readable storage medium such as a CD or DVD.

From the foregoing, it will be appreciated that example methods, apparatus, and articles of manufacture have been disclosed that detect attacks in V2X networks. The disclosed methods, apparatus, and articles of manufacture improve the security of V2X networks by identifying malicious actors attempting to generate ill-intended V2X messages from phantom vehicles to cause other entities of an intelligent transportation system to perform unexpected behaviors. By subjecting phantom vehicles to conflicting V2X protocol actions, the disclosed methods, apparatus, and articles of manufacture can identify candidate phantom vehicles as phantom vehicles when one or more of the candidate phantom vehicles are unable to complete a receive or a transmit action in accordance with the expected actions or behaviors of genuine vehicles in the V2X network. The disclosed methods, apparatus, and articles of manufacture improve the efficiency of using a computing device by identifying malicious entities to prevent an entity of the intelligent transportation system from being compromised and, thus, performing in an inefficient or unintended manner. The disclosed methods, apparatus and articles of manufacture are accordingly directed to one or more improvement(s) in the functioning of a computer.

The following examples pertain to further examples disclosed herein.

Example 1 includes an apparatus to detect an attack in a vehicle-to-everything (V2X) network, the apparatus comprising a challenge handler to (a) transmit a first challenge packet to a first vehicle to request the first vehicle to transmit a first challenge response, (b) instruct a second challenge packet to be transmitted to a second vehicle to request the second vehicle to transmit a second challenge response, (c) increment a first counter when the first challenge response is not obtained, (d) increment a second counter when the second challenge response is not obtained, and (e) after repeating (a)-(d), determine that the first and second vehicles are phantom vehicles associated with an attacker with a half-duplex radio when at least one of the first counter or the second counter satisfies a threshold, and a network interface to instruct a third vehicle associated with the V2X network to ignore future messages from the phantom vehicles based on the determination.

Example 2 includes the apparatus of example 1, wherein the challenge handler is to transmit the second challenge packet to the second vehicle at a first time to cause the second vehicle to transmit the second challenge response at a second time after the first time, and transmit the first challenge packet to the first vehicle at the second time, the half-duplex radio being unable to do both of (1) receive the first challenge packet and (2) transmit the second challenge response at the same time, the half-duplex radio unable to transmit the first challenge response because the half-duplex radio did not receive the first challenge packet.

Example 3 includes the apparatus of example 1, wherein the third vehicle is a trusted vehicle, and the challenge handler is to instruct the trusted vehicle to transmit the second challenge packet to the second vehicle at a first time to cause the second vehicle to transmit the second challenge response at a second time after the first time, and transmit the first challenge packet to the first vehicle at the second time, the half-duplex radio being unable to do both of (1) receive the first challenge packet and (2) transmit the second challenge response at the same time, the half-duplex radio unable to transmit the first challenge response because the half-duplex radio did not receive the first challenge packet.

Example 4 includes the apparatus of example 1, wherein the challenge handler is to transmit the first challenge packet to the first vehicle at a first time, and instruct the second challenge packet to be transmitted to the second vehicle at the first time, the half-duplex radio being unable to receive the first challenge packet and the second challenge packet at the same time.

Example 5 includes the apparatus of example 1, wherein the challenge handler is to transmit the first challenge packet at a first time to the first vehicle using a first frequency, the first challenge packet to request the first vehicle to transmit the first challenge response at a first hopping cycle using a second frequency, the second frequency different from the first frequency based on a first frequency band hopping pattern, and transmit the second challenge packet at the first time to the second vehicle using a third frequency, the second challenge packet to request the second vehicle to transmit the second challenge response at the first hopping cycle using a fourth frequency, the fourth frequency different from the third frequency based on a second frequency band hopping pattern different from the first frequency band hopping pattern, the half-duplex radio being unable to transmit the first challenge response and the second challenge response using different frequency band hopping patterns at the same hopping cycle.

Example 6 includes the apparatus of example 1, wherein the third vehicle is a trusted vehicle, and the challenge handler is to transmit the first challenge packet at a first time to the first vehicle using a first frequency, the first challenge packet to request the first vehicle to transmit the first challenge response at a first hopping cycle using a second frequency, the second frequency different from the first frequency based on a first frequency band hopping pattern, and instruct the trusted vehicle to transmit the second challenge packet to request the second vehicle to transmit the second challenge response to the trusted vehicle at the first time using a third frequency, the second challenge packet to request the second vehicle to transmit the second challenge response at the first hopping cycle using a fourth frequency, the fourth frequency different from the third frequency based on a second frequency band hopping pattern different from the first frequency band hopping pattern, the half-duplex radio being unable to transmit the first challenge response and the second challenge response using different frequency band hopping patterns at the same hopping cycle.

Example 7 includes the apparatus of example 1, wherein the challenge handler is to determine that the first challenge response matches a first expected challenge response, determine that the second challenge response matches a second expected challenge response, determine that the first and second vehicles are genuine vehicles based on the determinations, and invoke the network interface to transmit an alert to the third vehicle to accept future messages from the genuine vehicles.

Example 8 includes the apparatus of example 1, wherein the challenge handler is to determine that the first challenge response matches a first expected challenge response, and determine that the second challenge response does not match a second expected challenge response when the second challenge response is not obtained, a value of the second counter indicative of a quantity of times the second challenge response is not obtained.

Example 9 includes the apparatus of example 1, further including a candidate phantom determiner to identify the first vehicle as a first candidate phantom vehicle and the second vehicle as a second candidate phantom vehicle by determining a first signal-to-noise ratio associated with first messages transmitted by the first vehicle, determining a second signal-to-noise ratio associated with second messages transmitted by the second vehicle, and identifying the first vehicle as the first candidate phantom vehicle and the second vehicle as the second candidate phantom vehicle based on a comparison of the first and second signal-to-noise ratios.

Example 10 includes the apparatus of example 1, wherein the third vehicle is a first candidate trusted vehicle, and further including a trusted neighbor handler to identify the first candidate trusted vehicle of one or more candidate trusted vehicles in the V2X network, generate a first message authentication code (MAC) based on a nonce value, transmit an authentication packet to the first candidate trusted vehicle, the authentication packet including the nonce value, in response to receiving an authentication response from the first candidate trusted vehicle, compare the first MAC to a second MAC included in the authentication response, generate a trusted vehicle list including the first candidate trusted vehicle when the first MAC matches the second MAC, and select the first candidate trusted vehicle to transmit the second challenge packet when the first candidate trusted vehicle is included in the trusted vehicle list.

Example 11 includes the apparatus of example 1, wherein the apparatus is a server in communication with the V2X network, a roadside computing device in communication with the V2X network, or included in a vehicle in communication with the V2X network.

Example 12 includes an apparatus to detect an attack in a vehicle-to-everything (V2X) network, the apparatus comprising means for challenging vehicles to test their authenticity, the challenging means to (a) transmit a first challenge packet to a first of the vehicles to request the first vehicle to transmit a first challenge response, (b) instruct a second challenge packet to be transmitted to a second of the vehicles to request the second vehicle to transmit a second challenge response, (c) increment a first counter when the first challenge response is not obtained, (d) increment a second counter when the second challenge response is not obtained, and (e) after repeating (a)-(d), determine that the first and second vehicles are phantom vehicles associated with an attacker with a half-duplex radio when at least one of the first counter or the second counter satisfies a threshold, and means for interfacing with the V2X network, the interfacing means to instruct a third of the vehicles to ignore future messages from the phantom vehicles based on the determination.

Example 13 includes the apparatus of example 12, wherein the challenging means is to transmit the second challenge packet to the second vehicle at a first time to cause the second vehicle to transmit the second challenge response at a second time after the first time, and transmit the first challenge packet to the first vehicle at the second time, the half-duplex radio being unable to do both of (1) receive the first challenge packet and (2) transmit the second challenge response at the same time, the half-duplex radio unable to transmit the first challenge response because the half-duplex radio did not receive the first challenge packet.

Example 14 includes the apparatus of example 12, wherein the third vehicle is a trusted vehicle, and the challenging means is to instruct the trusted vehicle to transmit the second challenge packet to the second vehicle at a first time to cause the second vehicle to transmit the second challenge response at a second time after the first time, and transmit the first challenge packet to the first vehicle at the second time, the half-duplex radio being unable to do both of (1) receive the first challenge packet and (2) transmit the second challenge response at the same time, the half-duplex radio unable to transmit the first challenge response because the half-duplex radio did not receive the first challenge packet.

Example 15 includes the apparatus of example 12, wherein the challenging means is to transmit the first challenge packet to the first vehicle at a first time, and instruct the second challenge packet to be transmitted to the second vehicle at the first time, the half-duplex radio being unable to receive the first challenge packet and the second challenge packet at the same time.

Example 16 includes the apparatus of example 12, wherein the challenging means is to transmit the first challenge packet at a first time to the first vehicle using a first frequency, the first challenge packet to request the first vehicle to transmit the first challenge response at a first hopping cycle using a second frequency, the second frequency different from the first frequency based on a first frequency band hopping pattern, and transmit the second challenge packet at the first time using a third frequency, the second challenge packet to request the second vehicle to transmit the second challenge response at the first hopping cycle using a fourth frequency, the fourth frequency different from the third frequency based on a second frequency band hopping pattern different from the first frequency band hopping pattern, the half-duplex radio being unable to transmit the first challenge response and the second challenge response using different frequency band hopping patterns at the same hopping cycle.

Example 17 includes the apparatus of example 12, wherein the third vehicle is a trusted vehicle, and the challenging means is to transmit the first challenge packet at a first time to the first vehicle using a first frequency, the first challenge packet to request the first vehicle to transmit the first challenge response at a first hopping cycle using a second frequency, the second frequency different from the first frequency based on a first frequency band hopping pattern, and instruct the trusted vehicle to transmit the second challenge packet to request the second vehicle to transmit the second challenge response to the trusted vehicle at the first time using a third frequency, the second challenge packet to request the second vehicle to transmit the second challenge response at the first hopping cycle using a fourth frequency, the fourth frequency different from the third frequency based on a second frequency band hopping pattern different from the first frequency band hopping pattern, the half-duplex radio being unable to transmit the first challenge response and the second challenge response using different frequency band hopping patterns at the same hopping cycle.

Example 18 includes the apparatus of example 12, wherein the challenging means is to determine that the first challenge response matches a first expected challenge response, determine that the second challenge response matches a second expected challenge response, determine that the first and second vehicles are genuine vehicles based on the determinations, and invoke the interfacing means to transmit an alert to the third vehicle to accept future messages from the genuine vehicles.

Example 19 includes the apparatus of example 12, wherein the challenging means is to determine that the first challenge response matches a first expected challenge response, and determine that the second challenge response does not match a second expected challenge response when the second challenge response is not obtained, a value of the second counter indicative of a quantity of times the second challenge response is not obtained.

Example 20 includes the apparatus of example 12, further including means for identifying a candidate phantom vehicle, the identifying means to identify the first vehicle as a first candidate phantom vehicle and the second vehicle as a second candidate phantom vehicle by determining a first signal-to-noise ratio associated with first messages transmitted by the first vehicle, determining a second signal-to-noise ratio associated with second messages transmitted by the second vehicle, and identifying the first vehicle as the first candidate phantom vehicle and the second vehicle as the second candidate phantom vehicle based on a comparison of the first and second signal-to-noise ratios.

Example 21 includes the apparatus of example 12, wherein the third vehicle is a first candidate trusted vehicle, and further including means for selecting a trusted neighbor, the selecting means to identify the first candidate trusted vehicle of one or more candidate trusted vehicles in the V2X network, generate a first message authentication code (MAC) based on a nonce value, transmit an authentication packet to the first candidate trusted vehicle, the authentication packet including the nonce value, in response to receiving an authentication response from the first candidate trusted vehicle, compare the first MAC to a second MAC included in the authentication response, generate a trusted vehicle list including the first candidate trusted vehicle when the first MAC matches the second MAC, and select the first candidate trusted vehicle to transmit the second challenge packet when the first candidate trusted vehicle is included in the trusted vehicle list.

Example 22 includes the apparatus of example 12, wherein the apparatus is a server in communication with the V2X network, a roadside computing device in communication with the V2X network, or included in a vehicle in communication with the V2X network.

Example 23 includes a non-transitory computer readable storage medium comprising instructions that, when executed, cause at least one processor of a computing device to at least (a) transmit a first challenge packet to a first vehicle to request the first vehicle to transmit a first challenge response, (b) instruct a second challenge packet to be transmitted to a second vehicle to request the second vehicle to transmit a second challenge response, (c) increment a first counter when the first challenge response is not obtained, (d) increment a second counter when the second challenge response is not obtained, and (e) after repeating (a)-(d), determine that the first and second vehicles are phantom vehicles associated with an attacker with a half-duplex radio when at least one of the first counter or the second counter satisfies a threshold, and instruct a third vehicle associated with a vehicle-to-everything (V2X) network to ignore future messages from the phantom vehicles based on the determination.

Example 24 includes the non-transitory computer readable storage medium of example 23, wherein the instructions, when executed, cause the at least one processor of the computing device to transmit the second challenge packet to the second vehicle at a first time to cause the second vehicle to transmit the second challenge response at a second time after the first time, and transmit the first challenge packet to the first vehicle at the second time, the half-duplex radio being unable to do both of (1) receive the first challenge packet and (2) transmit the second challenge response at the same time, the half-duplex radio unable to transmit the first challenge response because the half-duplex radio did not receive the first challenge packet.

Example 25 includes the non-transitory computer readable storage medium of example 23, wherein the third vehicle is a trusted vehicle, and the instructions, when executed, cause the at least one processor of the computing device to instruct the trusted vehicle to transmit the second challenge packet to the second vehicle at a first time to cause the second vehicle to transmit the second challenge response at a second time after the first time, and transmit the first challenge packet to the first vehicle at the second time, the half-duplex radio being unable to do both of (1) receive the first challenge packet and (2) transmit the second challenge response at the same time, the half-duplex radio unable to transmit the first challenge response because the half-duplex radio did not receive the first challenge packet.

Example 26 includes the non-transitory computer readable storage medium of example 23, wherein the instructions, when executed, cause the at least one processor of the computing device to transmit the first challenge packet to the first vehicle at a first time, and instruct the second challenge packet to be transmitted to the second vehicle at the first time, the half-duplex radio being unable to receive the first challenge packet and the second challenge packet at the same time.

Example 27 includes the non-transitory computer readable storage medium of example 23, wherein the instructions, when executed, cause the at least one processor of the computing device to transmit the first challenge packet at a first time to the first vehicle using a first frequency, the first challenge packet to request the first vehicle to transmit the first challenge response at a first hopping cycle using a second frequency, the second frequency different from the first frequency based on a first frequency band hopping pattern, and transmit the second challenge packet at the first time to the second vehicle using a third frequency, the second challenge packet to request the second vehicle to transmit the second challenge response at the first hopping cycle using a fourth frequency, the fourth frequency different from the third frequency based on a second frequency band hopping pattern different from the first frequency band hopping pattern, the half-duplex radio being unable to transmit the first challenge response and the second challenge response using different frequency band hopping patterns at the same hopping cycle.

Example 28 includes the non-transitory computer readable storage medium of example 23, wherein the third vehicle is a trusted vehicle, and the instructions, when executed, cause the at least one processor of the computing device to transmit the first challenge packet at a first time to the first vehicle using a first frequency, the first challenge packet to request the first vehicle to transmit the first challenge response at a first hopping cycle using a second frequency, the second frequency different from the first frequency based on a first frequency band hopping pattern, and instruct the trusted vehicle to transmit the second challenge packet to request the second vehicle to transmit the second challenge response to the trusted vehicle at the first time using a third frequency, the second challenge packet to request the second vehicle to transmit the second challenge response at the first hopping cycle using a fourth frequency, the fourth frequency different from the third frequency based on a second frequency band hopping pattern different from the first frequency band hopping pattern, the half-duplex radio being unable to transmit the first challenge response and the second challenge response using different frequency band hopping patterns at the same hopping cycle.

Example 29 includes the non-transitory computer readable storage medium of example 23, wherein the instructions, when executed, cause the at least one processor of the computing device to determine that the first challenge response matches a first expected challenge response, determine that the second challenge response matches a second expected challenge response, determine that the first and second vehicles are genuine vehicles based on the determinations, and transmit an alert to the third vehicle to accept future messages from the genuine vehicles.

Example 30 includes the non-transitory computer readable storage medium of example 23, wherein the instructions, when executed, cause the at least one processor of the computing device to determine that the first challenge response matches a first expected challenge response, and determine that the second challenge response does not match a second expected challenge response when the second challenge response is not obtained, a value of the second counter indicative of a quantity of times the second challenge response is not obtained.

Example 31 includes the non-transitory computer readable storage medium of example 23, wherein the instructions, when executed, cause the at least one processor of the computing device to identify the first vehicle as a first candidate phantom vehicle and the second vehicle as a second candidate phantom vehicle by determining a first signal-to-noise ratio associated with first messages transmitted by the first vehicle, determining a second signal-to-noise ratio associated with second messages transmitted by the second vehicle, and identifying the first vehicle as the first candidate phantom vehicle and the second vehicle as the second candidate phantom vehicle based on a comparison of the first and second signal-to-noise ratios.

Example 32 includes the non-transitory computer readable storage medium of example 23, wherein the third vehicle is a first candidate trusted vehicle, and the instructions, when executed, cause the at least one processor of the computing device to identify the first candidate trusted vehicle of one or more candidate trusted vehicles in a V2X network, generate a first message authentication code (MAC) based on a nonce value, transmit an authentication packet to the first candidate trusted vehicle, the authentication packet including the nonce value, in response to receiving an authentication response from the first candidate trusted vehicle, compare the first MAC to a second MAC included in the authentication response, generate a trusted vehicle list including the first candidate trusted vehicle when the first MAC matches the second MAC, and select the first candidate trusted vehicle to transmit the second challenge packet when the first candidate trusted vehicle is included in the trusted vehicle list.

Example 33 includes the non-transitory computer readable storage medium of example 23, wherein the computing device is a server in communication with the V2X network, a roadside computing device in communication with the V2X network, or included in a vehicle in communication with the V2X network.

Example 34 includes a method to detect an attack in a vehicle-to-everything (V2X) network, the method comprising (a) transmitting a first challenge packet to a first vehicle to request the first vehicle to transmit a first challenge response to a computing device, (b) instructing, with logic circuitry, a second challenge packet to be transmitted to a second vehicle to request the second vehicle to transmit a second challenge response, (c) incrementing, with the logic circuitry, a first counter when the first challenge response is not obtained, (d) incrementing, with the logic circuitry, a second counter when the second challenge response is not obtained, and (e) after repeating (a)-(d), determining, with the logic circuitry, that the first and second vehicles are phantom vehicles associated with an attacker with a half-duplex radio when at least one of the first counter or the second counter satisfies a threshold, and instructing, with the logic circuitry, a third vehicle associated with the V2X network to ignore future messages from the phantom vehicles based on the determination.

Example 35 includes the method of example 34, further including transmitting the second challenge packet to the second vehicle at a first time to cause the second vehicle to transmit the second challenge response at a second time after the first time, and transmitting the first challenge packet to the first vehicle at the second time, the half-duplex radio being unable to do both of (1) receive the first challenge packet and (2) transmit the second challenge response at the same time, the half-duplex radio unable to transmit the first challenge response because the half-duplex radio did not receive the first challenge packet.

Example 36 includes the method of example 34, wherein the third vehicle is a trusted vehicle, and further including instructing the trusted vehicle to transmit the second challenge packet to the second vehicle at a first time to cause the second vehicle to transmit the second challenge response at a second time after the first time, and transmitting the first challenge packet to the first vehicle at the second time, the half-duplex radio being unable to do both of (1) receive the first challenge packet and (2) transmit the second challenge response at the same time, the half-duplex radio unable to transmit the first challenge response because the half-duplex radio did not receive the first challenge packet.

Example 37 includes the method of example 34, further including transmitting the first challenge packet to the first vehicle at a first time, and instructing the second challenge packet to the second vehicle at the first time, the half-duplex radio being unable to receive the first challenge packet and the second challenge packet at the same time.

Example 38 includes the method of example 34, further including transmitting the first challenge packet at a first time to the first vehicle using a first frequency, the first challenge packet to request the first vehicle to transmit the first challenge response at a first hopping cycle using a second frequency, the second frequency different from the first frequency based on a first frequency band hopping pattern, and transmitting the second challenge packet at the first time to the second vehicle using a third frequency, the second challenge packet to request the second vehicle to transmit the second challenge response at the first hopping cycle using a fourth frequency, the fourth frequency different from the third frequency based on a second frequency band hopping pattern different from the first frequency band hopping pattern, the half-duplex radio being unable to transmit the first challenge response and the second challenge response using different frequency band hopping patterns at the same hopping cycle.

Example 39 includes the method of example 34, wherein the third vehicle is a trusted vehicle, and further including transmitting the first challenge packet at a first time to the first vehicle using a first frequency, the first challenge packet to request the first vehicle to transmit the first challenge response at a first hopping cycle using a second frequency, the second frequency different from the first frequency based on a first frequency band hopping pattern, and instructing the trusted vehicle to transmit the second challenge packet to request the second vehicle to transmit the second challenge response to the trusted vehicle at the first time using a third frequency, the second challenge packet to request the second vehicle to transmit the second challenge response at the first hopping cycle using a fourth frequency, the fourth frequency different from the third frequency based on a second frequency band hopping pattern different from the first frequency band hopping pattern, the half-duplex radio being unable to transmit the first challenge response and the second challenge response using different frequency band hopping patterns at the same hopping cycle.

Example 40 includes the method of example 34, further including determining that the first challenge response matches a first expected challenge response, determining that the second challenge response matches a second expected challenge response, determining that the first and second vehicles are genuine vehicles based on the determinations, and transmitting an alert to the third vehicle to accept future messages from the genuine vehicles.

Example 41 includes the method of example 34, further including determining that the first challenge response matches a first expected challenge response, and determining that the second challenge response does not match a second expected challenge response when the second challenge response is not obtained, a value of the second counter indicative of a quantity of times the second challenge response is not obtained.

Example 42 includes the method of example 34, further including determining a first signal-to-noise ratio associated with first messages transmitted by the first vehicle, determining a second signal-to-noise ratio associated with second messages transmitted by the second vehicle, and identifying the first vehicle as a first candidate phantom vehicle and the second vehicle as a second candidate phantom vehicle based on a comparison of the first and second signal-to-noise ratios.

Example 43 includes the method of example 34, wherein the third vehicle is a first candidate trusted vehicle, and further including identifying the first candidate trusted vehicle of one or more candidate trusted vehicles in the V2X network, generating a first message authentication code (MAC) based on a nonce value, transmitting an authentication packet to the first candidate trusted vehicle, the authentication packet including the nonce value, in response to receiving an authentication response from the first candidate trusted vehicle, comparing the first MAC to a second MAC included in the authentication response, generating a trusted vehicle list including the first candidate trusted vehicle when the first MAC matches the second MAC, and selecting the first candidate trusted vehicle to transmit the second challenge packet when the first candidate trusted vehicle is included in the trusted vehicle list.

Example 44 includes the method of example 34, wherein the logic circuitry is included in a server in communication with the V2X network, a roadside computing device in communication with the V2X network, or a vehicle in communication with the V2X network.

Example 45 includes an apparatus to detect an attack in a vehicle-to-everything (V2X) network, the apparatus comprising a challenge handler to (a) transmit a first challenge packet at a first time to a first vehicle using a first frequency, the first challenge packet to request the first vehicle to transmit the first challenge response at a first hopping cycle using a second frequency, the second frequency different from the first frequency based on a first frequency band hopping pattern, (b) instruct a second challenge packet to be transmitted at the first time to a second vehicle using a third frequency, the second challenge packet to request the second vehicle to transmit the second challenge response at the first hopping cycle using a fourth frequency, the fourth frequency different from the third frequency based on a second frequency band hopping pattern different from the first frequency band hopping pattern, (c) increment a first counter when the first challenge response is not obtained at the second frequency at the first hopping cycle, (d) increment a second counter when the second challenge response is not obtained at the fourth frequency at the first hopping cycle, and (e) after repeating (a)-(d), determine that the first and second vehicles are phantom vehicles associated with an attacker with a half-duplex radio when at least one of the first counter or the second counter satisfies a threshold, and a network interface to instruct a third vehicle associated with the V2X network to ignore future messages from the phantom vehicles based on the determination.

Example 46 includes the apparatus of example 45, wherein the challenge handler is to transmit the second challenge packet, the half-duplex radio being unable to transmit the first challenge response and the second challenge response using different frequency band hopping patterns at the same hopping cycle.

Example 47 includes the apparatus of example 45, wherein the third vehicle is a trusted vehicle, and the challenge handler is to instruct the trusted vehicle to transmit the second challenge packet to the second vehicle at the first time using the third frequency, the half-duplex radio being unable to transmit the first challenge response and the second challenge response using different frequency band hopping patterns at the same hopping cycle.

Example 48 includes the apparatus of example 45, wherein the challenge handler is to transmit the second challenge packet, the half-duplex radio being unable to receive the first challenge packet at the first frequency and the second challenge packet at third frequency at the same time.

Example 49 includes the apparatus of example 45, wherein the challenge handler is to determine that the first challenge response matches a first expected challenge response, determine that the second challenge response matches a second expected challenge response, determine that the first and second vehicles are genuine vehicles based on the determinations, and invoke the network interface to transmit an alert to the third vehicle to accept future messages from the genuine vehicles.

Example 50 includes the apparatus of example 45, wherein the challenge handler is to determine that the first challenge response matches a first expected challenge response, and determine that the second challenge response does not match a second expected challenge response when the second challenge response is not obtained, a value of the second counter indicative of a quantity of times the second challenge response is not obtained.

Example 51 includes the apparatus of example 45, further including a candidate phantom determiner to identify the first vehicle as a first candidate phantom vehicle and the second vehicle as a second candidate phantom vehicle by determining a first signal-to-noise ratio associated with first messages transmitted by the first vehicle, determining a second signal-to-noise ratio associated with second messages transmitted by the second vehicle, and identifying the first vehicle as the first candidate phantom vehicle and the second vehicle as the second candidate phantom vehicle based on a comparison of the first and second signal-to-noise ratios.

Example 52 includes the apparatus of example 45, wherein the third vehicle is a first candidate trusted vehicle, and further including a trusted neighbor handler to identify the first candidate trusted vehicle of one or more candidate trusted vehicles in the V2X network, generate a first message authentication code (MAC) based on a nonce value, transmit an authentication packet to the first candidate trusted vehicle, the authentication packet including the nonce value, in response to receiving an authentication response from the first candidate trusted vehicle, compare the first MAC to a second MAC included in the authentication response, generate a trusted vehicle list including the first candidate trusted vehicle when the first MAC matches the second MAC, and select the first candidate trusted vehicle to transmit the second challenge packet when the first candidate trusted vehicle is included in the trusted vehicle list.

Example 53 includes the apparatus of example 45, wherein the apparatus is a server in communication with the V2X network, a roadside computing device in communication with the V2X network, or included in a vehicle in communication with the V2X network.

Example 54 includes an apparatus to detect an attack in a vehicle-to-everything (V2X) network, the apparatus comprising means for challenging vehicles to test their authenticity, the challenging means to (a) transmit a first challenge packet at a first time to a first vehicle using a first frequency, the first challenge packet to request the first vehicle to transmit the first challenge response at a first hopping cycle using a second frequency, the second frequency different from the first frequency based on a first frequency band hopping pattern, (b) instruct a second challenge packet to be transmitted at the first time to a second vehicle using a third frequency, the second challenge packet to request the second vehicle to transmit the second challenge response at the first hopping cycle using a fourth frequency, the fourth frequency different from the third frequency based on a second frequency band hopping pattern different from the first frequency band hopping pattern, (c) increment a first counter when the first challenge response is not obtained at the second frequency at the first hopping cycle, (d) increment a second counter when the second challenge response is not obtained at the fourth frequency at the first hopping cycle, and (e) after repeating (a)-(d), determine that the first and second vehicles are phantom vehicles associated with an attacker with a half-duplex radio when at least one of the first counter or the second counter satisfies a threshold, and means for interfacing with the V2X network, the interfacing means to instruct a third vehicle associated with the V2X network to ignore future messages from the phantom vehicles based on the determination.

Example 55 includes the apparatus of example 54, wherein the challenging means is to transmit the second challenge packet, the half-duplex radio being unable to transmit the first challenge response and the second challenge response using different frequency band hopping patterns at the same hopping cycle.

Example 56 includes the apparatus of example 54, wherein the third vehicle is a trusted vehicle, and the challenging means is to instruct the trusted vehicle to transmit the second challenge packet to the second vehicle at the first time using the third frequency, the half-duplex radio being unable to transmit the first challenge response and the second challenge response using different frequency band hopping patterns at the same hopping cycle.

Example 57 includes the apparatus of example 54, wherein the challenging means is to transmit the second challenge packet, the half-duplex radio being unable to receive the first challenge packet at the first frequency and the second challenge packet at third frequency at the same time.

Example 58 includes the apparatus of example 54, wherein the challenging means is to determine that the first challenge response matches a first expected challenge response, determine that the second challenge response matches a second expected challenge response, determine that the first and second vehicles are genuine vehicles based on the determinations, and invoke the interfacing means to transmit an alert to the third vehicle to accept future messages from the genuine vehicles.

Example 59 includes the apparatus of example 54, wherein the challenging means is to determine that the first challenge response matches a first expected challenge response, and determine that the second challenge response does not match a second expected challenge response when the second challenge response is not obtained, a value of the second counter indicative of a quantity of times the second challenge response is not obtained.

Example 60 includes the apparatus of example 54, further including means for identifying a candidate phantom vehicle, the identifying means to identify the first vehicle as a first candidate phantom vehicle and the second vehicle as a second candidate phantom vehicle by determining a first signal-to-noise ratio associated with first messages transmitted by the first vehicle, determining a second signal-to-noise ratio associated with second messages transmitted by the second vehicle, and identifying the first vehicle as the first candidate phantom vehicle and the second vehicle as the second candidate phantom vehicle based on a comparison of the first and second signal-to-noise ratios.

Example 61 includes the apparatus of example 54, wherein the third vehicle is a first candidate trusted vehicle, and further including means for selecting a trusted neighbor, the selecting means to identify the first candidate trusted vehicle of one or more candidate trusted vehicles in the V2X network, generate a first message authentication code (MAC) based on a nonce value, transmit an authentication packet to the first candidate trusted vehicle, the authentication packet including the nonce value, in response to receiving an authentication response from the first candidate trusted vehicle, compare the first MAC to a second MAC included in the authentication response, generate a trusted vehicle list including the first candidate trusted vehicle when the first MAC matches the second MAC, and select the first candidate trusted vehicle to transmit the second challenge packet when the first candidate trusted vehicle is included in the trusted vehicle list.

Example 62 includes the apparatus of example 54, wherein the apparatus is a server in communication with the V2X network, a roadside computing device in communication with the V2X network, or included in a vehicle in communication with the V2X network.

Example 63 includes a non-transitory computer readable storage medium comprising instructions that, when executed, cause at least one processor of a computing device to at least (a) transmit a first challenge packet at a first time to a first vehicle using a first frequency, the first challenge packet to request the first vehicle to transmit the first challenge response at a first hopping cycle using a second frequency, the second frequency different from the first frequency based on a first frequency band hopping pattern, (b) instruct a second challenge packet to be transmitted at the first time to a second vehicle using a third frequency, the second challenge packet to request the second vehicle to transmit the second challenge response at the first hopping cycle using a fourth frequency, the fourth frequency different from the third frequency based on a second frequency band hopping pattern different from the first frequency band hopping pattern, (c) increment a first counter when the first challenge response is not obtained at the second frequency at the first hopping cycle, d. increment a second counter when the second challenge response is not obtained at the fourth frequency at the first hopping cycle, and (e) after repeating (a)-(d), determine that the first and second vehicles are phantom vehicles associated with an attacker with a half-duplex radio when at least one of the first counter or the second counter satisfies a threshold, and instruct a third vehicle associated with a vehicle-to-everything (V2X) network to ignore future messages from the phantom vehicles based on the determination.

Example 64 includes the non-transitory computer readable storage medium of example 63, wherein the instructions, when executed, cause the at least one processor of the computing device to transmit the second challenge packet, the half-duplex radio being unable to transmit the first challenge response and the second challenge response using different frequency band hopping patterns at the same hopping cycle.

Example 65 includes the non-transitory computer readable storage medium of example 63, wherein the third vehicle is a trusted vehicle, and the instructions, when executed, cause the at least one processor of the computing device to instruct the trusted vehicle to transmit the second challenge packet to the second vehicle at the first time using the third frequency, the half-duplex radio being unable to transmit the first challenge response and the second challenge response using different frequency band hopping patterns at the same hopping cycle.

Example 66 includes the non-transitory computer readable storage medium of example 63, wherein the instructions, when executed, cause the at least one processor of the computing device to transmit the second challenge packet, the half-duplex radio being unable to receive the first challenge packet at the first frequency and the second challenge packet at third frequency at the same time.

Example 67 includes the non-transitory computer readable storage medium of example 63, wherein the instructions, when executed, cause the at least one processor of the computing device to determine that the first challenge response matches a first expected challenge response, determine that the second challenge response matches a second expected challenge response, determine that the first and second vehicles are genuine vehicles based on the determinations, and invoke the network interface to transmit an alert to the third vehicle to accept future messages from the genuine vehicles.

Example 68 includes the non-transitory computer readable storage medium of example 63, wherein the instructions, when executed, cause the at least one processor of the computing device to determine that the first challenge response matches a first expected challenge response, and determine that the second challenge response does not match a second expected challenge response when the second challenge response is not obtained, a value of the second counter indicative of a quantity of times the second challenge response is not obtained.

Example 69 includes the non-transitory computer readable storage medium of example 63, wherein the instructions, when executed, cause the at least one processor of the computing device to identify the first vehicle as a first candidate phantom vehicle and the second vehicle as a second candidate phantom vehicle by determining a first signal-to-noise ratio associated with first messages transmitted by the first vehicle, determining a second signal-to-noise ratio associated with second messages transmitted by the second vehicle, and identifying the first vehicle as the first candidate phantom vehicle and the second vehicle as the second candidate phantom vehicle based on a comparison of the first and second signal-to-noise ratios.

Example 70 includes the non-transitory computer readable storage medium of example 63, wherein the third vehicle is a first candidate trusted vehicle, and the instructions, when executed, cause the at least one processor of the computing device to identify the first candidate trusted vehicle of one or more candidate trusted vehicles in the V2X network, generate a first message authentication code (MAC) based on a nonce value, transmit an authentication packet to the first candidate trusted vehicle, the authentication packet including the nonce value, in response to receiving an authentication response from the first candidate trusted vehicle, compare the first MAC to a second MAC included in the authentication response, generate a trusted vehicle list including the first candidate trusted vehicle when the first MAC matches the second MAC, and select the first candidate trusted vehicle to transmit the second challenge packet when the first candidate trusted vehicle is included in the trusted vehicle list.

Example 71 includes the non-transitory computer readable storage medium of example 63, wherein the computing device is a server in communication with the V2X network, a roadside computing device in communication with the V2X network, or included in a vehicle in communication with the V2X network.

Example 72 includes a method to detect an attack in a vehicle-to-everything (V2X) network, the method comprising (a) transmitting a first challenge packet at a first time to a first vehicle using a first frequency, the first challenge packet to request the first vehicle to transmit the first challenge response at a first hopping cycle using a second frequency, the second frequency different from the first frequency based on a first frequency band hopping pattern, (b) instructing, with logic circuitry, a second challenge packet to be transmitted at the first time to a second vehicle using a third frequency, the second challenge packet to request the second vehicle to transmit the second challenge response at the first hopping cycle using a fourth frequency, the fourth frequency different from the third frequency based on a second frequency band hopping pattern different from the first frequency band hopping pattern, (c) incrementing, with the logic circuitry, a first counter when the first challenge response is not obtained at the second frequency at the first hopping cycle, (d) incrementing, with the logic circuitry, a second counter when the second challenge response is not obtained at the fourth frequency at the first hopping cycle, and (e) after repeating (a)-(d), determining, with the logic circuitry, that the first and second vehicles are phantom vehicles associated with an attacker with a half-duplex radio when at least one of the first counter or the second counter satisfies a threshold, and instructing, with the logic circuitry, a third vehicle associated with the V2X network to ignore future messages from the phantom vehicles based on the determination.

Example 73 includes the method of example 72, wherein the logic circuitry transmits the second challenge packet, the half-duplex radio being unable to transmit the first challenge response and the second challenge response using different frequency band hopping patterns at the same hopping cycle.

Example 74 includes the method of example 72, wherein the third vehicle is a trusted vehicle, and further including instructing the trusted vehicle to transmit the second challenge packet to the second vehicle at the first time using the third frequency, the half-duplex radio being unable to transmit the first challenge response and the second challenge response using different frequency band hopping patterns at the same hopping cycle.

Example 75 includes the method of example 72, wherein the logic circuitry transmits the second challenge packet, the half-duplex radio being unable to receive the first challenge packet at the first frequency and the second challenge packet at third frequency at the same time.

Example 76 includes the method of example 72, further including determining that the first challenge response matches a first expected challenge response, determining that the second challenge response matches a second expected challenge response, determining that the first and second vehicles are genuine vehicles based on the determinations, and transmitting an alert to the third vehicle to accept future messages from the genuine vehicles.

Example 77 includes the method of example 72, further including determining that the first challenge response matches a first expected challenge response, and determining that the second challenge response does not match a second expected challenge response when the second challenge response is not obtained, a value of the second counter indicative of a quantity of times the second challenge response is not obtained.

Example 78 includes the method of example 72, further including identifying the first vehicle as a first candidate phantom vehicle and the second vehicle as a second candidate phantom vehicle by determining a first signal-to-noise ratio associated with first messages transmitted by the first vehicle, determining a second signal-to-noise ratio associated with second messages transmitted by the second vehicle, and identifying the first vehicle as the first candidate phantom vehicle and the second vehicle as the second candidate phantom vehicle based on a comparison of the first and second signal-to-noise ratios.

Example 79 includes the method of example 72, wherein the third vehicle is a first candidate trusted vehicle, and further including identifying the first candidate trusted vehicle of one or more candidate trusted vehicles in the V2X network, generating a first message authentication code (MAC) based on a nonce value, transmitting an authentication packet to the first candidate trusted vehicle, the authentication packet including the nonce value, in response to receiving an authentication response from the first candidate trusted vehicle, comparing the first MAC to a second MAC included in the authentication response, generating a trusted vehicle list including the first candidate trusted vehicle when the first MAC matches the second MAC, and selecting the first candidate trusted vehicle to transmit the second challenge packet when the first candidate trusted vehicle is included in the trusted vehicle list.

Example 80 includes the method of example 72, wherein the logic circuitry is included in a server in communication with the V2X network, a roadside computing device in communication with the V2X network, or a vehicle in communication with the V2X network.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus to detect an attack in a vehicle-to-everything (V2X) network, the apparatus comprising:
    challenge handler circuitry to:
        (a) transmit a first challenge packet to a first vehicle at a first time, the first challenge packet to request the first vehicle to transmit a first challenge response;
        (b) instruct a second challenge packet to be transmitted to a second vehicle at the first time, the second challenge packet to request the second vehicle to transmit a second challenge response;
        (c) increment a first counter when the first challenge response is not obtained;
        (d) increment a second counter when the second challenge response is not obtained; and
        (e) after repeating (a)-(d), determine that the first and second vehicles are phantom vehicles associated with an attacker with a half-duplex radio in response to at least one of the first counter or the second counter satisfying a threshold, the half-duplex radio being unable to receive the first challenge packet and the second challenge packet at the same time; and
    network interface circuitry to instruct a third vehicle associated with the V2X network to ignore future messages from the phantom vehicles based on the determination.

2. The apparatus of claim 1, wherein the challenge handler circuitry is to:
    transmit the second challenge packet to the second vehicle at a first time to cause the second vehicle to transmit the second challenge response at a second time after the first time; and
    transmit the first challenge packet to the first vehicle at the second time, the half-duplex radio being unable to do both of (1) receive the first challenge packet and (2) transmit the second challenge response at the same time, the half-duplex radio unable to transmit the first challenge response because the half-duplex radio did not receive the first challenge packet.

3. The apparatus of claim 1, wherein the third vehicle is a trusted vehicle, and the challenge handler circuitry is to:
    instruct the trusted vehicle to transmit the second challenge packet to the second vehicle at a first time to cause the second vehicle to transmit the second challenge response at a second time after the first time; and
    transmit the first challenge packet to the first vehicle at the second time, the half-duplex radio being unable to do both of (1) receive the first challenge packet and (2) transmit the second challenge response at the same time, the half-duplex radio unable to transmit the first challenge response because the half-duplex radio did not receive the first challenge packet.

4. The apparatus of claim 1, further including candidate phantom determiner circuitry to identify the first vehicle as a first candidate phantom vehicle and the second vehicle as a second candidate phantom vehicle by:
    determining a first signal-to-noise ratio associated with first messages transmitted by the first vehicle;
    determining a second signal-to-noise ratio associated with second messages transmitted by the second vehicle; and
    identifying the first vehicle as the first candidate phantom vehicle and the second vehicle as the second candidate phantom vehicle based on a comparison of the first and second signal-to-noise ratios.

5. The apparatus of claim 1, wherein the third vehicle is a first candidate trusted vehicle, and further including trusted neighbor handler circuitry to:
    identify the first candidate trusted vehicle of one or more candidate trusted vehicles in the V2X network;
    generate a first message authentication code (MAC) based on a nonce value;
    transmit an authentication packet to the first candidate trusted vehicle, the authentication packet including the nonce value;
    in response to receiving an authentication response from the first candidate trusted vehicle, compare the first MAC to a second MAC included in the authentication response;
    generate a trusted vehicle list including the first candidate trusted vehicle in response to a match of the first MAC and the second MAC; and
    select the first candidate trusted vehicle to transmit the second challenge packet in response to the first candidate trusted vehicle being included in the trusted vehicle list.

6. The apparatus of claim 1, wherein the apparatus is a server in communication with the V2X network, a roadside computing device in communication with the V2X network, or included in a fourth vehicle in communication with the V2X network.

7. An apparatus to detect an attack in a vehicle-to-everything (V2X) network, the apparatus comprising:
    challenge handler circuitry to:
        (a) transmit a first challenge packet to a first vehicle using a first frequency at a first time, the first challenge packet to request the first vehicle to transmit a first challenge response at a first hopping cycle using a second frequency, the second frequency different from the first frequency, the second frequency based on a first frequency band hopping pattern;
        (b) instruct a second challenge packet to be transmitted to a second vehicle using a third frequency at the first time, the second challenge packet to request the second vehicle to transmit a second challenge response at the first hopping cycle using a fourth frequency, the fourth frequency different from the third frequency, the fourth frequency based on a second frequency band hopping pattern different from the first frequency band hopping pattern;

(c) increment a first counter in response to the first challenge response not being obtained;

(d) increment a second counter in response to the second challenge response not being obtained; and (e) after repeating (a)-(d), determine that the first vehicle and the second vehicle are phantom vehicles associated with an attacker with a half-duplex radio in response to at least one of the first counter or the second counter satisfying a threshold, the half-duplex radio being unable to transmit the first challenge response and the second challenge response using different frequency band hopping patterns at the same hopping cycle; and network interface circuitry to instruct a third vehicle associated with the V2X network to ignore future messages from the phantom vehicles based on the determination.

8. An apparatus to detect an attack in a vehicle-to-everything (V2X) network, the apparatus comprising:
challenge handler circuitry to:
(a) transmit a first challenge packet to a first vehicle using a first frequency at a first time, the first challenge packet to request the first vehicle to transmit a first challenge response at a first hopping cycle using a second frequency, the second frequency different from the first frequency, the second frequency based on a first frequency band hopping pattern; and
(b) instruct a trusted vehicle to transmit a second challenge packet to a second vehicle using a third frequency, the second challenge packet to request the second vehicle to transmit a second challenge response at the first hopping cycle using a fourth frequency, the fourth frequency different from the third frequency, the fourth frequency based on a second frequency band hopping pattern different from the first frequency band hopping pattern;
(c) increment a first counter in response to the first challenge response not being obtained;
(d) increment a second counter in response to the second challenge response not being obtained; and
(e) after repeating (a)-(d), determine that the first vehicle and the second vehicle are phantom vehicles associated with an attacker with a half-duplex radio in response to at least one of the first counter or the second counter satisfying a threshold, the half-duplex radio being unable to transmit the first challenge response and the second challenge response using different frequency band hopping patterns at the same hopping cycle; and
network interface circuitry to instruct the trusted vehicle associated with the V2X network to ignore future messages from the phantom vehicles based on the determination.

9. An apparatus to detect an attack in a vehicle-to-everything (V2X) network, the apparatus comprising:
challenge handler circuitry to:
(a) transmit a first challenge packet to a first vehicle to request the first vehicle to transmit a first challenge response;
(b) instruct a second challenge packet to be transmitted to a second vehicle to request the second vehicle to transmit a second challenge response;
(c) increment a first counter in response to not obtaining the first challenge response;
(d) increment a second counter in response to not obtaining the second challenge response; and
(e) after repeating (a)-(d) determine whether at least one of the first vehicle or the second vehicle are phantom vehicles associated with an attacker with a half-duplex radio based on whether a respective one of the first counter or the second counter satisfies a threshold;
determine that the first challenge response matches a first expected challenge response;
determine that the second challenge response matches a second expected challenge response; and
determine that the first and second vehicles are genuine vehicles in response to determining that the first challenge response matches the first expected challenge response and that the second challenge response matches the second expected challenge response; and
network interface circuitry to transmit an alert to a third vehicle to accept future messages from the genuine vehicles or ignore future messages from the phantom vehicles.

10. An apparatus to detect an attack in a vehicle-to-everything (V2X) network, the apparatus comprising:
challenge handler circuitry to:
(a) transmit a first challenge packet to a first vehicle to request the first vehicle to transmit a first challenge response;
(b) instruct a second challenge packet to be transmitted to a second vehicle to request the second vehicle to transmit a second challenge response;
(c) increment a first counter in response to not obtaining the first challenge response;
(d) increment a second counter in response to not obtaining the second challenge response; and
(e) after repeating (a)-(d) determine whether at least one of the first vehicle or the second vehicle are phantom vehicles associated with an attacker with a half-duplex radio based on whether a respective one of the first counter or the second counter satisfies a threshold;
determine that the first challenge response matches a first expected challenge response; and
determine that the second challenge response does not match a second expected challenge response in response to not obtaining the second challenge response, a value of the second counter indicative of a quantity of times the second challenge response is not obtained; and
network interface circuitry to instruct a third vehicle associated with the V2X network to at least one of accept future messages from the first vehicle or ignore future messages from the second vehicle.

11. An apparatus to detect an attack in a vehicle-to-everything (V2X) network, the apparatus comprising:
means for challenging vehicles to test their authenticity, the means for challenging to:
(a) transmit a first challenge packet to a first vehicle using a first frequency at a first time, the first challenge packet to request the first vehicle to transmit a first challenge response at a first hopping cycle using a second frequency, the second frequency different from the first frequency, the second frequency based on a first frequency band hopping pattern;
(b) instruct a second challenge packet to be transmitted to a second vehicle using a third frequency at the first time, the second challenge packet to request the second vehicle to transmit a second challenge response at the first hopping cycle using a fourth frequency, the fourth frequency different from the third frequency based on a second frequency band hopping pattern different from the first frequency band hopping pattern;
(c) increment a first counter in response to the first challenge response not being obtained;
(d) increment a second counter in response to the second challenge response not being obtained; and
(e) after repeating (a)-(d), determine that the first vehicle and the second vehicle are phantom vehicles associated with an attacker with a half-duplex radio in response to at least one of the first counter or the second counter satisfying a threshold, the half-duplex radio being unable to transmit the first challenge response and the second challenge response using different frequency band hopping patterns at the same hopping cycle; and
means for interfacing to instruct a third vehicle associated with the V2X network to ignore future messages from the phantom vehicles based on the determination.

12. An apparatus to detect an attack in a vehicle-to-everything (V2X) network, the apparatus comprising:
means for challenging vehicles to test their authenticity, the means for challenging to:
(a) transmit a first challenge packet to a first vehicle using a first frequency at a first time, the first challenge packet to request the first vehicle to transmit a first challenge response at a first hopping cycle using a second frequency, the second frequency different from the first frequency, the second frequency based on a first frequency band hopping pattern;
(b) instruct a trusted vehicle to transmit a second challenge packet to a second vehicle using a third frequency, the second challenge packet to request the second vehicle to transmit a second challenge response at the first hopping cycle using a fourth frequency, the fourth frequency different from the third frequency, the fourth frequency based on a second frequency band hopping pattern different from the first frequency band hopping pattern;
(c) increment a first counter in response to the first challenge response not being obtained;
(d) increment a second counter in response to the second challenge response not being obtained; and
(e) after repeating (a)-(d), determine that the first vehicle and the second vehicle are phantom vehicles associated with an attacker with a half-duplex radio in response to at least one of the first counter or the second counter satisfying a threshold, the half-duplex radio being unable to transmit the first challenge response and the second challenge response using different frequency band hopping patterns at the same hopping cycle; and
means for interfacing to instruct the trusted vehicle associated with the V2X network to ignore future messages from the phantom vehicles based on the determination.

13. An apparatus to detect an attack in a vehicle-to-everything (V2X) network, the apparatus comprising:
means for challenging vehicles to test their authenticity, the means for challenging to:
(a) transmit a first challenge packet to a first vehicle to request the first vehicle to transmit a first challenge response;
(b) instruct a second challenge packet to be transmitted to a second vehicle to request the second vehicle to transmit a second challenge response;
(c) increment a first counter in response to not obtaining the first challenge response;
(d) increment a second counter in response to not obtaining the second challenge response; and
(e) after repeating (a)-(d) determine whether at least one of the first vehicle or the second vehicle are phantom vehicles associated with an attacker with a half-duplex radio based on whether a respective one of the first counter or the second counter satisfies a threshold;
determine that the first challenge response matches a first expected challenge response;
determine that the second challenge response matches a second expected challenge response;
determine that the first and second vehicles are genuine vehicles in response to determining that the first challenge response matches the first expected challenge response and that the second challenge response matches the second expected challenge response; and
means for interfacing to transmit an alert to a third vehicle to accept future messages from the genuine vehicles or ignore future messages from the phantom vehicles.

14. The apparatus of claim 13, wherein the means for challenging is to:
transmit the second challenge packet to the second vehicle at a first time to cause the second vehicle to transmit the second challenge response at a second time after the first time; and
transmit the first challenge packet to the first vehicle at the second time, the half-duplex radio being unable to do both of (1) receive the first challenge packet and (2) transmit the second challenge response at the same time, the half-duplex radio unable to transmit the first challenge response because the half-duplex radio did not receive the first challenge packet.

15. The apparatus of claim 13, wherein the third vehicle is a trusted vehicle, and the means for challenging is to:
instruct the trusted vehicle to transmit the second challenge packet to the second vehicle at a first time to cause the second vehicle to transmit the second challenge response at a second time after the first time; and
transmit the first challenge packet to the first vehicle at the second time, the half-duplex radio being unable to do both of (1) receive the first challenge packet and (2) transmit the second challenge response at the same time, the half-duplex radio unable to transmit the first challenge response because the half-duplex radio did not receive the first challenge packet.

16. An apparatus of to detect an attack in a vehicle-to-everything (V2X) network, the apparatus comprising:
means for challenging vehicles to test their authenticity, the means for challenging to:
(a) transmit a first challenge packet to a first vehicle to request the first vehicle to transmit a first challenge response;

(b) instruct a second challenge packet to be transmitted to a second vehicle to request the second vehicle to transmit a second challenge response;
(c) increment a first counter in response to not obtaining the first challenge response;
(d) increment a second counter in response to not obtaining the second challenge response; and
(e) after repeating (a)-(d) determine whether at least one of the first vehicle or the second vehicle are phantom vehicles associated with an attacker with a half-duplex radio based on whether a respective one of the first counter or the second counter satisfies a threshold;
determine that the first challenge response matches a first expected challenge response; and
determine that the second challenge response does not match a second expected challenge response in response to not obtaining the second challenge response, a value of the second counter indicative of a quantity of times the second challenge response is not obtained; and
means for interfacing to instruct a third vehicle associated with the V2X network to at least one of accept future messages from the first vehicle or ignore future messages from the second vehicle.

17. A non-transitory computer readable storage medium comprising instructions that, when executed, cause at least one processor of a computing device to at least:
(a) transmit a first challenge packet to a first vehicle at a first time using a first frequency, the first challenge packet to request the first vehicle to transmit a first challenge response at a first hopping cycle using a second frequency, the second frequency different from the first frequency, the second frequency based on a first frequency band hopping pattern;
(b) instruct a second challenge packet to be transmitted to a second vehicle at the first time using a third frequency, the second challenge packet to request the second vehicle to transmit a second challenge response at the first hopping cycle using a fourth frequency, the fourth frequency different from the third frequency, the fourth frequency based on a second frequency band hopping pattern different from the first frequency band hopping pattern;
(c) increment a first counter in response to not obtaining the first challenge response;
(d) increment a second counter in response to not obtaining the second challenge response; and
(e) after repeating (a)-(d), determine that the first vehicle and the second vehicle are phantom vehicles associated with an attacker with a half-duplex radio in response to at least one of the first counter or the second counter satisfying a threshold, the half-duplex radio being unable to transmit the first challenge response and the second challenge response using different frequency band hopping patterns at the same hopping cycle; and
instruct a third vehicle associated with a vehicle-to-everything (V2X) network to ignore future messages from the phantom vehicles based on the determination.

18. A non-transitory computer readable storage medium comprising instructions that, when executed, cause at least one processor of a computing device to at least:
(a) transmit a first challenge packet to a first vehicle at a first time using a first frequency, the first challenge packet to request the first vehicle to transmit a first challenge response at a first hopping cycle using a second frequency, the second frequency different from the first frequency, the second frequency based on a first frequency band hopping pattern;
(b) instruct a trusted vehicle to transmit a second challenge packet to a second vehicle using a third frequency, the second challenge packet to request the second vehicle to transmit a second challenge response at the first hopping cycle using a fourth frequency, the fourth frequency different from the third frequency, the fourth frequency based on a second frequency band hopping pattern different from the first frequency band hopping pattern;
(c) increment a first counter in response to not obtaining the first challenge response;
(d) increment a second counter in response to not obtaining the second challenge response; and
(e) after repeating (a)-(d), determine that the first vehicle and the second vehicle are phantom vehicles associated with an attacker with a half-duplex radio in response to at least one of the first counter or the second counter satisfying a threshold, the half-duplex radio being unable to transmit the first challenge response and the second challenge response using different frequency band hopping patterns at the same hopping cycle; and
instruct a third vehicle associated with a vehicle-to-everything (V2X) network to ignore future messages from the phantom vehicles based on the determination.

19. An apparatus to detect an attack in a vehicle-to-everything (V2X) network, the apparatus comprising:
means for challenging vehicles to test their authenticity, the means for challenging to:
(a) transmit a first challenge packet to a first vehicle at a first time, the first challenge packet to request the first vehicle to transmit a first challenge response;
(b) instruct a second challenge packet to be transmitted to a second vehicle at the first time, the second challenge packet to request the second vehicle to transmit a second challenge response;
(c) increment a first counter when the first challenge response is not obtained;
(d) increment a second counter when the second challenge response is not obtained; and
(e) after repeating (a)-(d), determine that the first and second vehicles are phantom vehicles associated with an attacker with a half-duplex radio in response to at least one of the first counter or the second counter satisfying a threshold, the half-duplex radio being unable to
receive the first challenge packet and the second challenge packet at the same time; and
means for interfacing to instruct a third vehicle associated with the V2X network to ignore future messages from the phantom vehicles based on the determination.

20. A non-transitory computer readable storage medium comprising instructions that, when executed, cause at least one processor of a computing device to at least:
(a) transmit a first challenge packet to a first vehicle at a first time, the first challenge packet to request the first vehicle to transmit a first challenge response;
(b) instruct a second challenge packet to be transmitted to a second vehicle at the first time, the second challenge packet to request the second vehicle to transmit a second challenge response;
(c) increment a first counter when the first challenge response is not obtained;
(d) increment a second counter when the second challenge response is not obtained; and (e) after repeating (a)-(d), determine that the first and second vehicles are phantom vehicles associated with an attacker with a half-duplex radio in response to at least one of the first counter or the second counter satisfying a threshold, the half-duplex radio being unable to receive the first challenge packet and the second challenge packet at the same time; and instruct a third vehicle to ignore future messages from the phantom vehicles based on the determination.

21. A non-transitory computer readable storage medium comprising instructions that, when executed, cause at least one processor of a computing device to at least:
(a) transmit a first challenge packet to a first vehicle to request the first vehicle to transmit a first challenge response;
(b) instruct a second challenge packet to be transmitted to a second vehicle to request the second vehicle to transmit a second challenge response;
(c) increment a first counter in response to not obtaining the first challenge response;
(d) increment a second counter in response to not obtaining the second challenge response; and
(e) after repeating (a)-(d) determine whether at least one of the first vehicle or the second vehicle are phantom vehicles associated with an attacker with a half-duplex radio based on whether a respective one of the first counter or the second counter satisfies a threshold;
determine that the first challenge response matches a first expected challenge response;
determine that the second challenge response matches a second expected challenge response;
determine that the first and second vehicles are genuine vehicles in response to determining that the first challenge response matches the first expected challenge response and that the second challenge response matches the second expected challenge response; and
transmit an alert to a third vehicle to accept future messages from the genuine vehicles or ignore future messages from the phantom vehicles.

22. A non-transitory computer readable storage medium comprising instructions that, when executed, cause at least one processor of a computing device to at least:
(a) transmit a first challenge packet to a first vehicle to request the first vehicle to transmit a first challenge response;
(b) instruct a second challenge packet to be transmitted to a second vehicle to request the second vehicle to transmit a second challenge response;
(c) increment a first counter in response to not obtaining the first challenge response;
(d) increment a second counter in response to not obtaining the second challenge response; and
(e) after repeating (a)-(d) determine whether at least one of the first vehicle or the second vehicle are phantom vehicles associated with an attacker with a half-duplex radio based on whether a respective one of the first counter or the second counter satisfies a threshold;
determine that the first challenge response matches a first expected challenge response;
determine that the second challenge response does not match a second expected challenge response in response to not obtaining the second challenge response, a value of the second counter indicative of a quantity of times the second challenge response is not obtained; and instruct a third vehicle to at least one of accept future messages from the first vehicle or ignore future messages from the second vehicle.

23. The non-transitory computer readable storage medium of claim 22, wherein the instructions, when executed, cause the at least one processor of the computing device to:
transmit the second challenge packet to the second vehicle at a first time to cause the second vehicle to transmit the second challenge response at a second time after the first time; and
transmit the first challenge packet to the first vehicle at the second time, the half-duplex radio being unable to do both of (1) receive the first challenge packet and (2) transmit the second challenge response at the same time, the half-duplex radio unable to transmit the first challenge response because the half-duplex radio did not receive the first challenge packet.

24. The non-transitory computer readable storage medium of claim 22, wherein the third vehicle is a trusted vehicle, and the instructions, when executed, cause the at least one processor of the computing device to:
instruct the trusted vehicle to transmit the second challenge packet to the second vehicle at a first time to cause the second vehicle to transmit the second challenge response at a second time after the first time; and
transmit the first challenge packet to the first vehicle at the second time, the half-duplex radio being unable to do both of (1) receive the first challenge packet and (2) transmit the second challenge response at the same time, the half-duplex radio unable to transmit the first challenge response because the half-duplex radio did not receive the first challenge packet.

25. The non-transitory computer readable storage medium of claim 22, wherein the instructions, when executed, cause the at least one processor of the computing device to identify the first vehicle as a first candidate phantom vehicle and the second vehicle as a second candidate phantom vehicle by:
determining a first signal-to-noise ratio associated with first messages transmitted by the first vehicle;
determining a second signal-to-noise ratio associated with second messages transmitted by the second vehicle; and
identifying the first vehicle as the first candidate phantom vehicle and the second vehicle as the second candidate phantom vehicle based on a comparison of the first and second signal-to-noise ratios.

26. The non-transitory computer readable storage medium of claim 22, wherein the third vehicle is a first candidate trusted vehicle, and the instructions, when executed, cause the at least one processor of the computing device to:
identify the first candidate trusted vehicle of one or more candidate trusted vehicles in a V2X network;
generate a first message authentication code (MAC) based on a nonce value;
transmit an authentication packet to the first candidate trusted vehicle, the authentication packet including the nonce value;
in response to receiving an authentication response from the first candidate trusted vehicle, compare the first MAC to a second MAC included in the authentication response;
generate a trusted vehicle list including the first candidate trusted vehicle when the first MAC matches the second MAC; and select the first candidate trusted vehicle to transmit the second challenge packet when the first candidate trusted vehicle is included in the trusted vehicle list.

\* \* \* \* \*